(12) United States Patent
Taniguchi et al.

(10) Patent No.: US 7,461,528 B2
(45) Date of Patent: Dec. 9, 2008

(54) CONTENT PROCESSING APPARATUS AND CONTENT DISPLAY APPARATUS BASED ON LOCATION INFORMATION

(75) Inventors: Koji Taniguchi, Katano (JP); Hiroyuki Tada, Kawasaki (JP); Junichi Sato, Machida (JP); Takao Yamaguchi, Kokubunji (JP)

(73) Assignee: Panasonic Corporation, Osaka (JP)

( * ) Notice: Subject to any disclaimer, the term of this patent is extended or adjusted under 35 U.S.C. 154(b) by 648 days.

(21) Appl. No.: 10/525,826

(22) PCT Filed: Aug. 11, 2003

(86) PCT No.: PCT/JP03/10199

§ 371 (c)(1),
(2), (4) Date: Feb. 25, 2005

(87) PCT Pub. No.: WO2004/021218

PCT Pub. Date: Mar. 11, 2004

(65) Prior Publication Data

US 2006/0041556 A1    Feb. 23, 2006

(30) Foreign Application Priority Data

Aug. 29, 2002  (JP)  ............... 2002-251895
Jan. 14, 2003  (JP)  ............... 2003-005953

(51) Int. Cl.
*G01C 21/34*    (2006.01)
*G08G 1/0968*   (2006.01)
*G06F 17/30*    (2006.01)

(52) U.S. Cl. .................. 70/207; 701/210; 701/211; 707/10

(58) Field of Classification Search ................ 701/207, 701/208, 209, 200, 201, 10, 1; 340/995.12, 340/995.23, 995.24; 715/768; 709/231
See application file for complete search history.

(56) References Cited

U.S. PATENT DOCUMENTS 6,282,489 B1    8/2001    Bellesfield et al.

(Continued)

FOREIGN PATENT DOCUMENTS

EP    0945706    9/1999

(Continued)

OTHER PUBLICATIONS

Sakata et al., "A Proposed Location-aware Notification Service," (in Japanese), IPSJ-MBL (2000-MBL-15), Dec. 2002.

(Continued)

*Primary Examiner*—Tan Q Nguyen
(74) *Attorney, Agent, or Firm*—Greenblum & Bernstein, P.L.C.

(57) ABSTRACT

The present invention receives list content providing location conditions in a list organized by location conditions in which a reference destination of location-dependent content, being content assigned correspondence to geographical location information, is compiled for each location condition, sent from a content communication server; receives the sent location information; generates area-specific list content comprising information on location-dependent content corresponding to location information, by extracting a list organized by location conditions, in which location conditions matching location information are provided, from the list content; and outputs the area-specific list content.

22 Claims, 45 Drawing Sheets

U.S. PATENT DOCUMENTS

| | | | |
|---|---|---|---|
| 6,415,227 | B1 | 7/2002 | Lin |
| 6,542,814 | B2* | 4/2003 | Polidi et al. ............... 701/208 |
| 7,003,288 | B2 | 2/2006 | Ueda et al. |
| 2002/0057283 | A1 | 5/2002 | Biswas et al. |
| 2003/0083809 | A1* | 5/2003 | Hatano ...................... 701/207 |
| 2003/0191578 | A1* | 10/2003 | Paulauskas et al. ......... 701/200 |

FOREIGN PATENT DOCUMENTS

| | | |
|---|---|---|
| JP | 2002/163430 | 6/2002 |
| JP | 2002/290356 | 10/2002 |
| JP | 2002/334095 | 11/2002 |
| WO | 00/51026 | 8/2000 |
| WO | 02/31441 | 4/2002 |

OTHER PUBLICATIONS

Dunham et al., "Location dependent data and in its management in mobile database," Database and Expert Systems Application, Aug. 1998, Los Alamitos, California, pp. 414-419.

P. Biswas et al., "Leveraging Location-Based Services for Mobile Applications," Technical White Paper Oracle Corporation (online), Jun. 2001, pp. 1-17, http://spatialnews.geocomm.com/whitepapers/LS_Tech_wp.pdf (retrieved on Jul. 21, 2004).

Seydim et al., "An Architecture for location dependent query processing," 12th International Workshop on Database and Expert Systems Applications, Sep. 3, Munich, Germany, pp. 549-555.

Sweeney Jr., "Comparative benefits of various automotive navigation and routing technologies," Position Location and Navigation Symposium, Apr. 22, 1996, New York, NY, pp. 415-421.

Ren et al., "Using semantic caching to manage location dependent data in mobile computing," Proceedings of the Annual International Conference on Mobile Computing and Networking, Aug. 2000, pp. 210-221.

A. Garmash, "A geographic XML-based format for the mobile environment," Proceedings of the 34th Hawaii International Conference on System Sciences, Jan. 3, 2001, Maui, HI, pp. 1-9.

Bennet et al., "Location-based services. Wherever you are, wherever you go, get the information you want to know," IBM Developerworks (online), Mar. 2002, pp. 1-9, ftp://www6.software.ibm.com/software/ developer/library/l-lbs.pdf (retrieved on Jul. 21, 2003).

Nitto et al., "Modeling and Evaluation of Prefetching Policies for Context-Aware Information Services," Proceedings of the 4th Annual ACM/IEEE International Conference on Mobile Computing and Networking, Oct. 25, 1998, New York, NY, pp. 55-65.

Gaede et al., "Multidimensional Access Methods,"ACM Computing Surveys, vol. 30, No. 2, Jun. 1998, New York, NY, pp. 170-231.

English Language Abstract of JP 2002-163430.

English Language Abstract of JP 2002-334095.

English Language Abstract of JP 2002-290356.

\* cited by examiner

```
<c:caml xmlns:c="http://www.xxx/caml/">                                                          — 801
    <html>                                                                                    ⎤
        <head>                                                                                 |
            <title>Restaurant List</title>                                                     |
        </head>                                                                                |— 802
        <body>                                                                                 |
            Restaurant List<br>                                                                |
            <hr/>                                                                              ⎦
            <c:location type="circle" center="N35.37.44.16,E139.41.23.157" radius="600" unit="m">   ⎤— 803a / 807a
                <a href="http://restaurant_A1.html">Restaurant A1 </a>                          ⎤— 806a
                <a href="http://restaurant_A2.html">Restaurant A2 </a>                          ⎦
            </c:location>                                                                      — 808a
            <c:location type="circle" center="N35.37.30.160,E139.40.41.109" radius="600" unit="m">  ⎤— 803b / 807b
                <a href="http://restaurant_B1.html">Restaurant B1 </a>                          ⎤— 806b
                <a href="http://restaurant_B2.html">Restaurant B2 </a>                          ⎦
            </c:location>                                                                      — 808b
            <c:location type="circle" center="N35.37.56.24,E139.40.4.86" radius="600" unit="m">     ⎤— 803c / 807c
                <a href="http://restaurant_C1.html">Restaurant C1 </a>                          ⎤— 806c
                <a href="http://restaurant_C2.html">Restaurant C2 </a>                          ⎦
            </c:location>                                                                      — 808c
        </body>                                                                                ⎤— 804
    </html>                                                                                    ⎦
</c:caml>                                                                                       — 805
```

(800 encompasses the entire block)

FIG. 8

Content Processing

| Request/ notification | Control message | Content processing section processing | Response message | Notes |
|---|---|---|---|---|
| 1500 | | | | |
| 1501 Menu content | Cotrol section 116 ⇒ setting section 109<br><br>BRecv CID = xxxx (broadcast reception) | Broadcast processing section 107 data broadcast processing | Broadcast processing section 107 ⇒ broadcast receiving section 114<br><br>Content part broadcast xxxx.html | Broadcast processing section 107 transmits received content to broadcast receiving section 114.<br>Broadcast receiving section 114 reports information relating to received content to control section 116. |
| 1502 List content | Browser section 113 ⇒ setting section 109<br><br>Get xxxx.caml | Communication processing section 106 adaptive HTTP processing | Communication processing section 106 ⇒ browser section 113<br><br>Content reception xxxx.html | Content acquisition by means of HTTP CAML→HTML conversion executed, HTML content transmitted. |
| 1503 Location-dependent content | Browser section 113 ⇒ setting section 109<br><br>Get xxxx.html | Communication processing section 106 general HTTP processing | Communication processing section 106 ⇒ browser section 113<br><br>Content reception xxxx.html | Content acquisition by means of HTTP |
| 1504 General content | Browser section 113 ⇒ setting section 109<br><br>Get xxxx.html | Communication processing section 106 general HTTP processing | Communication processing section 106 ⇒ browser section 113<br><br>Content reception xxxx.html | Content acquisition by means of HTTP |
| 1505 Location information notification | Cotrol section 116 ⇒ setting section 109<br><br>Position Exx.xx, Nxx.xx | Communication processing section 106 location condition determination processing | Setting section 109 ⇒ control section 116<br><br>Location determination update information is transmitted. | Location determination update information is transmitted. |

FIG.15

2300
LOCATION CONDITION LIST

| LIST CONTENT REFERENCE DESTINATION | http:*.*.*** | |
|---|---|---|
| LOCATION CONDITIONS | | DETERMINATION RESULT |
| <c:location type="circle" center="N35.37:44.16,E139.41.23.157" radius="600" unit="m"> | | + |
| <c:location type="circle" center="N35.37:30.160,E139.40.41.109" radius="600" unit="m"> | | − |
| <c:location type="circle" center="N35.37:56.24,E139.40.45.86" radius="600" unit="m"> | | − |

2301 — LIST CONTENT REFERENCE DESTINATION
2302 — LOCATION CONDITIONS
2303 — DETERMINATION RESULT
2304a

FIG. 23

Content Processing

| | Request/ notification | Control message | Content processing section processing | Response message | Notes |
|---|---|---|---|---|---|
| 4001a | Menu content request | Cotrol section 116 ⇒ setting section 109 | Broadcast processing section 107 | Setting section 109 ⇒ control section 116 URL (content information) notification | Notification of URL of stored content |
| 4001b | | BRecv CID = xxxx | data broadcast processing | Broadcast processing section 107 ⇒ browser section 113 Content reception xxxx.html | HTML content received en bloc is transmitted by means of HTTP communication |
| 1502 | List content request | Browser section 113 ⇒ setting section 109 Get xxxx.caml | Communication processing section 106 adaptive HTTP processing | Communication processing section 106 ⇒ browser section 113 Content reception xxxx.html | Content acquisition by means of HTTP CAML→HTML conversion executed. |
| 1503 | Location-dependent content request | Browser section 113 ⇒ setting section 109 Get xxxx.html | Communication processing section 106 general HTTP processing | Communication processing section 106 ⇒ browser section 113 Content reception xxxx.html | Content acquisition by means of HTTP |
| 1504 | General content request | Browser section 113 ⇒ setting section 109 Get xxxx.html | Communication processing section 106 general HTTP processing | Communication processing section 106 ⇒ browser section 113 Content reception xxxx.html | Content acquisition by means of HTTP |
| 1505 | Location information notification | Cotrol section 116 ⇒ setting section 109 Position Exx.xx, Nxx.xx | Communication processing section 106 location condition determination processing | Setting section 109 ⇒ control section 116 Location determination update information | Location determination update information is transmitted. |

FIG.40

CONTENT PROCESSING APPARATUS AND CONTENT DISPLAY APPARATUS BASED ON LOCATION INFORMATION

TECHNICAL FIELD

The present invention relates to a content processing apparatus that performs predetermined processing on and outputs content that has location information existing on a network and a content display apparatus that displays content output from the content processing apparatus.

BACKGROUND ART

With the increasing popularity of mobile terminals that have a GPS (Global Positioning System) function in recent years, there is a growing demand for location information services that offer information relating to a user's present locality. In addition, mobile terminals incorporating a terrestrial digital broadcast reception function are also being developed. Against this backdrop, it is easy to envisage the development in the near future of mobile terminals equipped with a GPS-based location information acquisition function, a terrestrial digital broadcast reception function, and an Internet access function using communication. The widespread use of such mobile terminals will make it possible to provide more useful location information services than heretofore.

A known general location information service that has been available for some time is a service whereby location information is reported from a GPS-equipped mobile terminal to a server, information on the present locality of this mobile terminal is retrieved on the server side, and the retrieved results are sent back to the mobile terminal. That is to say, this is a service whereby information on the present locality can be obtained when a terminal user explicitly orders information retrieval.

In contrast to this, there is a method whereby information retrieval is performed at regular intervals when a user moves (changes location), and when there is information desired by the user in the present locality, the existence of information is reported to the user. Here, this method will be referred to as a notification type content distribution service.

A conventional example of a notification type content distribution service is the method shown in Sakata et al, "A Proposed Location-aware Notification Service" (in Japanese), IPSJ-MBL (2000-MBL-15), December 2002.

The notification type service described in the above document employs a "wide-area cache system" as a retrieval system in order to reduce the cost of communication between a terminal and the server. With this wide-area cache system, a terminal performs en bloc caching from a server of location related information of a wider range that the range that is the object of retrieval, and the terminal performs retrieval processing on this cached location related information. In this way, it is possible to reduce the number of times communication is performed between a terminal and a server.

However, with this kind of conventional method, since actual content distributed over a wide range is cached en bloc, a user does not necessarily view the entire cached content. A consequent problem is that there is a high probability of received content being destroyed without being viewed, and there is room for improvement in the efficiency of content distribution.

DISCLOSURE OF INVENTION

It is an object of the present invention to enable content information relating to the present locality to be provided to a mobile terminal user, and content desired by a user to be distributed efficiently.

The present invention receives list content providing location conditions in a list organized by location conditions, in which a reference destination of location-dependent content, being content assigned correspondence to geographical location information, is compiled for each location condition, sent from a content server; receives reported location information; generates area-specific list content comprising information on location-dependent content corresponding to location information by extracting a list organized by location conditions in which are provided location conditions matching received location information from list content; and outputs the generated area-specific list content.

By this means, it is possible for content information relating to the present locality to be provided to a mobile terminal user, and content desired by a user to be distributed efficiently.

BRIEF DESCRIPTION OF DRAWINGS

FIG. 8 is a drawing showing an example of list content description using XML according to Embodiment 1;

FIG. 15 is a drawing showing processing contents of content processing according to Embodiment 1;

FIG. 23 is a drawing showing an example of a location condition list according to Embodiment 1;

FIG. 40 is a drawing showing processing contents of content processing according to Embodiment 2;

BEST MODE FOR CARRYING OUT THE INVENTION

Embodiment 1

A content adaptive distribution system according to Embodiment 1 of the present invention will be described below with reference to the accompanying drawings.

Figure 1:
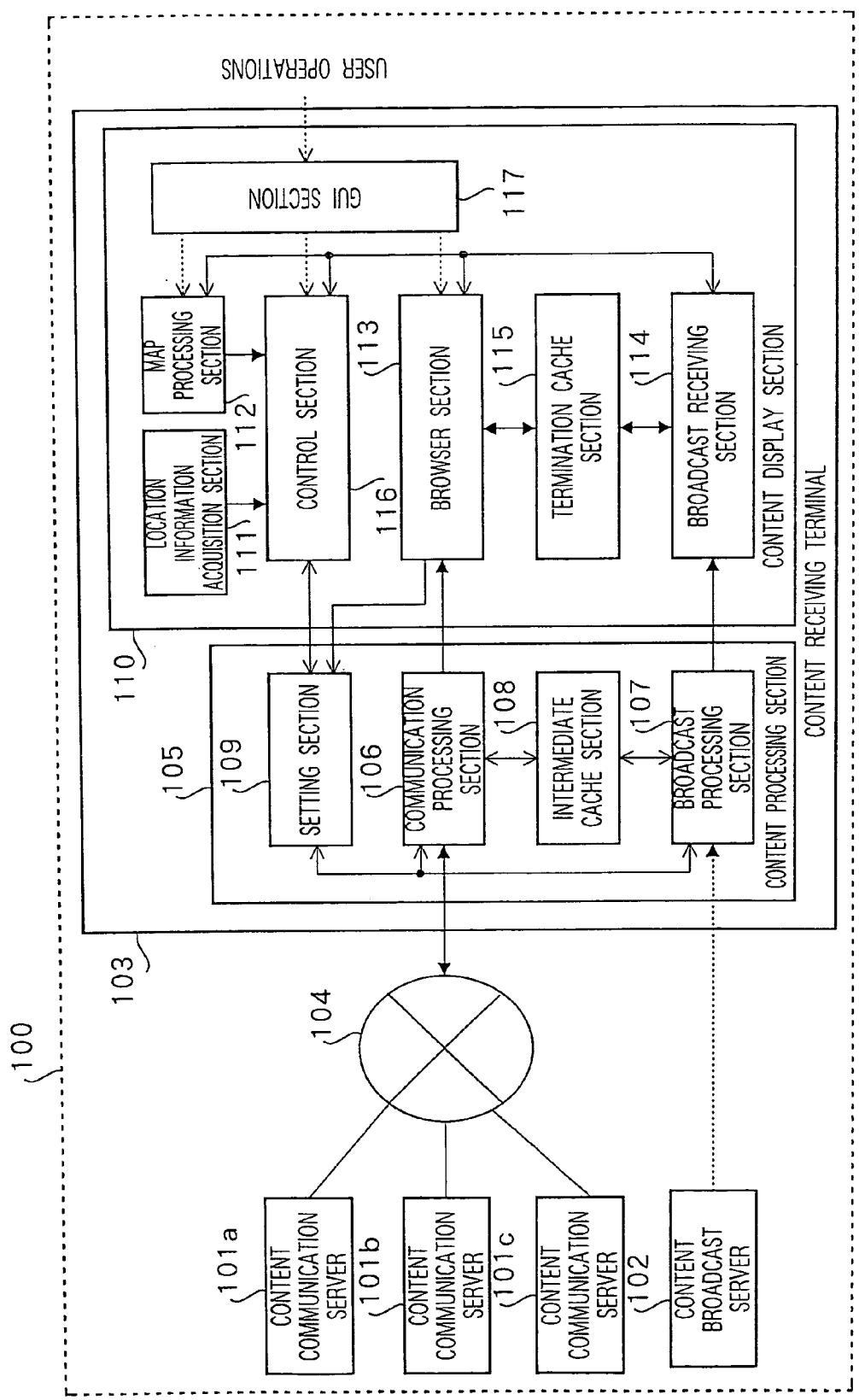
FIG. 1 is a system configuration diagram of a content adaptive distribution system according to Embodiment 1 of the present invention.

First, the configuration of a content adaptive distribution system according to Embodiment 1 will be described using FIG. 1. FIG. 1 is a system configuration diagram of a content adaptive distribution system according to Embodiment 1.

A content adaptive distribution system 100 according to Embodiment 1 is provided with a plurality of content communication servers 101a through 101c. Content communication servers 101a through 101c distribute content to client terminals that have a communication function, using an Internet protocol. Web servers (HTTP servers) on the Internet can be quoted as an actual example of content communication servers 101a through 101c. There is no limit to the number of content communication servers 101a through 101c.

Content adaptive distribution system 100 is provided with a content broadcast server 102. Content broadcast server 102 is a broadcasting station capable of performing general broadcasting to client terminals that have a broadcast reception function, and simultaneously performing content distribution by means of carousel-type data broadcasting. Content broadcast server 102 may use any broadcasting mode, such as satellite broadcasting by means of a broadcasting satellite or communication satellite, terrestrial digital broadcasting, or Internet broadcasting.

Content adaptive distribution system 100 is also provided with a content receiving terminal 103. Content receiving terminal 103 is a client terminal that has a function for receiving digital broadcasts and a function for accessing a communication network. Content receiving terminal 103 receives content from content broadcast server 102. Also, content receiving terminal 103 receives content sent from content communication servers 101a through 101c via a communication network 104. If content receiving terminal 103 is a terminal capable of moving, it is assumed that content receiving terminal 103 has a function for acquiring location information by means of GPS (Global Positioning System) or the like. In Embodiment 1, content receiving terminal 103 is any mobile terminal, such as a PDA (Personal Digital Assistant) or car navigation system.

Communication network 104 is a network that enables mutual communication between a content communication server 101 and content receiving terminal 103, and is any network, such as the Internet, a WAN (Wide Area Network), a LAN (Local Area Network), a radio network, or a network in which these are combined. However, if content receiving terminal 103 is a mobile terminal, the terminal-side termination network is a radio network.

Next, the internal configuration of content receiving terminal 103 will be described.

Content receiving terminal 103 is a client terminal capable of displaying content that has a relationship to geographical location information—that is, location-dependent content—efficiently. For example, content receiving terminal 103 enables Web content related to the user's present locality to be viewed efficiently using location information obtained by means of GPS or the like. Content receiving terminal 103 comprises a content processing section 105 and a content display section 110.

Here, location-dependent content means content that has geographical location information or a geographical distribution range. Examples of location-dependent content are Web site of a store that has location information (latitude/longitude or address), and content such as traffic information, weather information, and advertising with a limited distribution area, are examples of location-dependent content.

In response to content received from content broadcast server 102 or content communication servers 101a through 101c, content processing section 105 references location information received from content display section 110 and carries out content adaptation processing. Then content processing section 105 transmits content that has undergone adaptive processing to content display section 110. Content processing section 105 contains a communication processing section 106, broadcast processing section 107, intermediate cache section 108, and setting section 109. A detailed description of content adaptation processing will be given later herein.

In response to content received from content communication servers 101a through 101c, communication processing section 106 references location information received from content display section 110 and carries out content adaptation processing, then transmits content that has undergone adaptive processing to content display section 110. Also, if the content to be distributed is HTML content, communication processing section 106 acts as an HTTP proxy. That is to say, communication processing section 106 performs HTTP relay processing between a browser section 113 and content communication servers 101.

Broadcast processing section 107 performs content adaptation processing on content received from content broadcast server 102 in accordance with directions from setting section 109. Then broadcast processing section 107 transmits content that has undergone adaptive processing to content display section 110. In the case of content that does not require content adaptation processing, broadcast processing section 107 transmits the received content directly to content display section 110.

Intermediate cache section 108 is a cache that temporarily stores content received from communication processing section 106 and broadcast processing section 107, and comprises memory or a hard disk. For example, content subject to content adaptation processing or content received from a broadcast is temporarily stored in intermediate cache section 108, and is transmitted to content display section 110 after undergoing predetermined processing.

Setting section 109 has a function as a relay control section that controls communication processing section 106 and broadcast processing section 107 in accordance with control instructions from content display section 110. Setting section 109 reports location information to communication processing section 106, and reports location information and information required for broadcast reception, such as the reception channel, to broadcast processing section 107. Details of the location information output to communication processing section 106 and broadcast processing section 107 will be given later herein.

Content display section 110 outputs control instructions to setting section 109 in accordance with user operations, and receives and displays content sent from content processing section 105. Content display section 110 contains a location information acquisition section 111, map processing section 112, browser section 113, broadcast receiving section 114, termination cache section 115, control section 116, and GUI section 117.

Location information acquisition section 111 acquires location information (latitude and longitude coordinate values) by means of GPS or the like, and outputs the acquired location information to control section 116.

Map processing section 112 has functions possessed by a general map display application, such as map drawing, map display area changing/enlargement/reduction, and map retrieval, for example. This map processing section 112 is used to display the present locality of content receiving terminal 103, or for retrieval of an arbitrary location (ex: a target position) by the user. If content receiving terminal 103 does not require a map display function, map processing section 112 is an unnecessary configuration element.

Browser section 113 displays content in accordance with user operations, and in Embodiment 1 is a typical Web browser (HTML browser). If the content distribution system in FIG. 1 distributes content written in other markup languages such as BML (Broadcasting Markup Language), browser section 113 is assumed to have functions for displaying content written in those markup languages. Browser section 113 outputs a content distribution related message (that is, an HTTP message) to content processing section 105, and receives HTML content in response.

Broadcast receiving section 114 receives content from broadcast processing section 107 of content processing section 105. Content broadcast server 102 transmits content to broadcast processing section 107 by means of broadcasting, but content need not necessarily be exchanged between broadcast processing section 107 and broadcast receiving section 114 by means of broadcasting. When broadcast processing section 107 transmits content by means of carousel-type data broadcasting, broadcast receiving section 114 receives data of a reception channel specified by control section 116, and outputs content contained therein to termination cache section 115. At the same time, broadcast receiving section 114 reports information relating to the content output to termination cache section 115—such as a file name, for example—to control section 116.

Content stored in termination cache section 115 by broadcast receiving section 114 can be displayed by browser section 113. If broadcast processing section 107 distributes content by means of a method other than carousel-type data broadcasting, broadcast receiving section 114 is assumed to have a content reception function compatible with the content distribution method of broadcast processing section 107 in addition to a broadcast reception function.

Termination cache section 115 has a function for temporarily storing content output by broadcast receiving section 114, and a function for caching content displayed by browser section 113.

Control section 116 performs overall control of content display section 110. The main function of control section 116 is to report location information obtained from location information acquisition section 111 to setting section 109 of content processing section 105. Control section 116 also has a function for ordering access to content that has an arbitrary URL, and a function for ordering browser section 113 to display content stored in termination cache section 115.

GUI section 117 is a GUI (Graphical User Interface) for acquiring directions from a user relating to content viewing, map display, or map retrieval. GUI section 117 also includes a GUI for user control of content display section 110 and content processing section 105.

Additional information is given here concerning content distribution systems combining broadcasting and communication. Content distribution system 200 in FIG. 2 has a configuration that lacks content processing section 105 and broadcast receiving section 114 of content adaptive distribution system 100 in FIG. 1, and performs content distribution using only communication.

Figure 2:
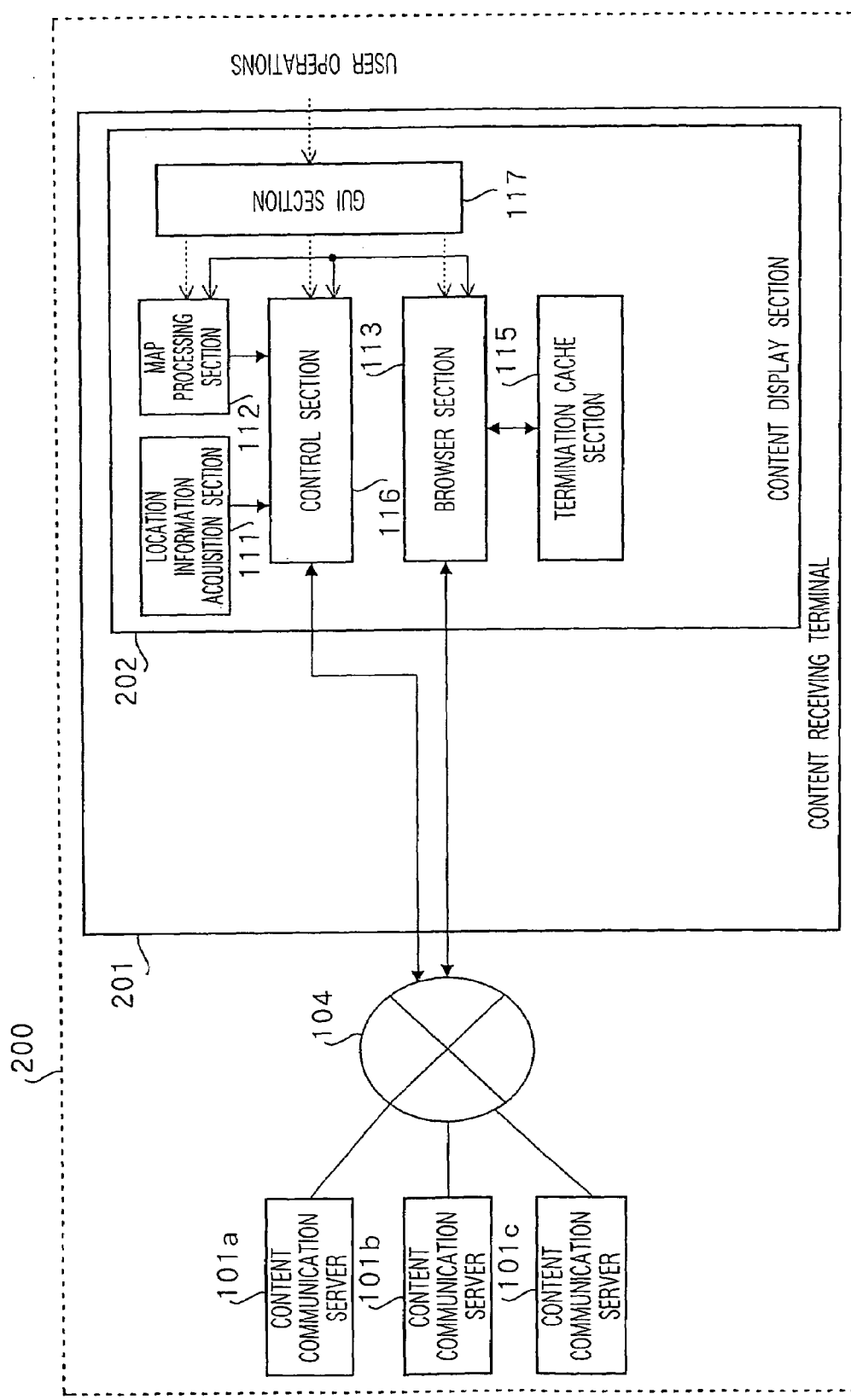
FIG. 2 is a system configuration diagram showing a reference example of a content adaptive distribution system comprising only a communication network.

When a location information service is implemented using content distribution system 200 in FIG. 2, location information is reported from a content receiving terminal 201 to content communication servers 101. In response to this, on the content communication server 101, information relating to the present locality of content receiving terminal 201 is selected, and this is distributed to content receiving terminal 201. Therefore, if there are a very large number of content receiving terminals 201, the load on content communication servers 101 is high.

Figure 3:
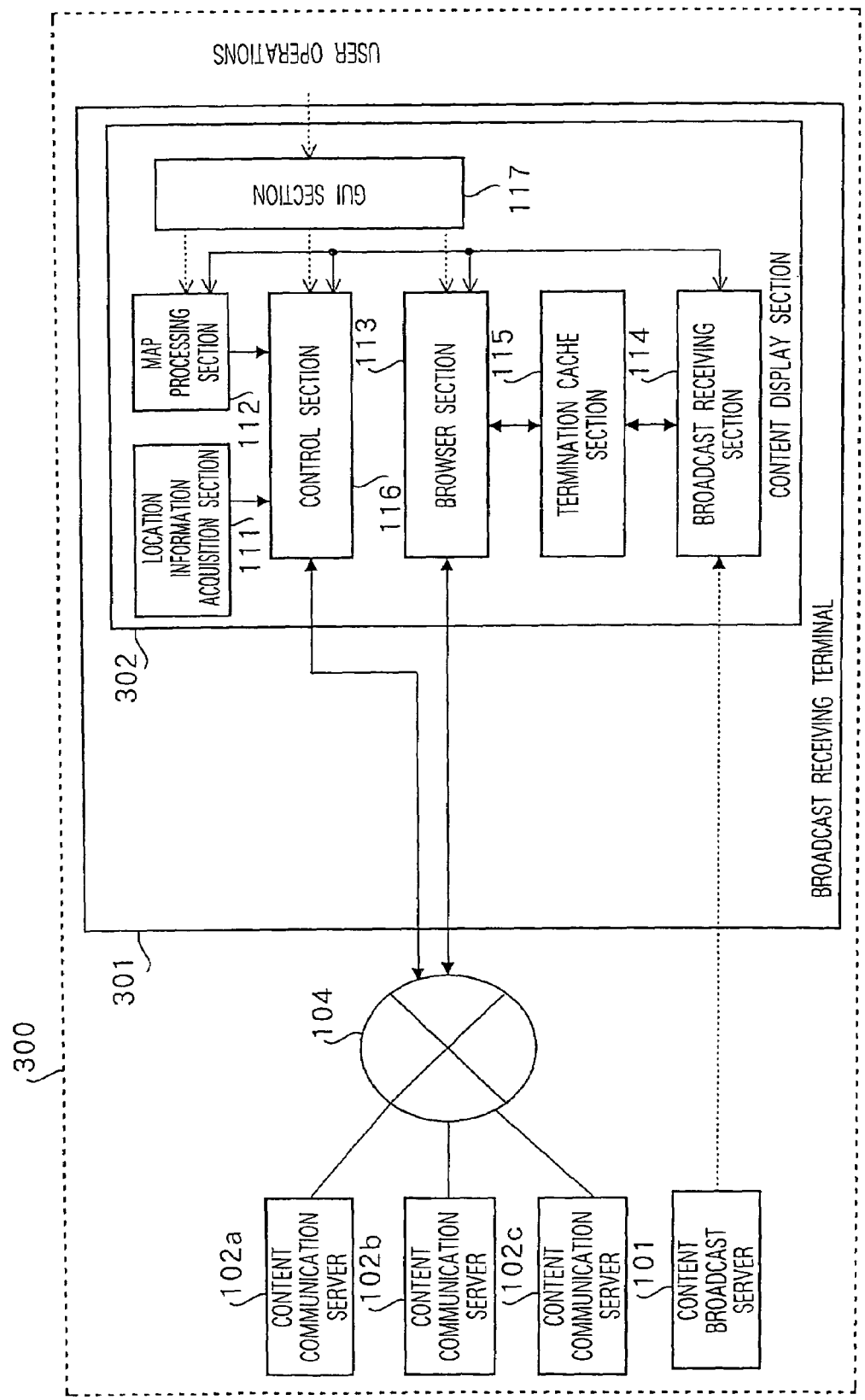
FIG. 3 is a system configuration diagram showing a reference example of a content adaptive distribution system comprising a communication network and broadcast network.

Content distribution system 300 in FIG. 3 has a configuration that lacks content processing section 105 of content adaptive distribution system 100 in FIG. 1.

This content distribution system 300 can perform content distribution using broadcasting or communication, but as with content distribution system 200 in FIG. 2, when a location information service is implemented, it is necessary for location information to be reported from a content receiving terminal 301 to content communication servers 101.

Content distribution system 300 in FIG. 3 has configuration elements necessary for content distribution combining broadcasting and communication. However, in order to actually execute content distribution combining broadcasting and communication, it is necessary to stipulate not only the system configuration but also the contents of content to be distributed by means of broadcasting.

In contrast to this, content adaptive distribution system 100 in FIG. 1 performs content transmission and reception by means of broadcasting and communication, and content adaptation processing is performed based on location information in content processing section 105 provided on the terminal side.

Also, as described later herein, in content adaptive distribution system 100 in FIG. 1, content distribution combining broadcasting and communication is implemented by describing the content communication server reference destination (access method) in content distributed from content broadcast server 102.

Therefore, content receiving terminal 103 does not need to report location information to the server side.

Next, the operation of content adaptive distribution system 100 will be described in outline. Content adaptive distribution system 100 is a system for the distribution and viewing of content relating to the present locality of a user or the target locality of a user. Here, an example will be described in which content relating to the user's present locality is distributed from a server to a user terminal.

Figure 4:
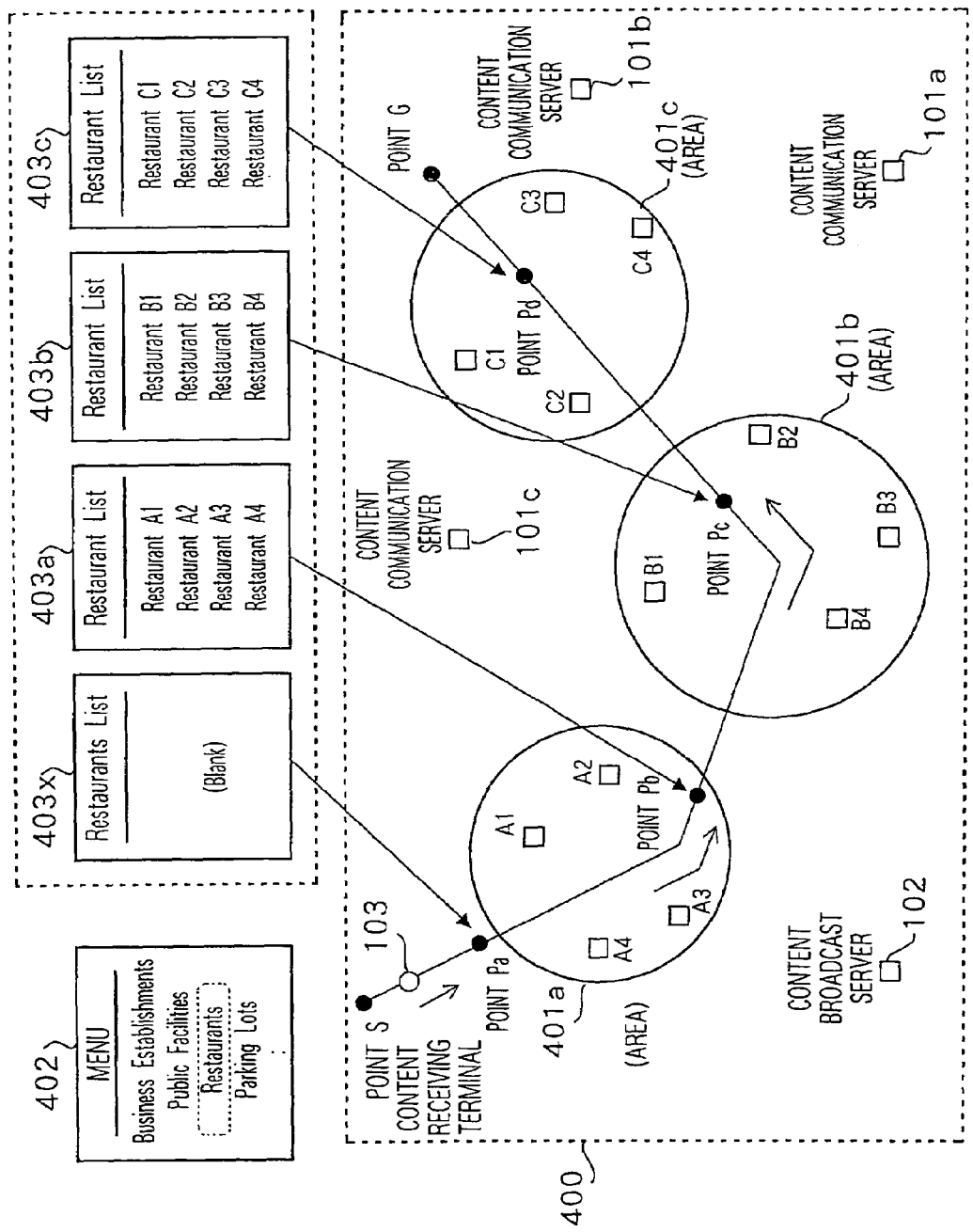
FIG. 4 is a drawing showing an example of location-dependent content arrangement in geographical space and content provided to terminals according to Embodiment 1.

First, the arrangement of location-dependent content in geographical space will be described. FIG. 4 is a drawing showing an example of location-dependent content arrangement in geographical space and content provided to terminals according to Embodiment 1.

In area 400 in FIG. 4, three circular areas 401a through 401c are set. Each of areas 401a through 401c has the latitude coordinate and longitude coordinate of the center of its circle, and the radius of the circle, as parameters.

In each of areas 401a through 401c, there are four restaurants A1 through A4, B1 through B4, and C1 through C4, respectively, each of which has a Website providing information about the restaurant. The geographical location of a restaurant need not coincide with the geographical location of the restaurant's Website. In other words, the Website of each restaurant need not exist at the location of that restaurant in FIG. 4, but may exist elsewhere.

Each of restaurants A1 through A4, B1 through B4, and C1 through C4, has latitude and longitude information, an address, or the like, as actual restaurant location information. Also, the Website of each restaurant has a URL (Uniform Resource Locator) that can be accessed via the Internet, enabling Website content to be viewed from any terminal.

Information (metadata) relating to the Website of each restaurant is distributed to content receiving terminal 103 by content broadcast server 102 by means of broadcasting, and by content communication servers 101a through 101c by means of communication. In FIG. 4, there is one content broadcast server 102 and there are three content communication servers 101a through 101c, but there may be any number of both.

The operation of content adaptive distribution system 100 will now be described in detail. For the sake of explanation, the following center coordinates and radii will be assumed for the three areas 401a through 401c in FIG. 4: area 401a: center coordinates (N35.37.44.16/E139.41.23.157), radius=600 m; area 401b: center coordinates (N35.37.30.160/E139.40.41.109), radius=600 m; area 401c: center coordinates (N35.37.56.24/E139.40.4.86), radius=600 m.

Content receiving terminal 103 is assumed to be a mobile terminal, and to move along the polygonal line from starting point S to endpoint G in FIG. 4. At this time, the user looks for content relating to restaurants in the present locality on the Internet, using browser section 113 of content receiving terminal 103.

First, the operation of content receiving terminal 103 when content is viewed will be described. Content receiving terminal 103 receives menu content from content broadcast server 102 in broadcast processing section 107, and outputs this to broadcast receiving section 114. Menu content is a list of categories of content that can be viewed by the user. Broadcast receiving section 114 stores the received menu content in termination cache section 115. Then browser section 113 displays the menu content stored in browser section 113.

Figure 5:
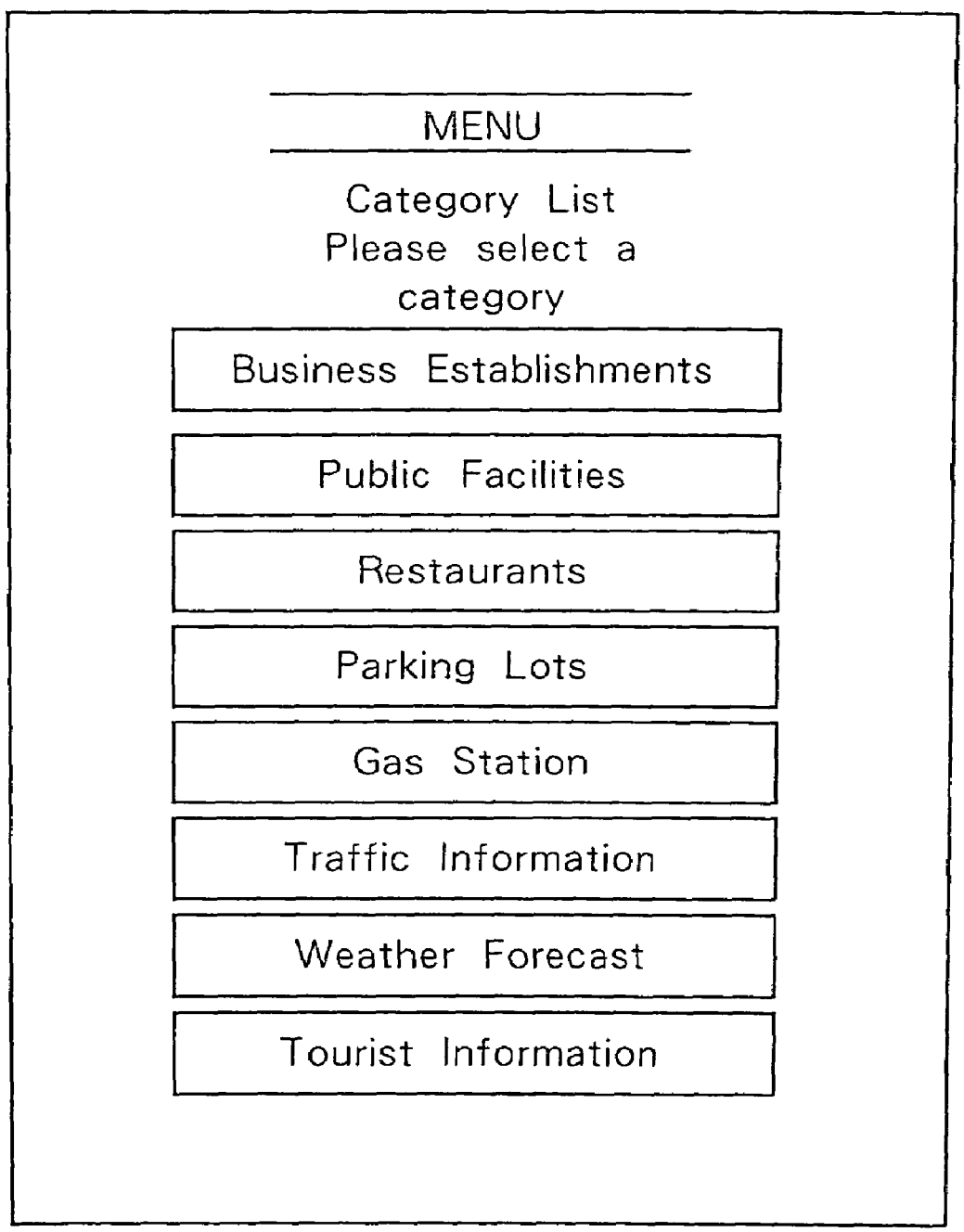
FIG. 5 is a drawing showing an example of menu content according to Embodiment 1.

FIG. 5 shows an example of menu content. In this menu content 500, "Business Establishments", "Public Facilities", "Restaurants", "Parking Lots", "Gas Stations", "Traffic Information", "Weather Forecast", and "Tourist Information" are offered as categories of content that can be viewed. The user can select the content he or she wishes to view from menu content 500.

When the user selects a category (here assumed to be "Restaurants") from menu content 500, a message requesting list content containing information relating to restaurants is transmitted from content receiving terminal 103 to content communication servers 101a through 101c. Here, list content is a list of information (URLs, location information, etc.) relating to content belonging to a specific category, compiled on an area-by-area basis.

Content receiving terminal 103 receives list content sent from content communication servers 101 in communication processing section 106, and outputs list content on which content adaptation processing has been performed to browser section 113.

Here, content adaptation processing is processing that generates list content of a specific area from the received list content. As a result of performing this content adaptation processing, a content list relating to restaurants limited to the present locality of the user is displayed by browser section 113.

Figure 6:
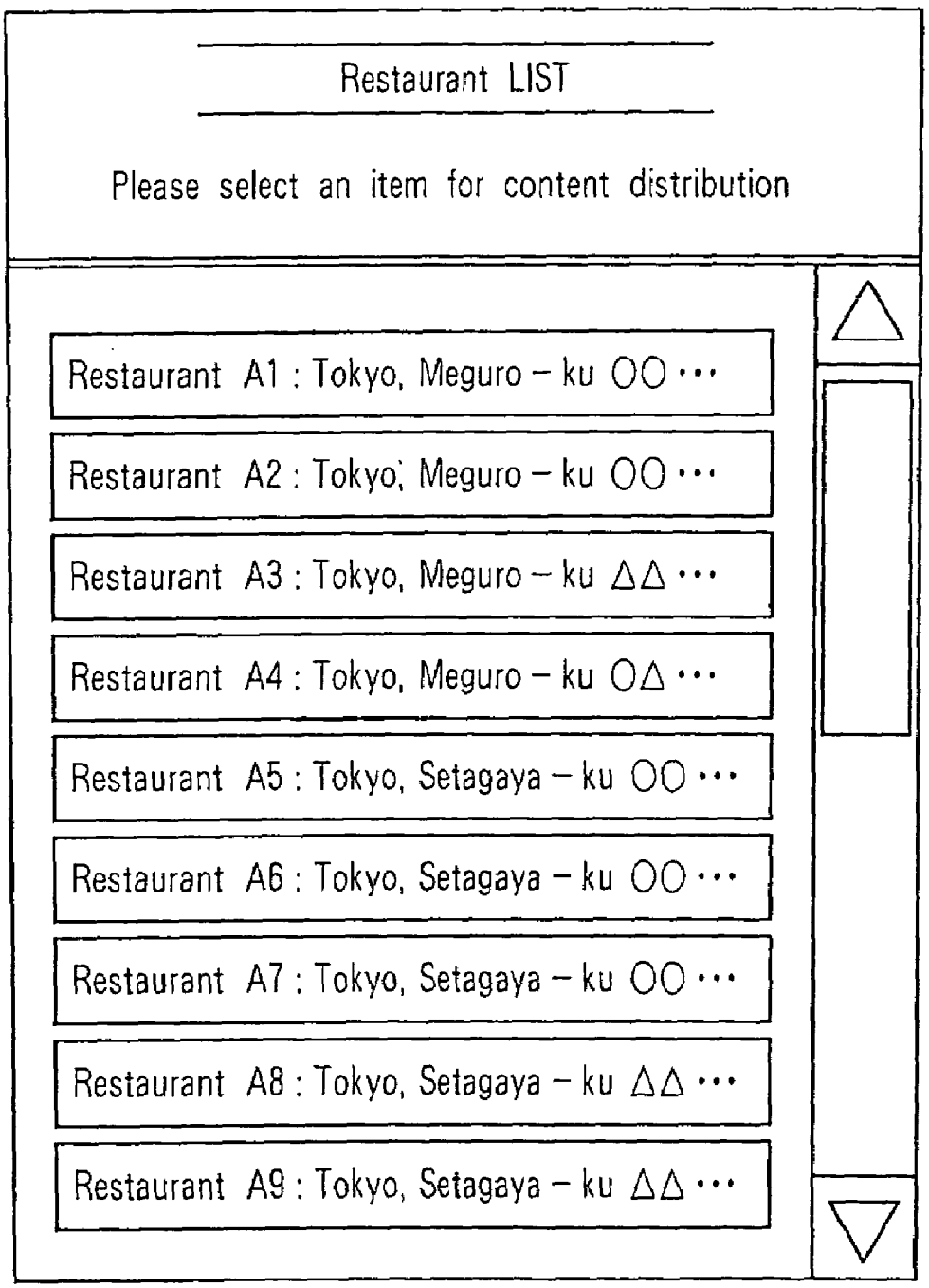
FIG. 6 is a drawing showing an example of list content according to Embodiment 1.

FIG. 6 shows an example of list content. This list content 600 lists names and addresses of restaurants, and contains the Website URL of each restaurant. The user can select the restaurant whose details he or she wishes to view from list content 600.

When the user selects a restaurant from list content 600, content receiving terminal 103 accesses the Website indicated by the URL of the selected restaurant, and displays content of that restaurant in content display section 110.

The above description shows the process from retrieval of the URL of a Website whose content a user wishes to view by referencing in order menu content 500 distributed by broadcasting and list content 600 obtained by means of communication, up until content of that Website is displayed.

Content adaptive distribution system 100 according to Embodiment 1 provides list content adapted to a user's present locality. That is to say, list content provided to a user can be updated automatically in accordance with movement of the user.

Next, the way in which list content is updated in accordance with movement of content receiving terminal 103 will be described, referring to FIG. 4.

The three areas 401a through 401c in FIG. 4 show content provision ranges (distribution ranges). That is to say, content communication servers 101 distribute list content relating to areas 401a through 401c only when content receiving terminal 103 is in an area 401a through 401c.

First, when the user of content receiving terminal 103 selects "Restaurants" from menu content 402 received from a content broadcast server at starting point S, restaurant related list content is displayed by the browser section of content receiving terminal 103.

Starting point S is outside the three areas 401a through 401c containing content. This means that viewable content is not present in the user's present locality. Therefore, list content 403x, in which the restaurant information area is blank, is displayed by browser section 113 of content receiving terminal 103.

Then, when the user moves along the movement path and enters area 401a, as there are four restaurants A1 through A4 in area 401a, list content 403a including restaurants A1 through A4 situated in area 401a is displayed by browser section 113 of content receiving terminal 103.

Furthermore, when the user moves along the movement path and enters area 401b, list content 403b including restaurants B1 through B4 situated in area 401b is displayed by browser section 113.

As described above, list content 403 is automatically updated as content receiving terminal 103 moves. By this means, it is possible for the user to select content relating to his or her present locality, and view that content, efficiently.

The content adaptive distribution method according to Embodiment 1 is described in detail below.

First, list content according to Embodiment 1 will be described using FIG. 7 through FIG. 12.

Figure 7:
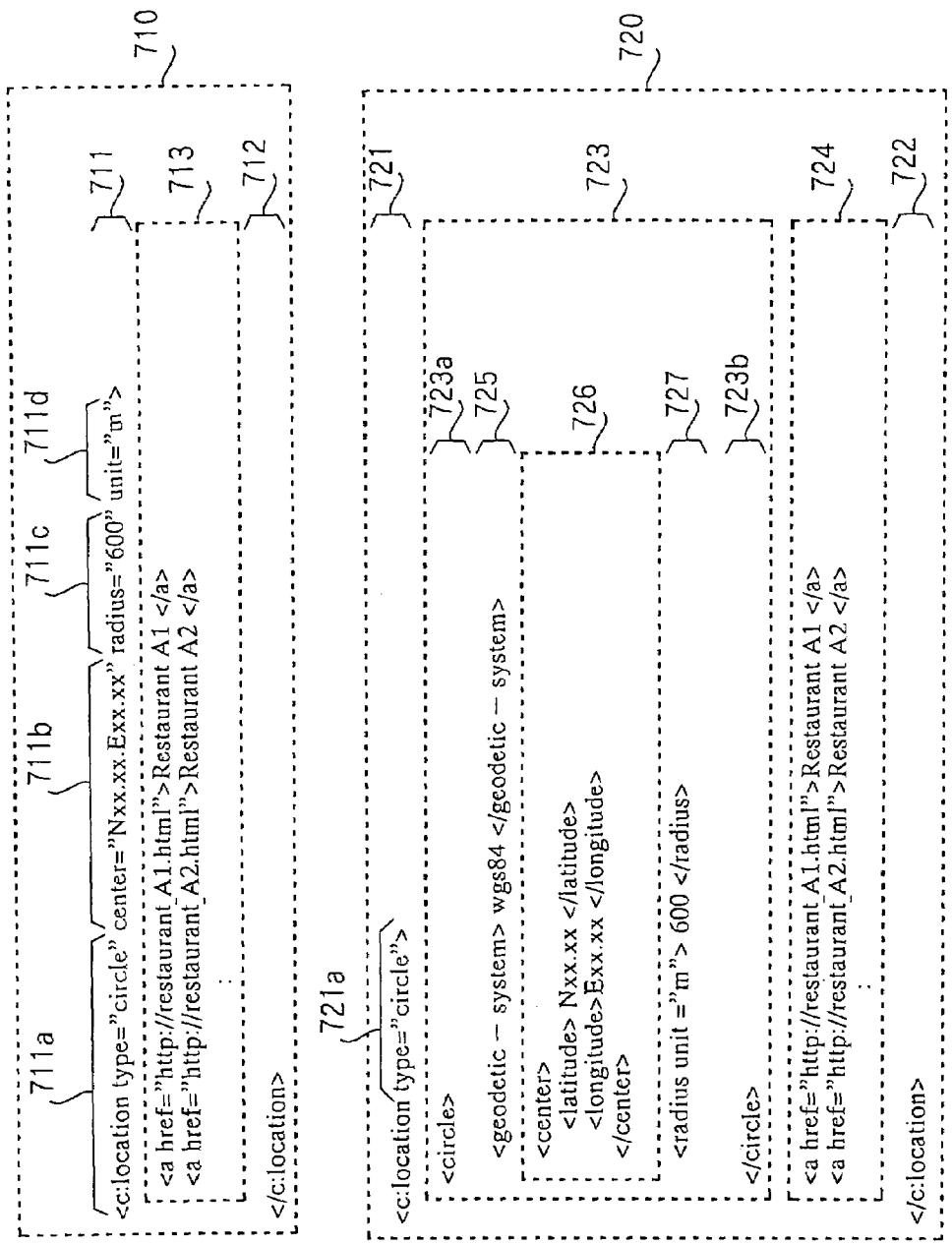
FIG. 7 is a drawing showing examples of location information description using XML according to Embodiment 1.

FIG. 7 and FIG. 8 show an example of location condition description and an example of list content description written in XML-compliant description language according to Embodiment 1. The description language shown in FIG. 7 and FIG. 8 is hereinafter referred to as CAML (Contents Adaptation Markup Language).

CAML is a markup language for describing conditions relating to location information. CAML is used to generate HTML content adapted to content receiving terminal 103 location conditions from composite content (hereinafter referred to as "CAML content") that combines CAML location condition description and HTML content.

Content that is combined with CAML may be, not HTML content, but any content that can be displayed by content receiving terminal 103, such as BML content, for example.

Here, only a caml element and location element are stipulated as CAML language specifications. An explanation of caml and location elements is given below.

A caml element is a CAML root element, and must always be written. A caml element has no attribute, and its contents include only text data and a location element describing location conditions.

A location element is an element for describing location conditions, and stipulates location conditions by means of a combination of attributes and attribute values. It is also possible for only text data to be included in location element contents.

FIG. 7 is a drawing showing examples of location condition description methods using location elements. Two kinds of description method are shown here. The first description example 710 in FIG. 7 will be described first.

In description example 710 in FIG. 7, location element 711 has four attributes: a type attribute 711a, center attribute 711b, radius attribute 711c, and unit attribute 711d.

The type attribute 711a shows the location information description method. In description example 710 in FIG. 7, this location information indicates "circle"—that is, a circular area.

In Embodiment 1, it is sufficient to be able to define a geographical area by means of location element 711, and therefore "circle" only is defined as type attribute 711a. However, a rectangle or polygon, or a zip-code, address, or the like, may be defined as type attribute 711a as well as "circle".

When type attribute 711a is "circle", location element 711 also has center attribute 711b, radius attribute 711c, and unit attribute 711d as attributes.

The center attribute 711b indicates the latitude and longitude coordinates of the center of a circular area, radius attribute 711c indicates the radius of the circular area, and unit attribute 711d indicates the unit of the radius of the circular area. That is to say, the concrete parameters of a circular area are stipulated by these three attributes.

In description example 710 in FIG. 7, part 713 enclosed by location element start tag <location> 711 and location end tag </location> 712 is the part corresponding to a content list, and is written in HTML.

The second description example 720 in FIG. 7 will now be described. In this example, location element 721 has only type attribute 721a as an attribute. This type attribute 721a shows the location information description method (in the same way as in description example 710). In description example 720, this location information indicates "circle"—that is, a circular area.

In description example 720, circular area parameters are written in the part enclosed by <circle> 723a and </circle> 723b. Specifically, circular area parameters are described by means of three kinds of sub-elements of the location element. A geodetic-system element 725 shows the latitude and longitude coordinate notation method. A center element 726 shows the circular area center coordinates, and has a latitude element and longitude element as sub-elements that describe latitude and longitude coordinate values. A radius element 727 shows the radius of the circular area, and the radius unit is stipulated by a unit attribute.

In description example 720 in FIG. 7, part 724 following the circle end tag in the location element is the part corresponding to a content list, and is written in HTML.

There are various location condition description method variations apart from the examples shown in FIG. 7. In Embodiment 1, CAML content location conditions will be described using the method shown in description example 710.

Next, the content shown in FIG. 8 will be described. CAML content 800 in FIG. 8 is an example of list content written in CAML, in which three circular areas are defined by means of location elements. This list content lists content relating to a wide area comprising a plurality of local areas (narrow areas).

CAML content 800 will now be explained in detail. CAML content 800 has three location elements 803a through 803c enclosed by location start tags 806a through 806c and location end tags 808a through 808c. In location start tags 806a through 806c, circular area center coordinates and radii are stipulated by means of attributes. In these location elements 803a through 803c, lists organized by location conditions 807a through 807c are written. The lists organized by location conditions referred to here list reference information (URL or URI) for location-dependent content belonging to the same area geographically, and are written in HTML.

The parts corresponding to reference numerals 802 and 804 in FIG. 8 are parts forming HTML content. The three location elements 803a through 803c and HTML parts 802 and 804 are enclosed by a caml start tag 801 and caml end tag 805.

Content that describes a list of location-dependent content on an area-by-area basis will hereinafter be referred to as CAML list content.

CAML list content 800 is intermediate content for generating HTML list content adapted to location conditions, and HTML content component elements are written beforehand within caml elements. That is to say, CAML list content itself is not displayed directly by a browser, but rather, HTML list content generated from CAML list content is displayed by a browser.

Content processing section 105 of content receiving terminal 103 carries out the following kind of processing when CAML list content such as that shown in FIG. 8 is received.

(1) Acquisition of location information such as present position or target position (2) Comparison of location information with location conditions stipulated by location start tag 806a through 806c attributes, and selection of a location element for which that location information is included in the area shown by those location conditions (3) Extraction of only the list organized by location conditions and HTML part included in the selected location element, and generation of HTML list content that can be displayed by browser section 113

In content receiving terminal 103, the task of generating HTML content from CAML list content 800 is handled by content processing section 105.

Communication processing section 106 and broadcast processing section 107 in content processing section 105 include a CAML analyzer that analyzes CAML, and perform location adaptive processing on CAML content while referring to location information reported from setting section 109.

The CAML analyzer interprets an HTML related element as text data. In location adaptive processing by content processing section 105, all CAML tags are removed from CAML content. Therefore, content output from content processing section 105 is HTML content.

FIG. 9 through FIG. 12 are drawings showing examples of HTML list content generated as a result of performing location adaptive processing on CAML list content 800 in FIG. 8. Location-dependent HTML list content generated from CAML list content will hereinafter also be referred to as area-specific list content. Area-specific list content in FIG. 9 through FIG. 12 corresponds respectively to list content 403x and 403a through 403c shown in FIG. 4. An additional explanation of the HTML list content in FIG. 9 through FIG. 12 is given below.

Figure 9:
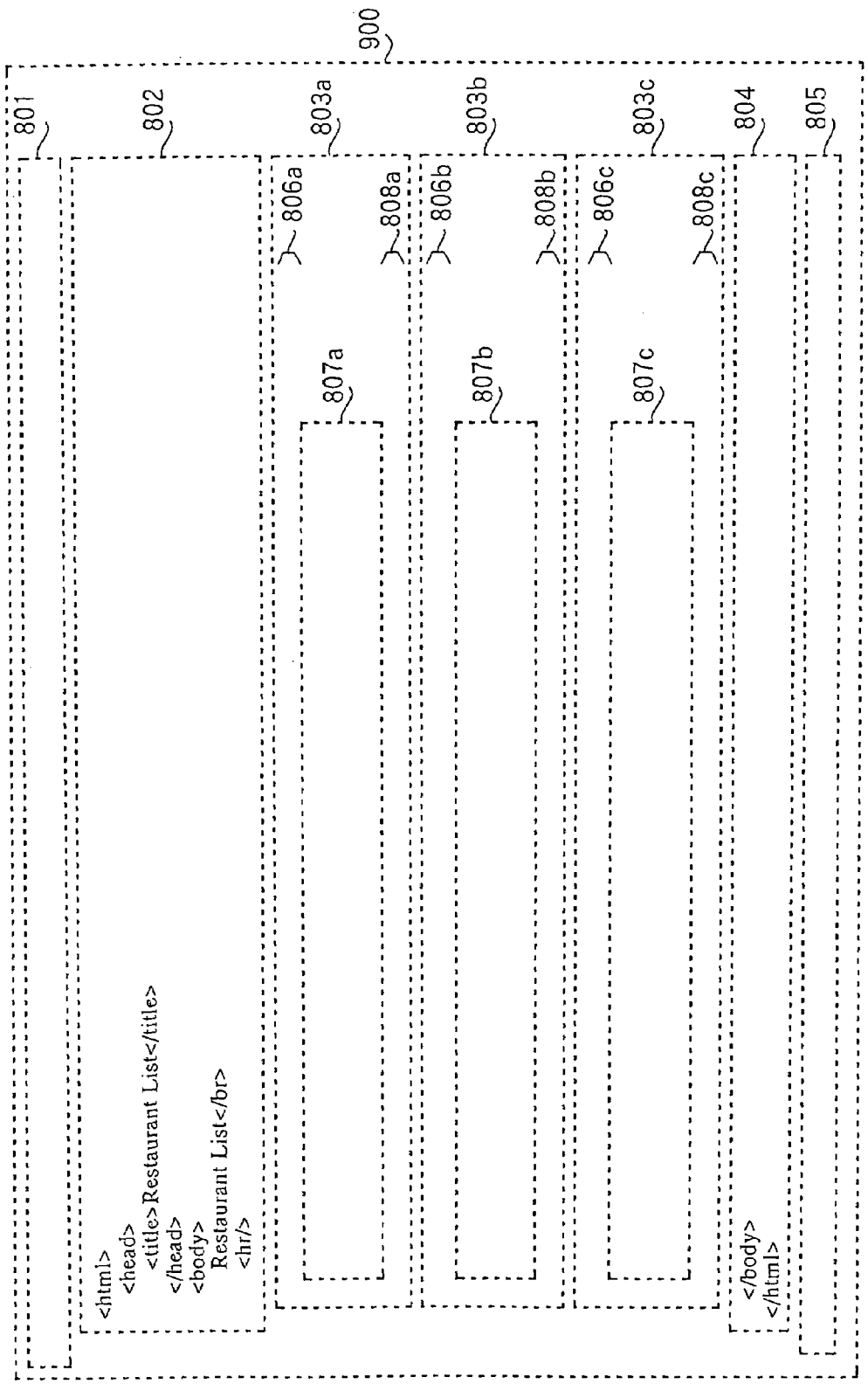
FIG. 9 is a first drawing showing an example of HTML list content description generated from XML content according to Embodiment 1.

Content 900 shown in FIG. 9 is HTML list content corresponding to a case where content receiving terminal 103 is located outside the three areas 401a through 401c in FIG. 4. By means of location adaptive processing by content processing section 105, caml elements 801 and 805, and location elements 803a through 803c, are deleted from CAML list content 800 in FIG. 8, and CAML list content 800 is converted to HTML content comprising only text data 802 and 804. As a result, blank list content 403x shown in FIG. 4 is displayed by content display section 110 of content receiving terminal 103.

Figure 10:
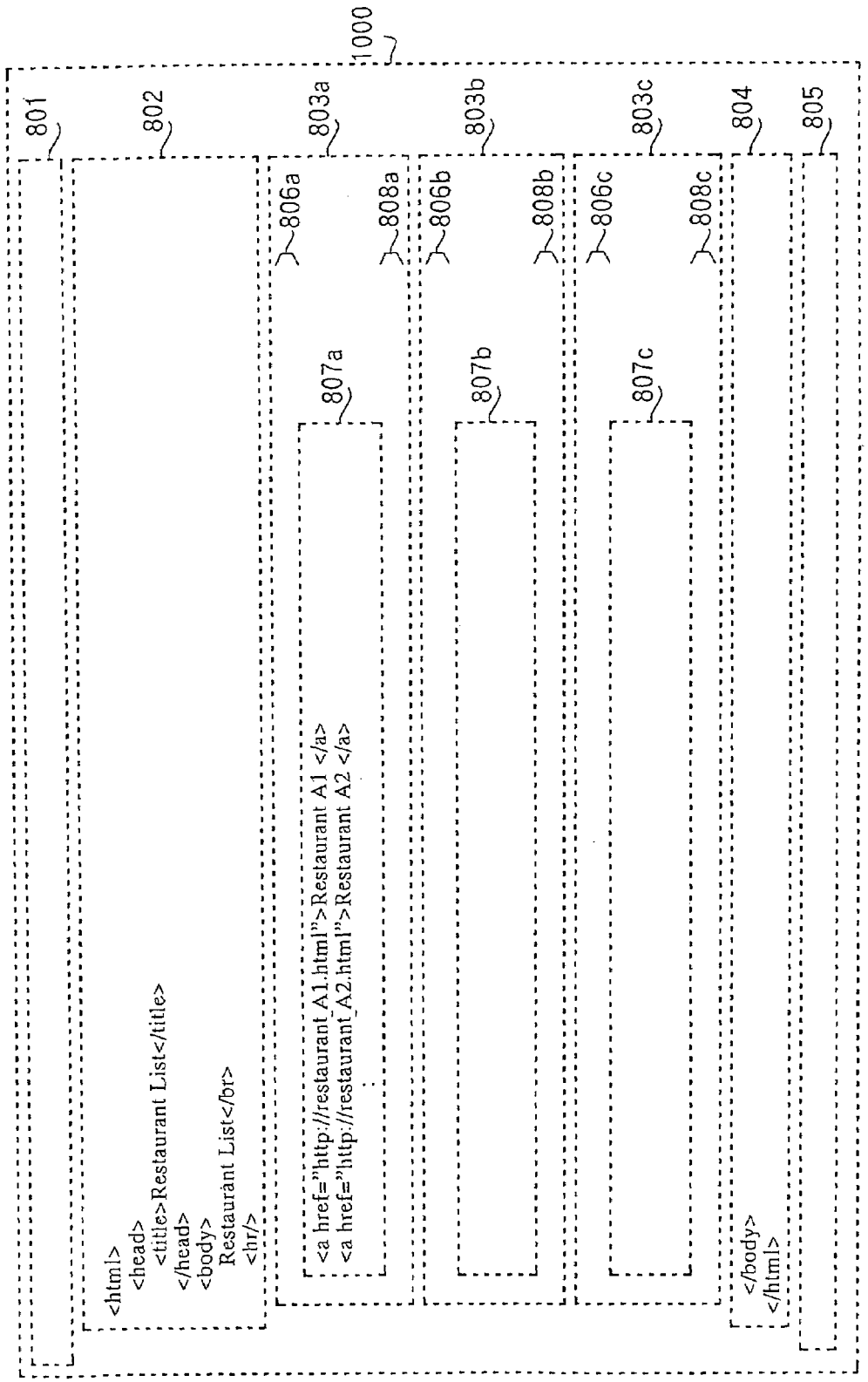
FIG. 10 is a second drawing showing an example of HTML list content description generated from XML content according to Embodiment 1.

Content 1000 shown in FIG. 10 is HTML list content corresponding to a case where content receiving terminal 103 is located within area 401a. By means of location adaptive processing by content processing section 105, caml elements 801 and 805, and location elements 803b and 803c, are deleted from CAML list content 800 in FIG. 8, and HTML content is generated. At this time, the location tags for location element 803a corresponding to area 401a are deleted, and only list organized by location conditions 807a enclosed by the location tags is selected. That is to say, CAML list content 800 is converted to HTML content 1000 comprising list organized by location conditions 807a. As a result, list content 403a listing restaurants in area 401a shown in FIG. 4 is displayed by content display section 110 of content receiving terminal 103.

Figure 11:
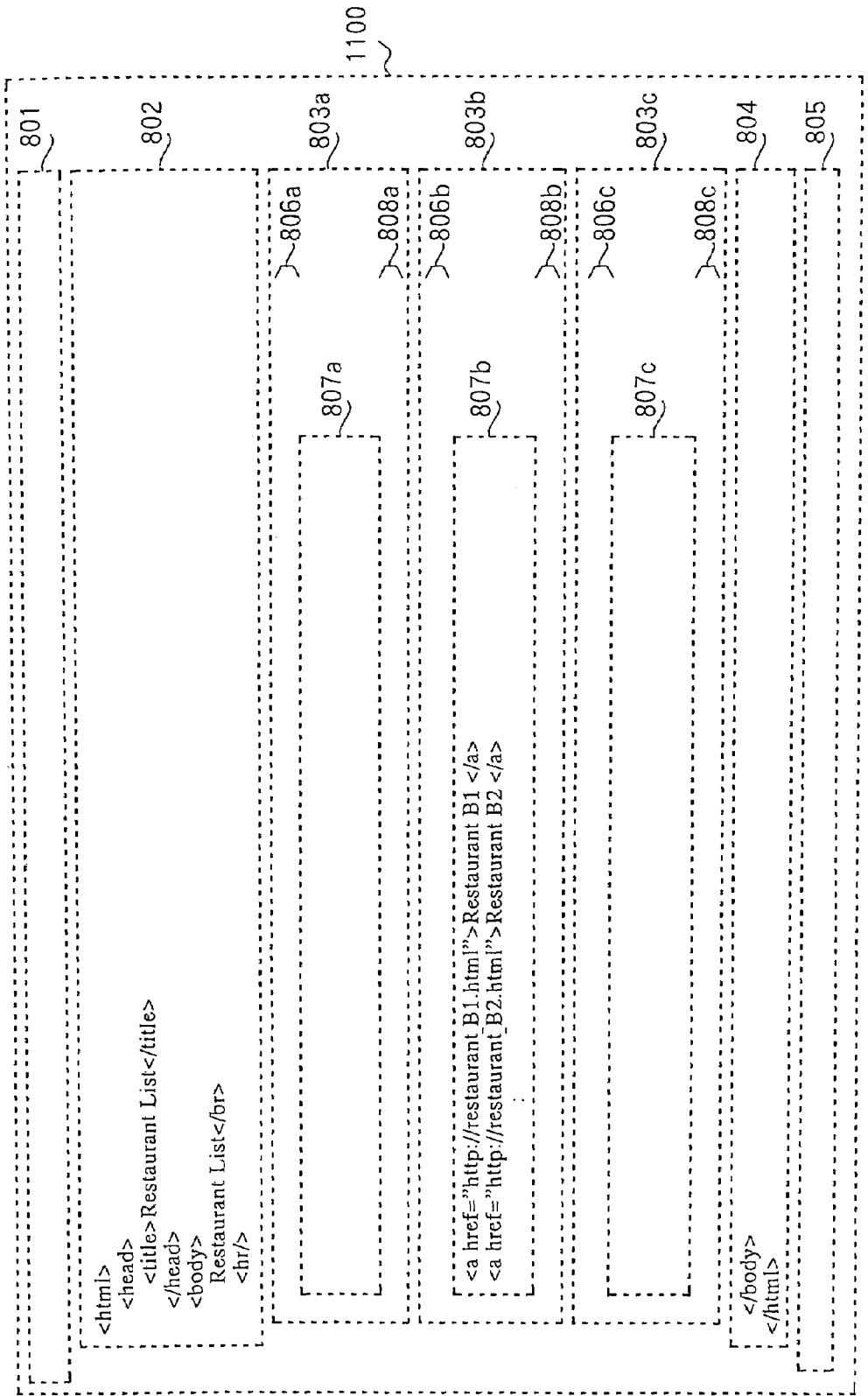
FIG. 11 is a third drawing showing an example of HTML list content description generated from XML content according to Embodiment 1.
Figure 12:
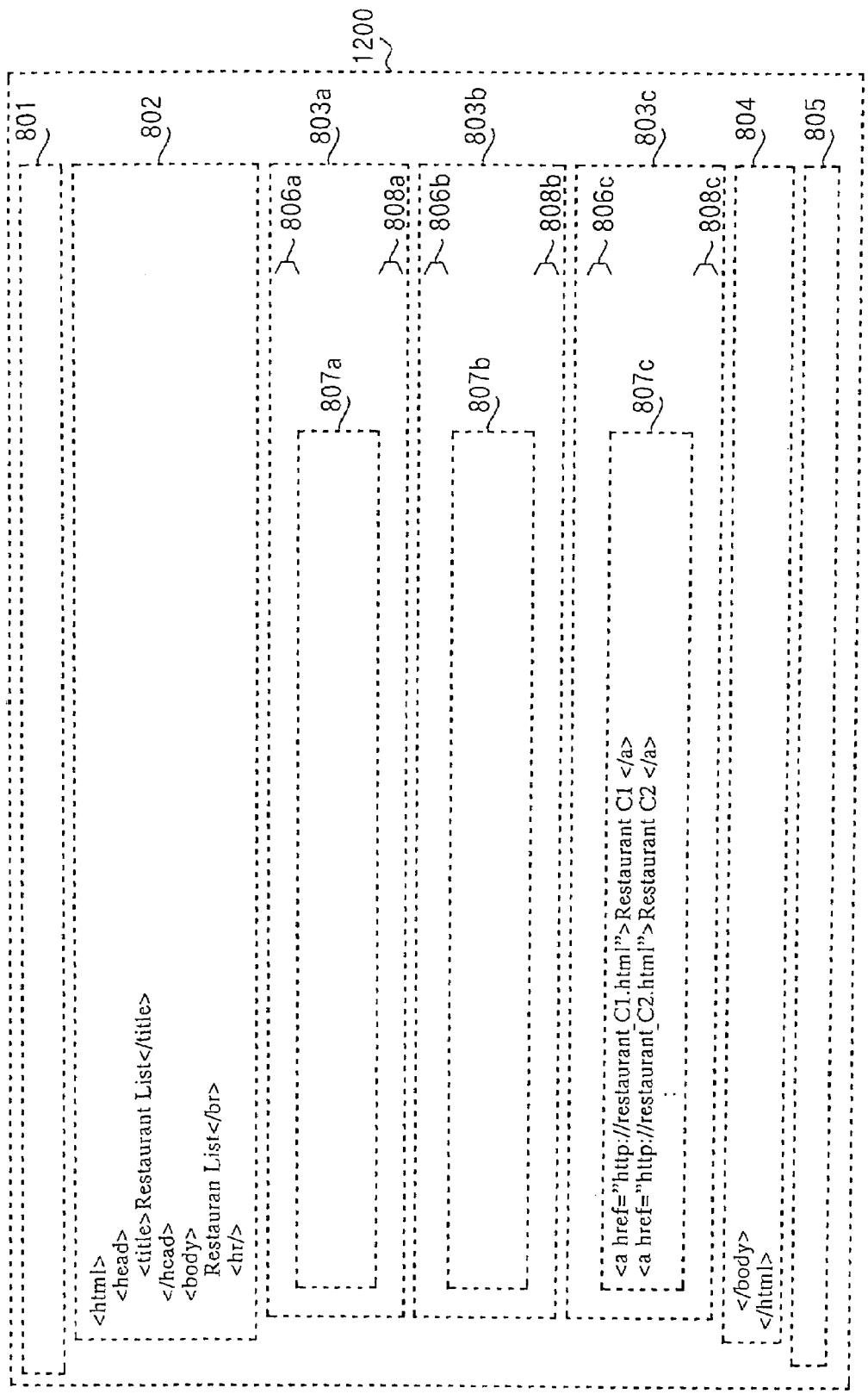
FIG. 12 is a fourth drawing showing an example of HTML list content description generated from XML content according to Embodiment 1.

Content 1100 shown in FIG. 11 and content 1200 shown in FIG. 12 are also content generated from the CAML content in FIG. 8 by means of location adaptive processing by content processing section 105, in the same way as the HTML content in FIG. 10.

Figure 13:
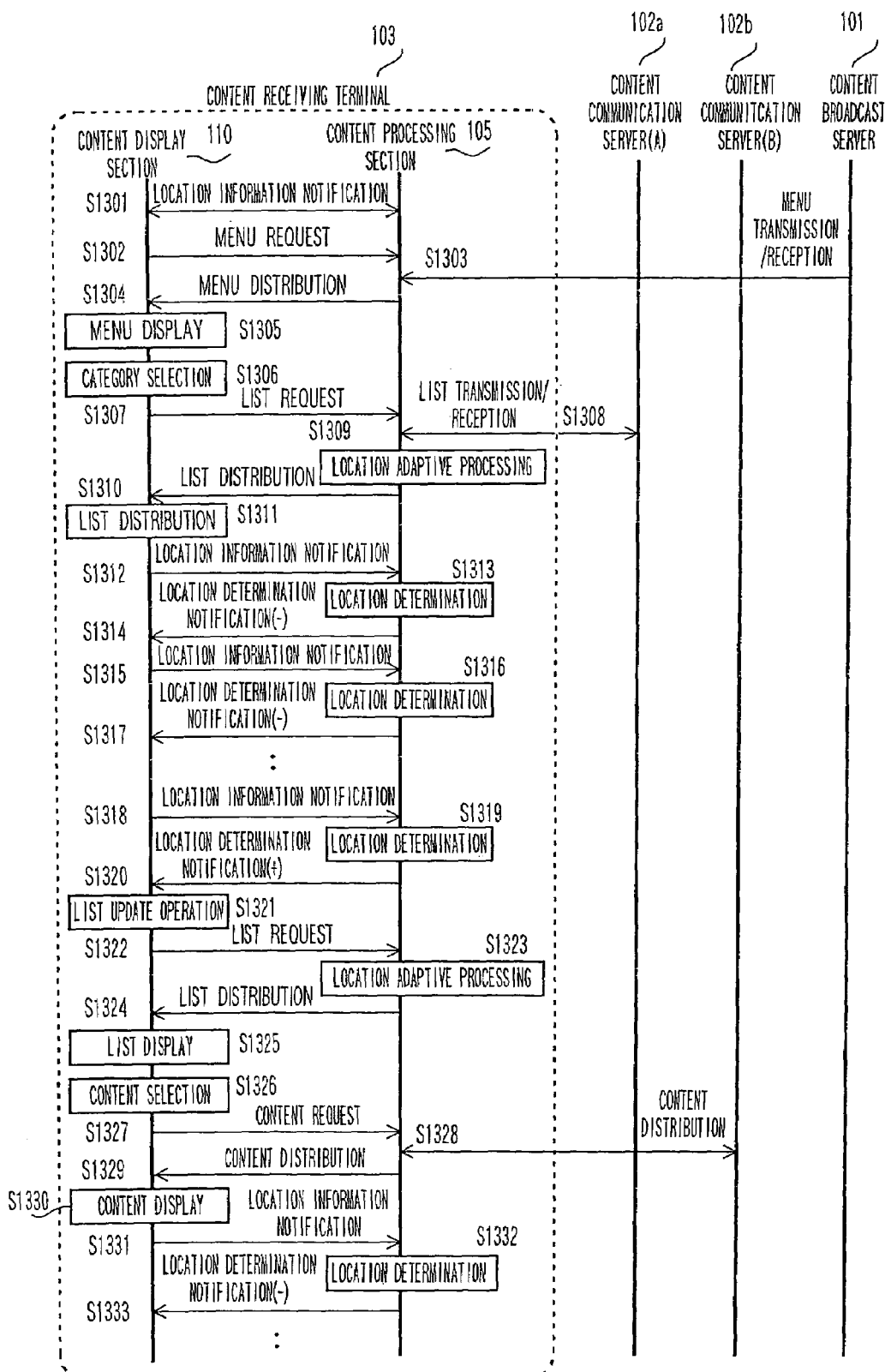
FIG. 13 is a sequence diagram of content adaptive distribution according to Embodiment 1.

Content adaptive distribution processing in content adaptive distribution system 100 according to Embodiment 1 will now be described using FIG. 13. FIG. 13 is a sequence diagram of content adaptive distribution in content adaptive distribution system 100 according to Embodiment 1. This diagram shows an example of the communication procedure between one content broadcast server 102, two content communication servers 101a and 101b, and one content receiving terminal 103.

It is assumed that the user of content receiving terminal 103, equipped with GPS and communication functions, moves along a movement path with location S in FIG. 4 as the initial location, and wishes to view content for the present locality while moving.

Control section 116 of content display section 110 reports location information (present location latitude and longitude information) acquired from location information acquisition section 111 to setting section 109 of content processing section 105. In response to this notification, setting section 109 returns a response to control section 116 (step S1301: hereinafter "step S" will be referred to simply as "S"). A protocol in which HTTP is partially extended is used for communication between setting section 109 and control section 116.

Control section 116 then reports a menu content acquisition request to setting section 109 (S1302). In Embodiment 1, menu content is distributed from content broadcast server 102. Therefore, the menu content acquisition request includes information necessary for broadcast reception (such as the reception channel and program information, for example).

Broadcast processing section 107 of content processing section 105 receives menu content from content broadcast server 102 in accordance with directions from setting section 109 (S1303). Distribution of this menu content is performed by means of carousel-type data broadcasting. Therefore, broadcast processing section 107 receives a plurality of content items comprising menu content, taking account of the data broadcasting repetition period, and temporarily stores received content in intermediate cache section 108. In the sequence in FIG. 13, this menu content is assumed to be HTML content.

Broadcast processing section 107 distributes received menu content to broadcast receiving section 114 of content display section 110 (S1304). Broadcast receiving section 114 stores menu content received from broadcast processing section 107 in termination cache section 115, and at the same time, reports information relating to the stored menu content (such as a file name) to control section 116.

Control section 116 then controls browser section 113 based on information acquired from broadcast receiving section 114. That is to say, control section 116 instructs browser section 113 to display the menu content stored in termination cache section 115. Browser section 113 reads the menu content file from termination cache section 115, and displays the menu content (S1305).

The kind of menu content indicated by reference numeral 500 in FIG. 5 is displayed by browser section 113. It is assumed here that the user selects "Restaurants" from this menu content 500 as the content category desired for distribution (S1306).

When the user selects a category, browser section 113 reports a list content acquisition request to setting section 109 in order to acquire list content corresponding to the selected category (S1307). The protocol used at this time is HTTP.

Setting section 109 analyzes the content acquisition request received from browser section 113, and gives an instruction for list content acquisition to communication processing section 106. Communication processing section 106 transmits an HTTP message to the appropriate server—content communication server 101a in the example in FIG. 13—and receives list content in response (S1308). The list content transmitted and received here is CAML list content 800 in FIG. 8. The acquired CAML content is held in intermediate cache section 108 until new CAML content acquisition is carried out.

Communication processing section 106 then performs location adaptive processing on the received CAML content, referring to the location information obtained in step S1301 (S1309).

It is assumed that, at this point, the user is located at starting point S in FIG. 4. In the location adaptive processing in step S1309, location condition determination processing is executed in which location information corresponding to starting point S is compared with the location conditions, and HTML content is generated from the CAML content. Here, location conditions comprise information written as attributes of location elements 806a through 806c in FIG. 8. As starting point S is outside the three areas in FIG. 4, and none of the location conditions is matched, the content generated in this step is empty-list HTML content 900 shown in FIG. 9.

In step S1309, also, communication processing section 106 extracts all location start tags from the list content in FIG. 8, and saves these as a location condition list. The results of location condition determination processing are also recorded in this location condition list.

Next, in response to the HTTP message (list content acquisition request) in step S1307, communication processing section 106 returns the HTML list content generated in step S1309 to browser section 113 (S1310).

Browser section 113 displays the HTML list content received from communication processing section 106 (S1311). When the HTML content in FIG. 8 is displayed, the restaurant list becomes blank as in list content 403x in FIG. 4.

Control section 116 acquires location information from location information acquisition section 111 at regular intervals and reports that location information to setting section 109, regardless of movement of the user (S1312). An HTTP-based protocol with added functional extensions is used for communication at this time.

Setting section 109 then reports newly received location information to communication processing section 106. Communication processing section 106 performs location determination processing, referring to the new location information (S1313). In this location determination processing, CAML content is not analyzed, but the location information is compared with the location condition list saved in step S1309. In this processing, a change in the area to which content receiving terminal 103 belongs can be ascertained from a change in the result of location condition determination.

Next, in response to the location information notification in step S1312, setting section 109 returns to control section 116 the result of location determination processing executed by communication processing section 106 (S1314).

This determination result is either "CHANGE", indicating that there has been a change in the area to which content receiving terminal 103 belongs, or "NOT_CHANGE", indicating that there is no change. Assuming that the user of content receiving terminal 103 is located at point Pa in FIG. 4 at this point in time, the location determination result in step S1314 will be the same as the location determination result in step S1309.

Therefore, the determination result is "NOT_CHANGE". When the location determination result is "NOT_CHANGE", control section 116 does not take any action.

As stated above, control section 116 reports location information to setting section 109 at regular intervals (S1315). It is here assumed that content receiving terminal 103 has not yet reached area 401a at this stage.

Location information is transmitted to communication processing section 106 via setting section 109. Each time communication processing section 106 acquires location information, it carries out the same kind of location determination processing as in step S1313 (S1316).

As in step S1314, setting section 109 returns the result of location determination by communication processing section 106 to control section 116 (S1317). The determination result in this step is "NOT_CHANGE", the same as in step S1314.

Control section 116 then reports new location information to setting section 109 (S1318). It is here assumed that content receiving terminal 103 is located at point Pb in area 401a in this step.

Setting section 109 reports location information to communication processing section 106, and communication processing section 106 performs location determination processing (S1319). As content receiving terminal 103 is located in area 401a at this time, the determination result is "CHANGE".

In response to the location information notification in step S1318, setting section 109 returns location determination result "CHANGE" to control section 116 (S1320). This is a message notifying content display section 110 that there is new HTML list content. This message will be described in detail later herein.

On receiving "CHANGE" as the location determination result, control section 116 carries out display processing to notify the user that the list content has been updated, and display processing to accept a list content update request from the user. That is to say, content display section 110 only notifies the user of the fact that new list content exists, and maintains its present state without displaying the new list content unless there is a command from the user.

The reason for this is that the user may be viewing other content, and it is not possible to judge whether the user wishes to view the new list content. It is here assumed that the user manipulates GUI section 117 and orders list content updating (S1321).

Next, the control section 116 instructs browser section 113 to acquire list content again. Browser section 113 then sends setting section 109 an HTTP message to acquire the list content specified by control section 116 (S1322). This list content acquisition request is the same message as the list content acquisition request in step S1107.

Setting section 109 analyzes the HTTP message received from browser section 113, and gives an instruction for list content acquisition to communication processing section 106. Communication processing section 106 compares the specified CAML content URL with the CAML content URL saved in intermediate cache section 108 in step S1109.

If the two URLS do not match, an HTTP message for content acquisition is transmitted to content communication server 101a. It is here assumed that the two URLs match. In this case, the list content has already been saved in intermediate cache section 108, and therefore an HTTP message is not transmitted to content communication server 101a, and the same kind of location adaptive processing as in step S1309 is performed on the saved CAML content (S1323). As content receiving terminal 103 is located in area 401a at this time, HTML list content 1000 shown in FIG. 10 is generated by means of location adaptive processing.

In response to the HTTP message in step S1322, communication processing section 106 returns the generated list content to browser section 113 (S1324).

A restaurant list as shown in list content 403a in FIG. 4 is then displayed on the screen of browser section 113 (S1325).

It is here assumed that the user selects "Restaurant A1" from the restaurant list displayed on the screen (S1326).

Browser section 113 sends an HTTP message requesting "Restaurant A1" content to setting section 109 (S1327).

In response to this, setting section 109 analyzes the HTTP message received from browser section 113, and gives an instruction for list content acquisition to communication processing section 106. Communication processing section 106 transfers the HTTP message to the appropriate server—content communication server 101b in FIG. 13. Content communication server 101b returns the requested content to communication processing section 106 (S1328). This content is HTML content.

In response to the HTTP message in step S1327, communication processing section 106 returns the HTML content acquired in step S1328 to browser section 113 (S1329).

Browser section 113 displays the content received from communication processing section 106 (S1330). The user views the displayed content.

From this point on, content receiving terminal 103 continues to move, and control section 116 reports location information to setting section 109 at regular intervals (S1331).

Similarly, while the content displayed in step S1330 is being viewed, setting section 109 and communication processing section 106 repeat the same location determination processing as in step S1316 each time location information notification is received (S1332).

Then, in response to location information notification, setting section 109 returns the result of location determination processing to control section 116 (S1333).

The sequence in FIG. 13 shows operations up until area 401a in FIG. 4 is entered, but the same kind of processing is repeated through area 401a, and also when area 401b and area 401c are reached. The above kind of sequence enables a user to view content relating to the present locality.

As described above, a content adaptive distribution system 100 according to Embodiment 1 implements content distribution adapted to the location of a terminal by combining distribution by broadcasting of menu content that lists content categories and distribution by communication of location-dependent content lists.

Additional information concerning distribution of menu content corresponding to step S1302 through step S1304 is given below.

Broadcast receiving section 114 receives content broadcast by a content broadcast server via content processing section 105. At this time, data transmission and reception between broadcast processing section 107 and broadcast receiving section 114 is carried out by means of broadcasting or communication.

When broadcast receiving section 114 receives content for which content adaptation processing is deemed unnecessary, content can be received directly from content broadcast server 102 without the intermediation of content processing section 105.

When content distribution between broadcast processing section 107 and broadcast receiving section 114 is performed by means of broadcasting, broadcast processing section 107 has a broadcast reception function and a broadcast transmission function.

It is also possible for broadcast receiving section 114 to have a function for receiving content by means of communication in addition to a broadcast reception function, and for content distribution from broadcast processing section 107 to broadcast receiving section 114 to be executed not by broadcasting but by communication, such as by means of an Internet Protocol UDP. As a result, broadcast processing section 107 need no longer have a broadcast transmission function, enabling system construction costs to be kept down.

As described above, content broadcast server 102 performs periodically repeated transmission of menu content by means of carousel-type data broadcasting. On the other hand, broadcast processing section 107 need not perform periodically repeated reception of menu content, but need only receive menu content once when a menu content acquisition request is received.

Similarly, menu content distribution from broadcast processing section 107 to broadcast receiving section 114 basically need only be executed once.

However, with once-only transmission there is a risk of missed reception, and therefore broadcast processing section 107 may also repeat transmission of menu content to broadcast receiving section 114 a number of times.

Only three areas are described in list content 800 in FIG. 8, but more flexible content adaptive distribution can be executed by setting an appropriate number of areas according to the scale of the content adaptive distribution service area.

In the sequence in FIG. 13, menu content distributed by content broadcast server 102 is assumed to be HTML content, but menu content written in CAML may also be used. In this case, location adaptive processing and location determination processing is also performed for menu content in the same way as for list content distribution shown in step S1307 onward in FIG. 13.

When both menu content and list content are CAML content to which location conditions are added in this way, it is necessary to indicate explicitly for both whether location information processing is to be executed ("location information processing" here being a generic term for location determination processing and location adaptive processing).

In Embodiment 1, only CAML content received immediately before is subject to location information processing. For example, when CAML list content is received after CAML menu content has been received, the CAML menu content received earlier is not subject to location information processing, and location information processing is performed on the CAML list content received later.

Next, the course of content adaptive distribution processing will be described, focusing on content processing section 105 contained in content receiving terminal 103 in FIG. 1.

Content processing section 105 receives a message from content display section 110, and performs location information processing or content distribution processing in accordance with that message. Messages between content display section 110 and content processing section 105 employ a protocol based on HTTP. However, messages using an extension of HTTP are used for location information notification and broadcast reception parameter notification.

Browser section 113 transmits general HTTP messages to setting section 109. Examples are shown below.

Format: "GET" "URL" Example 1: GET http://www.xx.com/list.caml Example 2: GET http://www.yy.co.jp/restaurantA1.html Control section 116 transmits extended HTTP messages that give notification of location information to setting section 109. The specification of such location information notification messages is as follows.

Format: "POSITION" "latitude, longitude" Example: POSITION N35.37.44.10, E139.41.23.150

On receiving location information, setting section 109 returns a response message to control section 116. This response message reports a change in the location determination result, and is either "CHANGE" or "NOT_CHANGE".

Format: "CHANGE" "list content reference destination" Example: CHANGE http://xxx.xxx.com Format: "NOT_CHANGE" Example: "NOT_CHANGE"

When "CHANGE" is transmitted as a response message, the list content reference destination is also transmitted. When list content is updated, content display section 110 accesses "list content reference destination" (=URL) contained in the "CHANGE" message.

Next, parameter notification for broadcast reception will be described.

Content broadcast server 102 of Embodiment 1 does not distribute only single content, but distributes different content on a plurality of channels. Therefore, when broadcast processing section 107 or broadcast receiving section 114 receives content from content broadcast server 102, it selects a reception channel. For this purpose, notification of a parameter—that is, a reception channel—is necessary for broadcast reception from control section 116 to setting section 109.

A protocol extended from HTTP is used for this reception channel notification, in the same way as for location information notification.

The specification of this reception channel notification message is as follows.

Format: "BRecv" "CID=reception channel" Example: BRecv CID=0×01

Here, initial string "BRecv" is a broadcast reception instruction, and CID is an identifier that defines the reception channel.

An extended-HTTP message has been described as being used here, but any protocol and any message format may be used as long as they are capable of parameter notification for broadcast reception.

Figure 14:
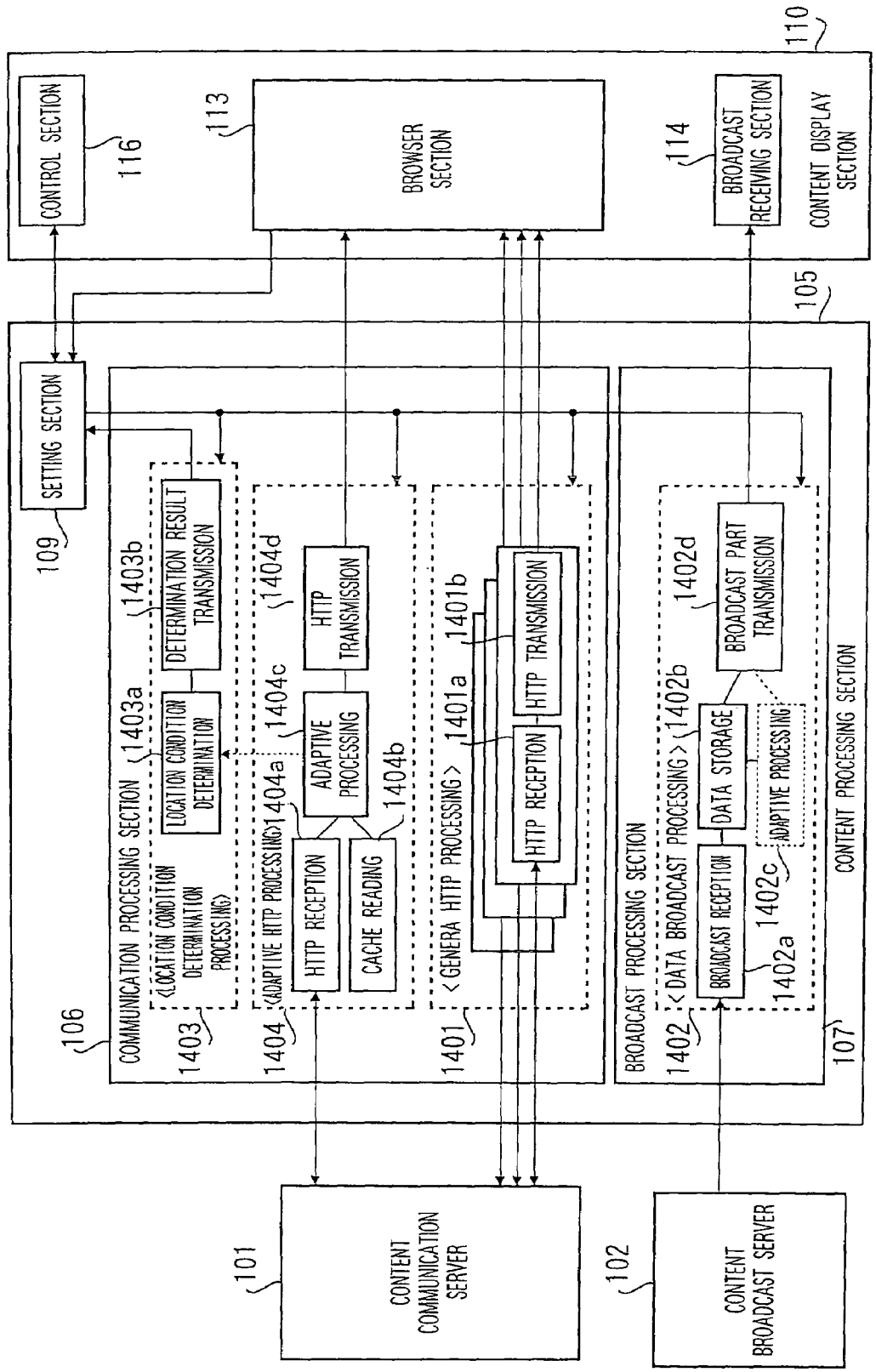
FIG. 14 is a drawing showing details of content processing according to Embodiment 1.

Next, the various kinds of processing executed by content processing section 105 will be described. FIG. 14 is a drawing showing details of content processing by content processing section 105.

Processing performed by communication processing section 106 comprises general HTTP processing (1401), location condition determination processing (1403), and adaptive HTTP processing (1404).

General HTTP processing (1401) denotes a series of processing procedures comprising "HTTP reception" (1401a) in which (a data file comprising) HTML content is received from content communication server 101 in accordance with a request from content display section 110, and "HTTP transmission" (1401b) in which received content is distributed to content display section 110 (quotation marks indicate correspondence to a box in FIG. 14; this also applies throughout the following description).

In this general HTTP processing, communication processing section 106 receives an HTTP GET message from browser section 113 via setting section 109, and returns content to browser section 113 in response. At this time, a plurality of HTTP GET messages may be received consecutively from browser section 113, but it is not necessary to return responses in the order in which messages are received. It is sufficient to be able to transmit a plurality of data files comprising an HTML file in no particular order. Therefore, general HTTP processing can be executed in parallel for the number of GET messages received.

Location condition determination processing (1403) denotes a series of processing procedures comprising "location condition determination" (1403a) in which location information sent from content display section 110 is compared with location conditions in CAML content, and it is determined whether or not matching location conditions have changed, and "determination result transmission" (1403b) in which the result of location determination is returned.

This location condition determination processing (1403) is executed each time an HTTP extension message reporting location information is received after CAML content has been received.

Adaptive HTTP processing (1404) denotes a series of processing procedures comprising "HTTP reception" (1404a) in which CAML content is received from content communication server 101 by means of HTTP in accordance with a request from content display section 110, "adaptive processing" (1404c) in which location adaptive processing is performed on that CAML content, and "HTTP transmission" (1404d) in which generated HTML content is distributed to content display section 110.

In this adaptive HTTP processing (1404), received CAML content is cached, and when acquisition of cached content is requested again from content display section 110, "cache reading" (1404b), in which CAML content is read from the cache, is performed rather than "HTTP reception" (1404a).

This adaptive HTTP processing (1404) is executed when communication processing section 106 receives an HTTP GET message specifying CAML content.

Differentiation between general HTTP processing (1401) and adaptive HTTP processing (1404) is determined by means of the file extension.

That is to say, when the extension of a content file indicated by a GET message corresponds to a CAML file, adaptive HTTP processing (1404) is executed, and in the case of an extension corresponding to data comprising another general HTML file (such as HTML, GIF, or JPEG, for example), general HTTP processing (1401) is executed.

Unlike general HTTP processing (1401), in the case of location condition determination processing (1403) and adaptive HTTP processing (1404), processing is executed based on the order in which messages are received. The reason for this is that content receiving terminal 103 reports location information in accordance with temporal movement, and therefore that location information requires time series processing.

Next, data broadcast processing (1402) performed by broadcast processing section 107 will be described. This data broadcast processing (1402) denotes a series of processing procedures comprising "broadcast reception" (1402*a*) in which data of a specified channel is received from content broadcast server 102 carousel-type data broadcasting, "data storage" (1402*b*) in which appropriate content is extracted from carousel-type data broadcasting and temporarily stored in a cache, and "broadcast part transmission" (1402*d*) in which content stored in the cache is transmitted to broadcast receiving section 114. This data broadcast processing (1402) is executed when an extended-HTTP message corresponding to a data broadcast reception request is received from content display section 110.

When content is CAML content for which location adaptation is possible, "adaptive processing" (1402*c*) is carried out before "broadcast part transmission" (1402*d*).

Table 1500 shown in FIG. 15 summarizes the processing contents of content processing section 105 according to request/notification contents transmitted from content display section 110 to content processing section 105.

In FIG. 15, processing indicated by reference numeral 1501 is content processing for a menu content acquisition request, processing indicated by reference numeral 1502 is content processing for a list content acquisition request, processing indicated by reference numeral 1503 is content processing for a location-dependent content acquisition request, processing indicated by reference numeral 1504 is content processing for a general content acquisition request, and processing indicated by reference numeral 1505 is content processing for location information notification.

Additional information concerning FIG. 15 is given here. Menu content and location-dependent content is assumed to be written in HTML. Therefore, for location-dependent content, general HTTP processing is executed in the same way as for general HTML content. On the other hand, list content is CAML content for which location adaptive processing is possible, and therefore adaptive HTTP processing is executed in this case.

General HTTP messages as indicated by reference numerals 1502, 1503, and 1504 in FIG. 15 are transmitted from browser section 113 to setting section 109, and responses are returned from communication processing section 106 to browser section 113.

On the other hand, an extended-HTTP message reporting location information indicated by reference numeral 1505 is transmitted from control section 116 to setting section 109, and location determination update information constituting the response is returned from setting section 109 to control section 116.

Similarly, a menu content acquisition request (broadcast reception) indicated by reference numeral 1501, which is an extended-HTTP message, is transmitted from control section 116 to setting section 109, and the content constituting the response is transmitted from broadcast processing section 107 to broadcast receiving section 114.

Figure 16:
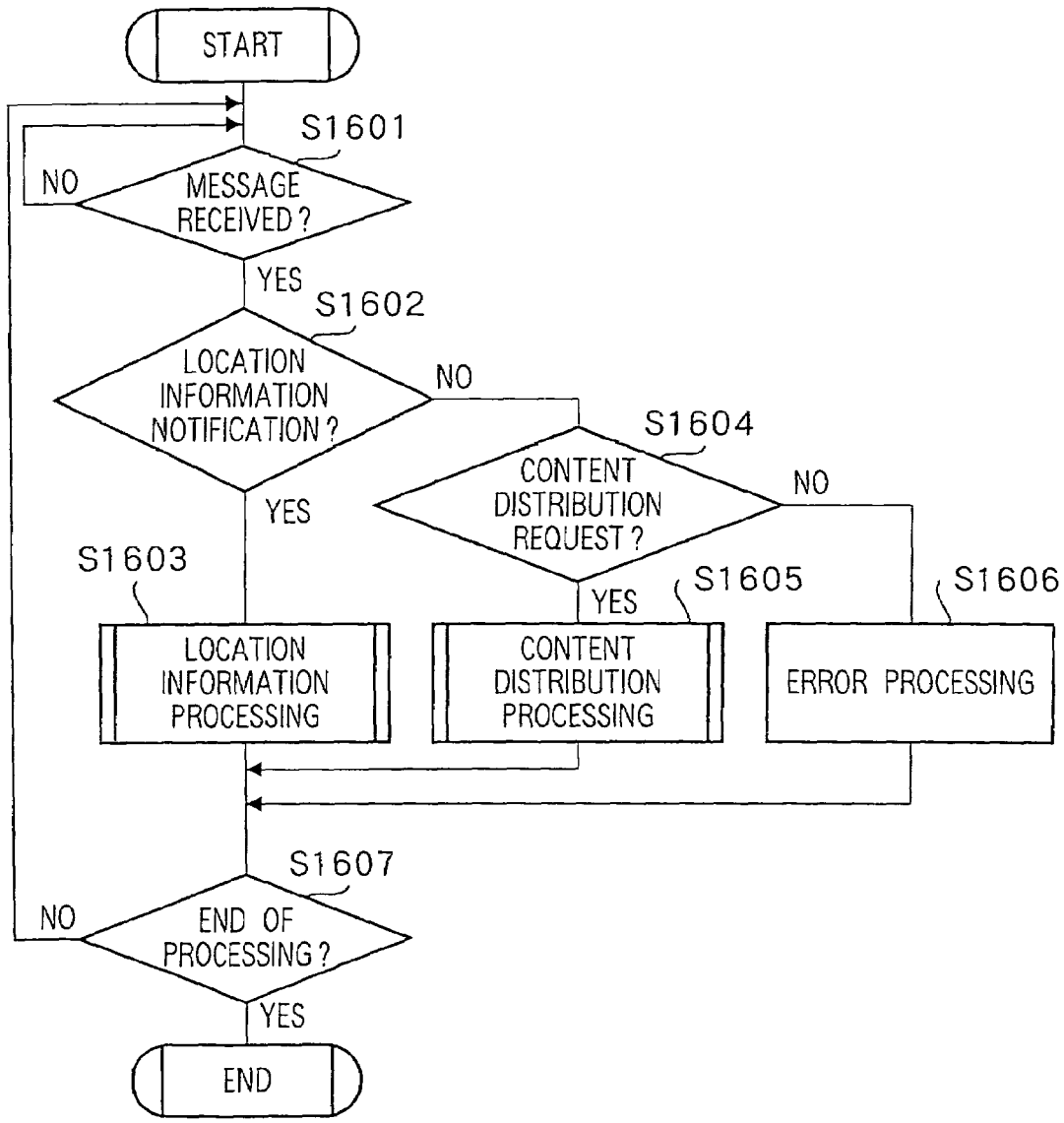
FIG. 16 is a flowchart showing the message processing procedure according to Embodiment 1.

Next, the message processing procedure of content processing section 105 will be described using FIG. 16. FIG. 16 is a flowchart showing the message processing procedure in content processing section 105 according to Embodiment 1. In the message processing shown in FIG. 16, setting section 109 processes a message sent from content display section 110, and location information processing or content distribution processing is executed according to the type of message.

Setting section 109 waits for reception of a message from content display section 110 (S1601). On receiving a message in step S1601, setting section 109 proceeds to the next step. A message from content display section 110 may be an HTTP message GET instruction, an extended-HTTP message reporting location information, or an extended-HTTP message requesting broadcast reception.

Setting section 109 then analyzes the received message, and determines whether or not it is a message reporting location information (S1602). If the message is a message reporting location information, setting section 109 reports the location information to communication processing section 106, and proceeds to step S1603. If the message is of a different kind—that is, an HTTP message GET instruction—setting section 109 proceeds to step S1604.

Here, it is assumed that menu content received from a broadcast is written in HTML, and location information is not reported to broadcast processing section 107. If menu content is CAML content for which location adaptive processing is possible, it is reported to either communication processing section 106 or broadcast processing section 107.

In step S1603, communication processing section 106 executes location information processing. When this processing ends, the processing flow proceeds to step S1607. Location information processing here is processing for location information reported from content display section 110. Details of location information processing will be given later herein.

In step S1604, setting section 109 analyzes the received message and determines whether or not that message is an HTTP message GET instruction. If the received message is an HTTP message GET instruction, setting section 109 instructs communication processing section 106 to execute content distribution processing, and proceeds to step S1605. If, on the other hand, the received message is an illegal message other than a GET message, the processing flow proceeds to step S1606.

In step S1605, communication processing section 106 executes content distribution processing. When this processing ends, the processing flow proceeds to step S1607. Content distribution processing here is processing whereby specified content is received from a server, and the received content is distributed to content display section 110. In this content distribution processing, content adaptation processing is executed as necessary. Details of content distribution processing will be given later herein.

If an illegal message is detected in step S1604, setting section 109 executes appropriate error processing in step S1606.

Then, in the final step, S1607, processing end determination is performed. That is to say, unless there is a command to end message processing, the processing flow returns to the message reception wait loop in step S1601, and message processing is continued.

In this way, content processing section 105 executes location information processing or content distribution processing according to the type of message sent from content display section 110.

Figure 17:
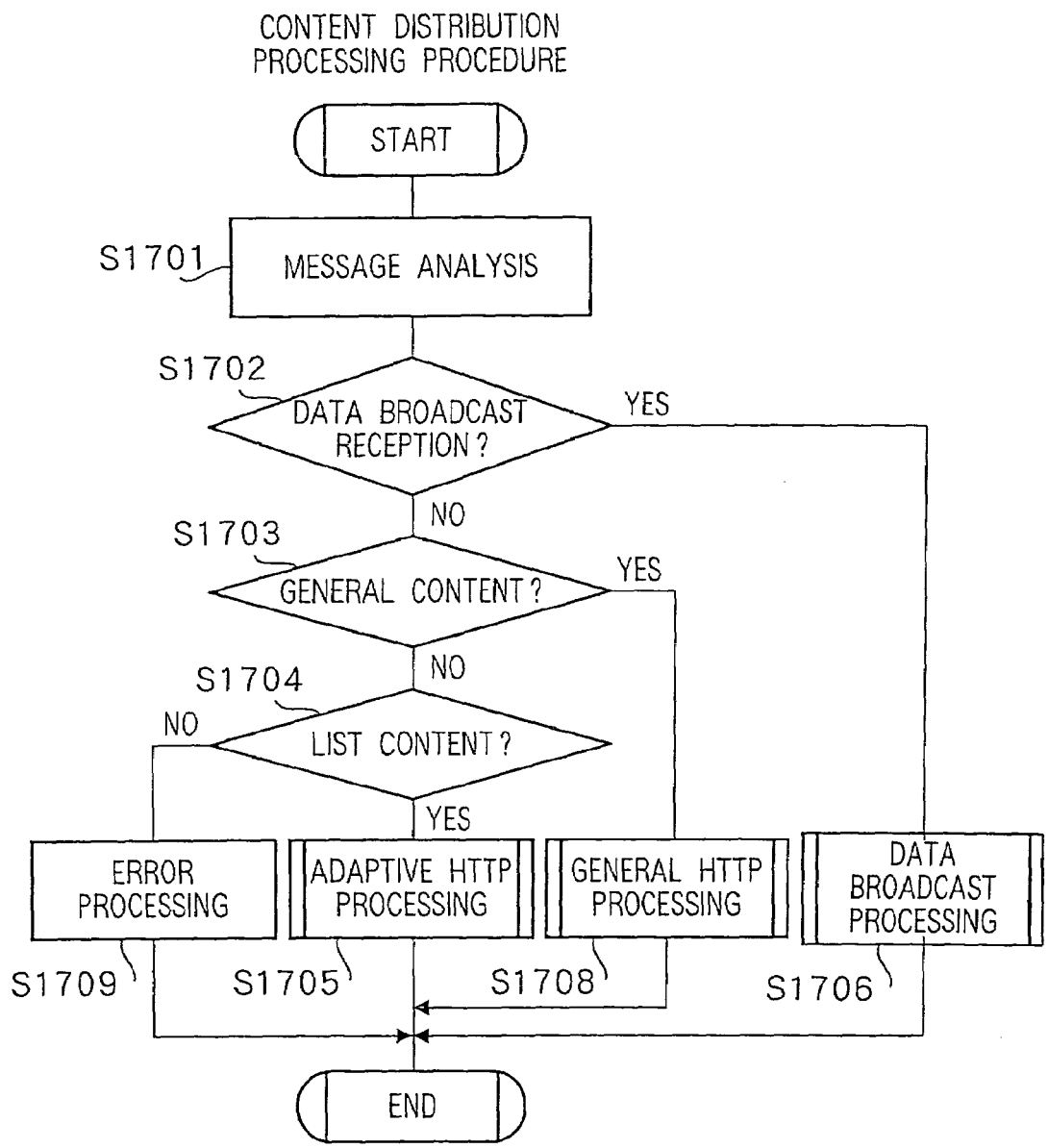
FIG. 17 is a flowchart showing the content distribution processing procedure according to Embodiment 1.

Next, content distribution processing by content processing section 105 will be described using FIG. 17. FIG. 17 is a flowchart showing content distribution processing by content processing section 105 according to Embodiment 1.

In the content distribution processing in FIG. 17, content processing section 105 performs distribution relay processing according to the type of content. In the case of CAML content for which location adaptive processing is possible, content processing section 105 executes location adaptive processing on CAML content acquired from a server before transmitting the content to content display section 110.

On the other hand, when the type of content is general HTML content, an image file, or the like, communication terminal 105 transmits content received from a server directly to content display section 110.

First, setting section 109 performs analysis of a message received from content display section 110 (S1701).

In step S1702 through step S1704, setting section 109 performs allocation of processing to be executed according to the type of message received. In step S1702, setting section 109 extracts a message requesting broadcast reception (in Embodiment 1, corresponding to a message requesting menu content), and instructs broadcast processing section 107 to execute data broadcast processing in step S1706.

In step S1703, setting section 109 extracts a message requesting general content acquisition, and instructs communication processing section 106 to execute general HTTP processing in step S1708.

Here, general content denotes a data file comprising general content, such as an HTML file or image file. These can be differentiated by their extension.

In step S1704, setting section 109 extracts a message requesting list content acquisition, and instructs communication processing section 106 to execute adaptive HTTP processing in step S1705.

List content is CAML content for which location adaptation is possible, and can be differentiated by the file extension.

By means of processing allocation by setting section 109, data broadcast processing (S1706), general HTTP processing (S1708), or adaptive HTTL processing (S1705) is executed according to the type of content.

A wrong type message is extracted in step S1704, and setting section 109 executes appropriate error processing in S1709

In this way, when content processing section 105 executes the content distribution processing in FIG. 17, content corresponding to the message received by setting section 109 is displayed by browser section 113.

Figure 18:
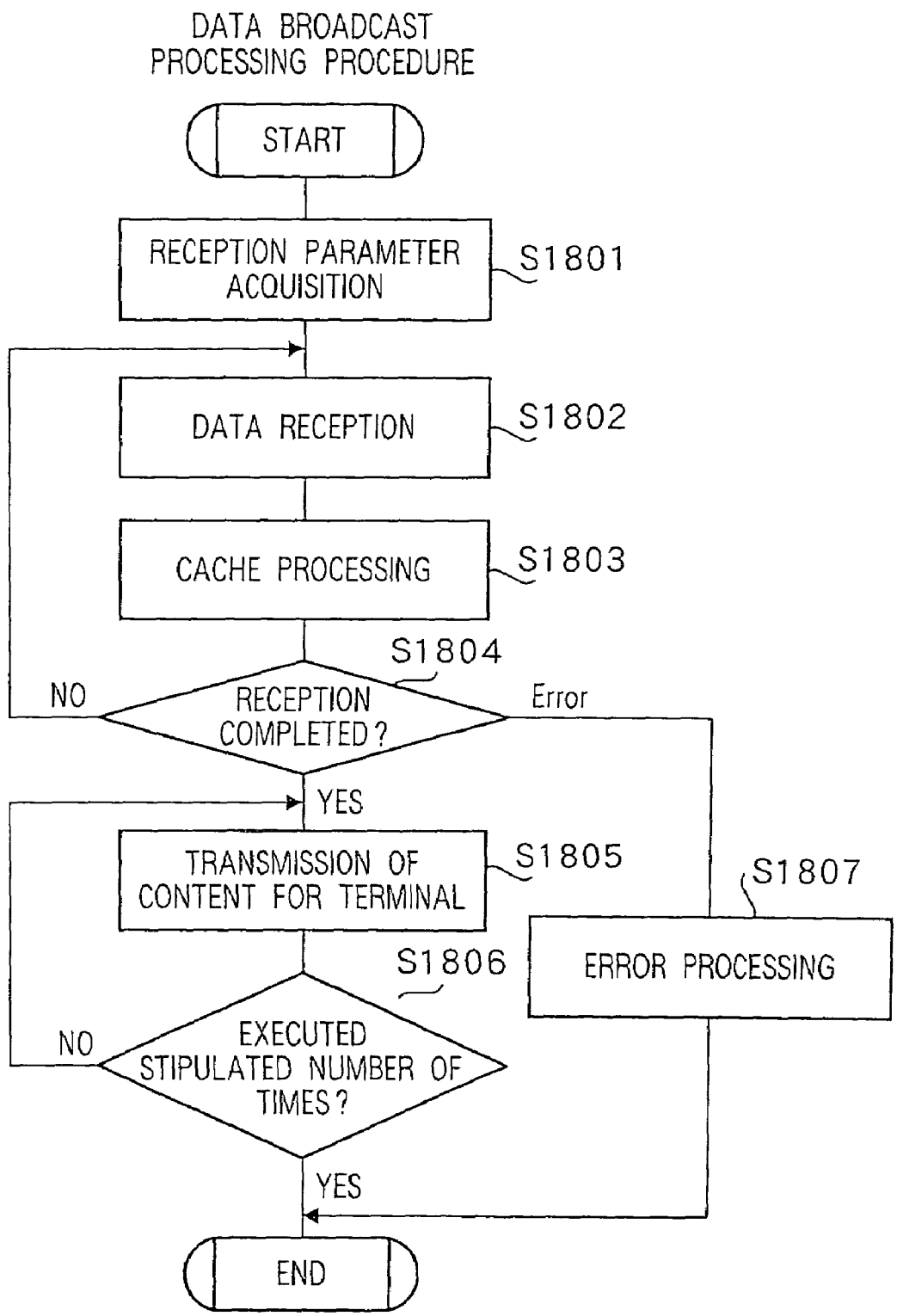
FIG. 18 is a flowchart showing the data broadcast processing procedure according to Embodiment 1.

Next, data broadcast processing corresponding to step S1706 in FIG. 17 will be described. FIG. 18 is a flowchart showing data broadcast processing by broadcast processing section 107 of content processing section 105 according to Embodiment 1.

In data broadcast processing, broadcast processing section 107 receives specified content from content broadcast server 102 carousel-type data broadcasting, and transmits the received content to content display section 110.

First, broadcast processing section 107 acquires a broadcast reception parameter from the message received from content display section 110 (S1801). To be specific, the broadcast parameter indicates the reception channel.

Then, in step S1802 through step S1804, broadcast processing section 107 receives carousel-type data broadcasting, and stores content contained in the specified channel in intermediate cache section 108. Carousel-type data broadcasting performs periodically repeated data file distribution, and reception and storage processing is not necessarily begun at the start of a data file. Here, broadcast processing section 107 transmits data every predetermined unit in accordance with data broadcast format specifications (S1802), and repeats processing to temporarily store receive data while linking the receive data (S1803) until the entire content has been received (S1804).

When data reception is completed in step S1804, the processing flow proceeds to the next processing step, S1805. However, if data reception has not been executed correctly, step S1807 error processing is performed, and data broadcast processing is terminated.

In the processing loop comprising step S1805 and step S1806, broadcast processing section 107 transmits content received from content broadcast server 102 to demodulation section 14 by means of broadcasting or pseudo-broadcasting (using a communication protocol such as UDP/IP, for example). However, as with content broadcast server 102, it is not necessary for transmission of the same data to be repeated periodically, and broadcast processing section 107 need only transmit content to broadcast receiving section 114 once.

In order to ensure that broadcast receiving section 114 can receive the content, broadcast processing section 107 may repeat transmission of the content a number of times. In step S1806, broadcast processing section 107 confirms that content has been repeatedly transmitted a predetermined stipulated number of times, and then terminates all processing.

Figure 19:
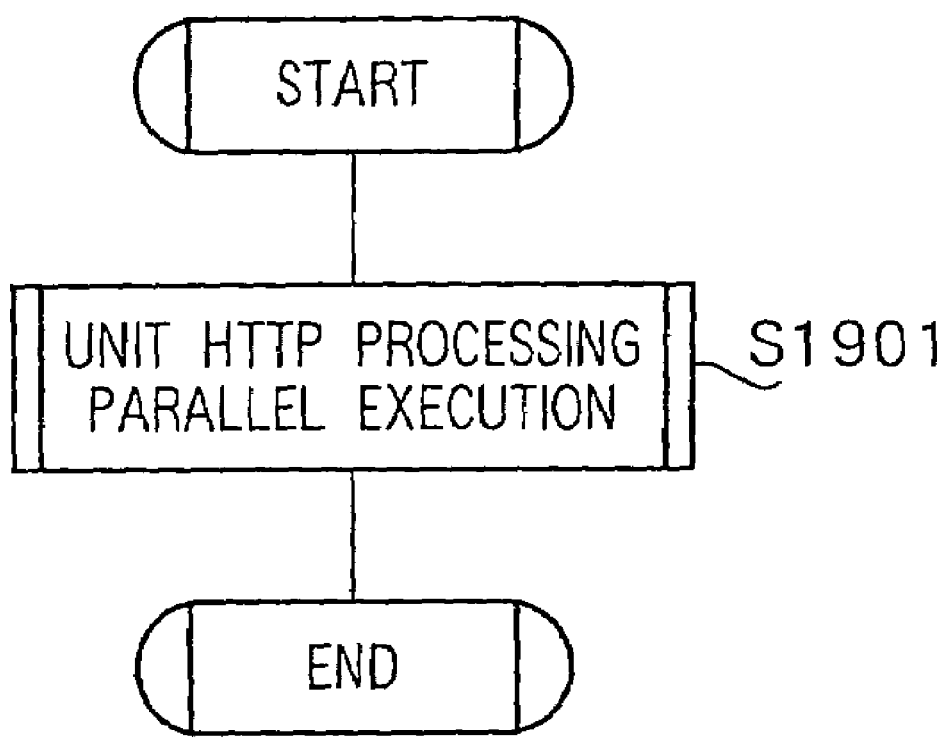
FIG. 19 is a flowchart showing the general HTTP processing procedure according to Embodiment 1.

Next, general HTTP processing corresponding to step S1708 in FIG. 17 will be described. FIG. 19 is a flowchart showing general HTTP processing by communication processing section 106 of content processing section 105 according to Embodiment 1.

This flowchart comprises only a single step, S1901. In step S1901, communication processing section 106 performs parallel execution of unit HTTP processing. In general HTTP processing, communication processing section 106 acquires a data file comprising HTML content (HTML file, GIF file, JPEG file, etc.) from content communication server 101 by means of HTTP, and distributes the acquired data file to browser section 113 by means of HTTP.

This general HTTP processing is executed each time a content acquisition request message is transmitted from browser section 113, but need not be completed in the order in which content acquisition request messages are received. On receiving a content acquisition request message, communication processing section 106 initiates unit HTTP processing that handles only that message. This means that, if a plurality of content acquisition request messages are received in a short period, a plurality of unit HTTP processes are executed in parallel. Each unit HTTP process is completed when one content entity is distributed to browser section 113.

With a plurality of data files constituting one HTML content entity, the amount of data is not uniform, but differs, for example, between a GIF image file and an HTML text file. Therefore, the amount of time required for processing is different for unit HTTP processing that handles a GIF image file and unit HTTP processing that handles an HTML text file. As stated earlier, when parallel execution of unit HTTP processing is performed, a file with a large amount of data takes a long time to be displayed by browser section 113, whereas a file with a small amount of data is displayed by browser section 113 in a short time.

Executing parallel processing of a plurality of data files constituting HTML content has the effect of shortening the user's sense of waiting time and improving user convenience.

Figure 20:
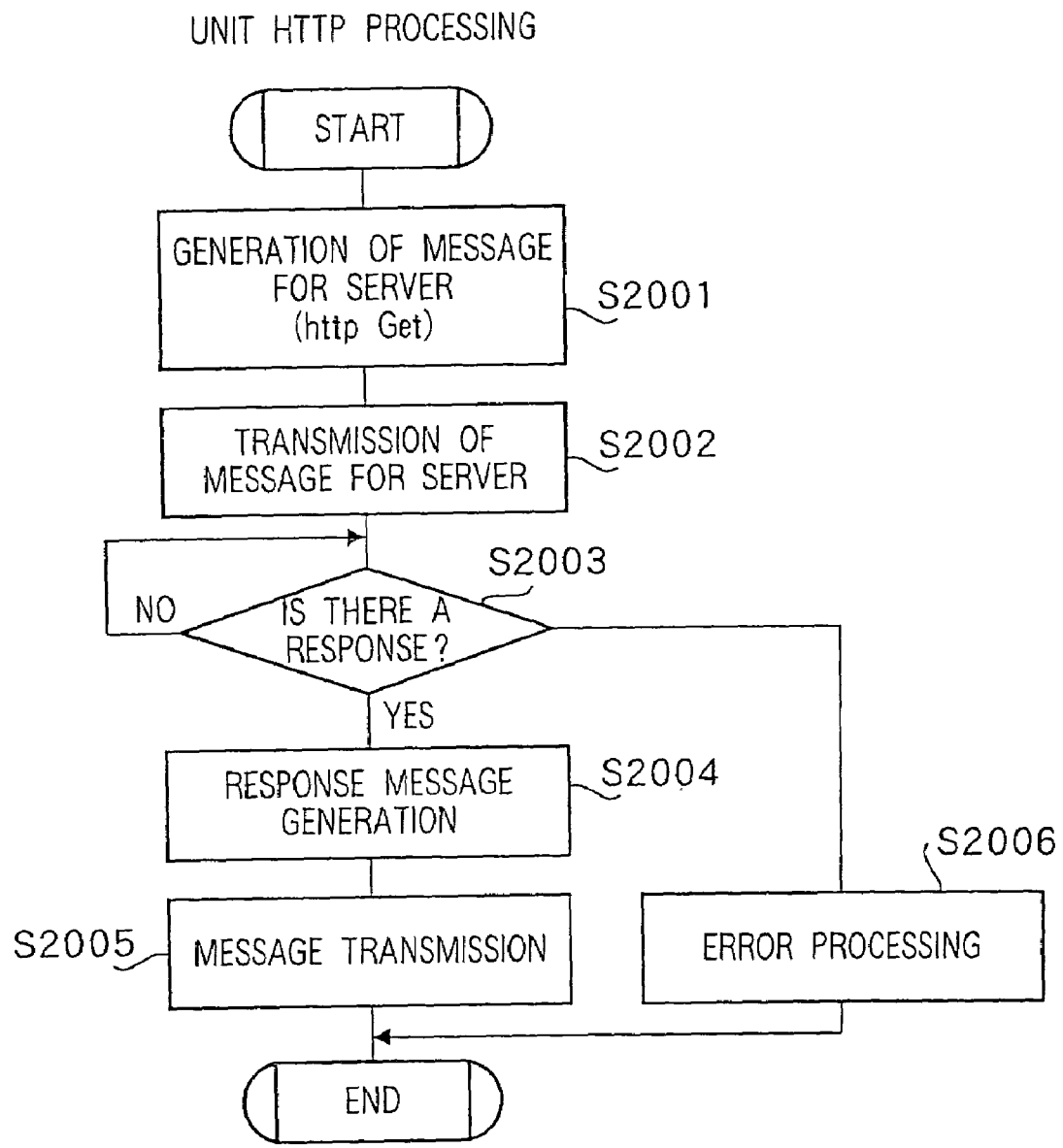
FIG. 20 is a flowchart showing the unit HTTP processing procedure according to Embodiment 1.

Next, unit HTTP processing corresponding to step S1901 in FIG. 19 will be described. FIG. 20 is a flowchart showing unit HTTP processing by communication processing section 106 of content processing section 105 according to Embodiment 1.

This unit HTTP processing is HTTP communication relay processing, executed in accordance with a content acquisition request message transmitted from browser section 113.

First, in step S2001, communication processing section 106 references a received content acquisition request message and generates a message for transmission to content communication server 101. This message is an HTTP GET message making a content acquisition request to a server.

In the next step, S2002, communication processing section 106 transmits the generated message to an appropriate content communication server 101.

In step S2003, communication processing section 106 waits for a response to the message transmitted to the server, and on receiving a response, proceeds to step S2004. If an illegal message is received or if there is no response after the elapse of a predetermined time, appropriate error processing is performed in step S2006, and unit HTTP processing is terminated.

When there is a response from the server, in step S2004 communication processing section 106 generates a message for relay transfer of that response. In response to an HTTP GET message, the message returned by content communication server 101 is actual content data.

In step S2005, communication processing section 106 transmits the message generated in step S2004 to browser section 113. This is a message in response to the content acquisition request message received from content display section 110.

Thus, in unit HTTP processing, an HTTP GET message and the response thereto are relayed between content display section 110 and content communication server 101.

Figure 21:
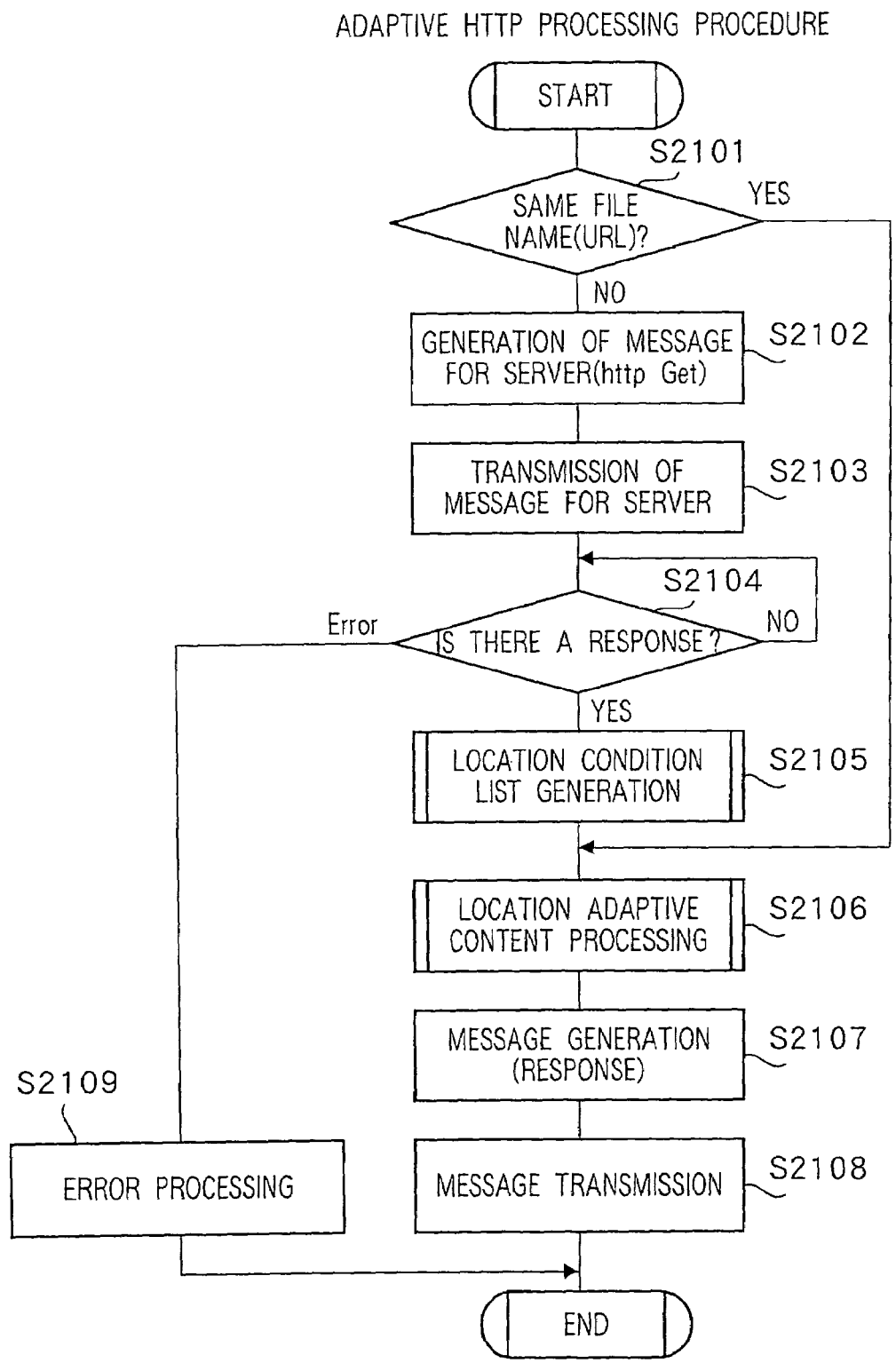
FIG. 21 is a flowchart showing the adaptive HTTP processing procedure according to Embodiment 1.

Next, adaptive HTTP processing corresponding to step S1705 in FIG. 17 will be described. FIG. 21 is a flowchart showing adaptive HTTP processing by communication processing section 106 of content processing section 105 according to Embodiment 1.

In adaptive HTTP processing, content adaptation processing—that is, processing to generate HTML content from CAML content—is executed when the same kind of processing as general HTTP processing is performed.

First, in step S2101, communication processing section 106 checks whether or not the file name (or URL) of CAML content to be acquired matches the file name of CAML content acquired the previous time. Communication processing section 106 has cached the latest previously acquired CAML content in intermediate cache section 108. If this cached CAML content and the CAML content now to be acquired are the same, the CAML content cached in intermediate cache section 108 can be used, and therefore the processing from step S2102 through step S2105 is skipped, and the processing flow proceeds to step S2106.

If, on the other hand, CAML content has not been cached, communication processing section 106 proceeds to the next step, S2102.

In step S2102, communication processing section 106 references a received content acquisition request message and generates a message for transmission to content communication server 101. This message is an HTTP GET message making a content acquisition request to a server.

In the next step, S2103, communication processing section 106 transmits the generated message to content communication server 101.

In step S2104, communication processing section 106 waits for a response to the message transmitted to the server, and on receiving a response, proceeds to step S2105. If an illegal message is received or if there is no response after the elapse of a predetermined time, appropriate error processing is performed in step S2109, and adaptive HTTP processing is terminated.

In step S2105, communication processing section 106 performs location condition list generation processing. A location condition list is a list in which only location start tags are extracted from list content written in CAML, and is used in location condition determination processing. Details of location condition list generation processing will be given later herein. When processing in this step ends, the processing flow proceeds to the next step, S2106.

In step S2106, communication processing section 106 executes location adaptive content processing. Location adaptive content processing is processing that generates HTML content from CAML content (acquired from content communication server 101 or read from intermediate cache section 108) based on location information provided beforehand. Details of location adaptive content processing will be given later herein. When processing in this step ends, the processing flow proceeds to the next step, S2107.

In step S2107, communication processing section 106 generates a message for transmission to browser section 113 of content display section 110. This message is a message in response to the content acquisition request message (HTTP GET message), and contains HTML content generated from CAML content.

In step S2108, communication processing section 106 transmits the message generated in step S2107 to browser section 113.

Thus, in adaptive HTTP processing, content adaptation processing is executed at the time of relay transfer of an HTTP GET message and the response thereto transmitted and received between content display section 110 and content communication server 101.

Figure 22:
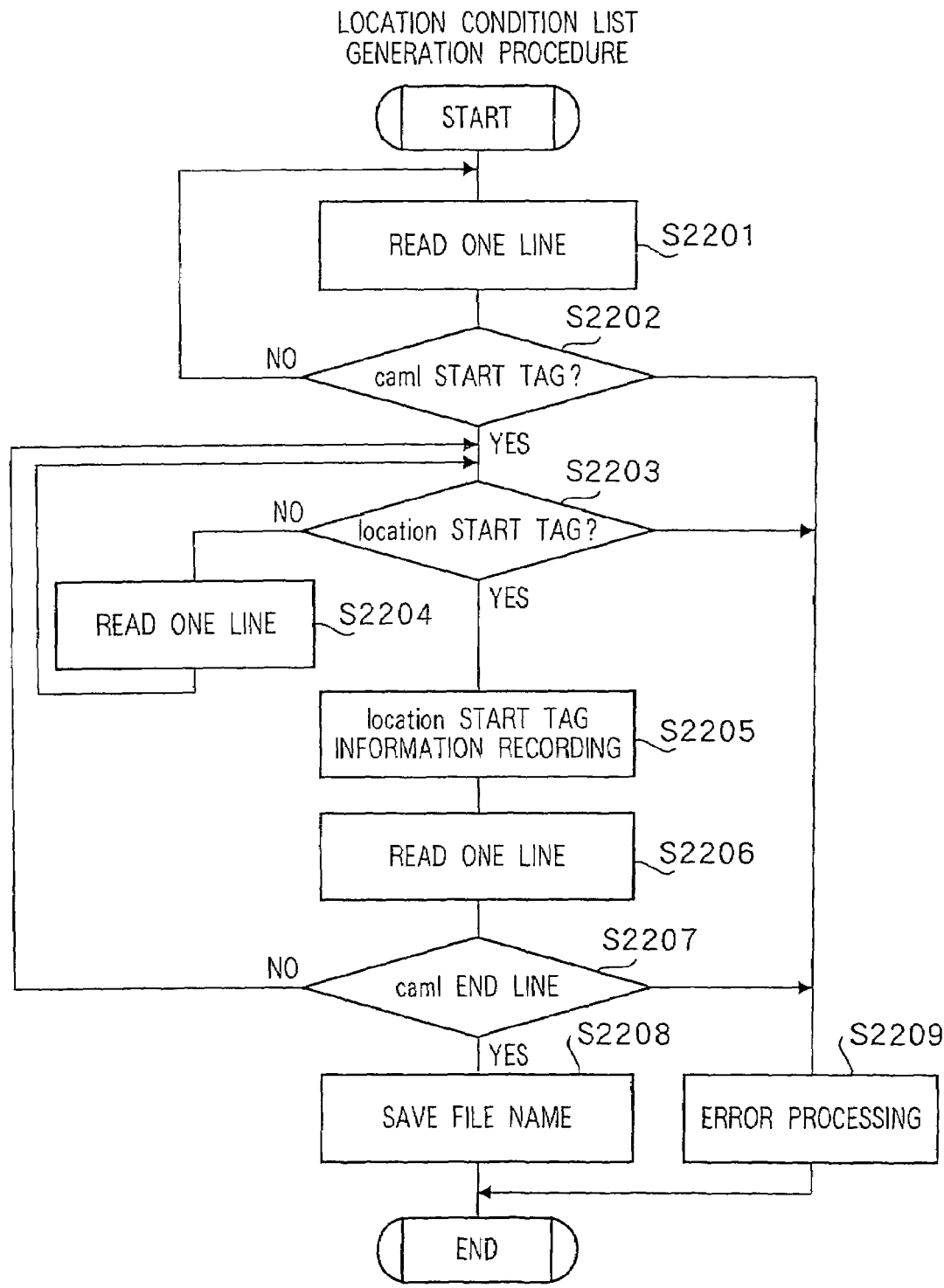
FIG. 22 is a flowchart showing the location condition list generation procedure according to Embodiment 1.

Next, the location condition list generation processing procedure executed in step S2105 in FIG. 21 will be described using FIG. 22. FIG. 22 is a flowchart showing the location condition list generation processing procedure according to Embodiment 1. This location condition list is a list in which only location start tags are extracted from list content written in CAML, and is used in location determination processing. The actual location condition list generation processing procedure will now be described.

First, in the processing loop comprising step S2201 and step S2202, communication processing section 106 reads CAML list content one line at a time, and detects a caml start tag. When a caml start tag is detected, the processing flow proceeds to the next step, S2203. If, in the aforementioned step, the last line of the list content is reached or a list content syntax error is detected, the processing flow proceeds to step S2209, appropriate error processing is performed, and location condition list generation processing is terminated.

The processing loop comprising following step S2203 and step S2204 is processing for skipping any text line that is enclosed by a caml start tag and caml end tag and is not a location start tag.

In step S2203, communication processing section 106 determines whether or not one line of text that has been read is a location start tag. If the text is not a location start tag, communication processing section 106 proceeds to step S2204, reads CAML content one line at a time, and repeats location start tag detection.

If, on the other hand, a location start tag is detected in step S2203, the processing flow proceeds to step S2205. If, in the aforementioned step, the last line of the list content is reached or a list content syntax error is detected, the processing flow proceeds to error processing in step S2209.

In step S2205, communication processing section 106 registers the location start tag detected in step S2203 in the location condition list, and proceeds to the next step. The location condition list format will be described later herein.

Next, communication processing section 106 reads the next line of text from the list content (S2206), and determines whether or not the text that has been read is a caml end tag (S2207). If the text is not a caml end tag, communication processing section 106 returns to step S2203 and repeats location start tag detection and registration in the location condition list. If the text data is a caml end tag, communication processing section 106 proceeds to step S2208. If, in the aforementioned step, the last line of the list content is reached or a list content syntax error is detected, the processing flow proceeds to error processing in step S2209.

In step S2208, communication processing section 106 registers the list content file name (or URL) in the location condition list, and terminates location condition list generation processing.

When communication processing section 106 executes the location condition list generation processing in FIG. 22 in this way, a CAML content location condition list such as that denoted by reference numeral 2300 in FIG. 23 is generated.

As stated above, this location condition list 2300 is a list in which only location start tags are extracted from list content written in CAML. The reason for generating this location condition list will now be explained.

The location conditions written in the first location start tag 2304a in FIG. 23 indicate a "circular" area with center coordinates N35.37.44.16, E139.41.23.157, and a radius of 600 meters (=area 401a in FIG. 4).

While content receiving terminal 103 is moving, location information is reported from content display section 110 to content processing section 105 at regular intervals. This location information comprises latitude and longitude coordinates obtained by means of GPS, etc., which indicate a "point" in planar space.

In content adaptive distribution, location determination processing that compares location information with location conditions indicated by all location start tags in CAML content—that is, geometric computation for determining whether a "point" is inside or outside a "circle"—is performed. Executing this kind of processing each time location information is reported is highly redundant, and the load on content processing section 105 cannot be ignored. Therefore, a location condition list is prepared beforehand in which all location start tags are extracted from CAML content. Then, location determination processing when location information is reported is executed by referencing the location condition list, without referencing the CAML content itself.

Determination result column 2303 to the right of location conditions 2302 in FIG. 23 is used to record the location condition determination result when location adaptive content processing (step S2106 in FIG. 21) is executed. In the example in FIG. 23, the location condition determination result is indicated by "+" or "−". Here, "+" means that the location information and location conditions match, and "−" means that the location information and location conditions do not match.

In the example in FIG. 23, the determination result for first location conditions 2304a is "+", indicating that, at the point in time at which location adaptive content processing was executed, content receiving terminal 103 was present in area 401a corresponding to the first location conditions. At the time of location condition list generation in step S2105 in FIG. 21, all entries in determination result column 2303 are "−".

List content reference destination 2301 at the top of the location condition list in FIG. 23 is the list content file name (or URL). In step S2101 of the adaptive HTTP processing in FIG. 21, the CAML list content file name recorded in list content reference destination 2301 is compared with the file name of the CAML content to be acquired.

Figure 24:
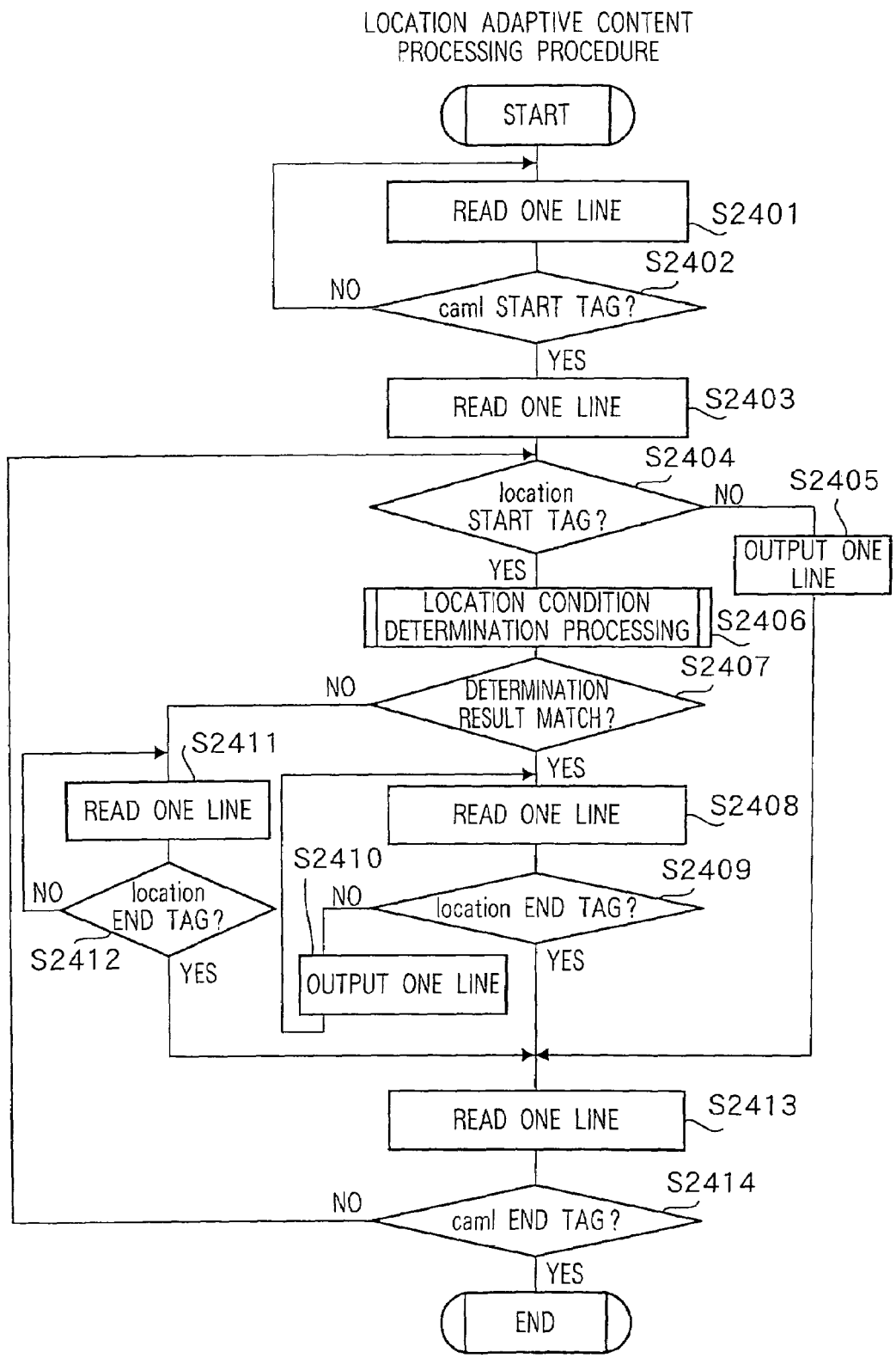
FIG. 24 is a flowchart showing the location adaptive content processing procedure according to Embodiment 1.

Next, the location adaptive content processing procedure executed in step S2106 in FIG. 21 will be described using FIG. 24. FIG. 24 is a flowchart showing the location adaptive content processing procedure executed by communication processing section 106 according to Embodiment 1. In this location adaptive content processing, the latest location information is referenced, and (location-dependent) HTML list content is generated from CAML content. The location adaptive content processing procedure according to Embodiment 1 is described in detail below.

First, in the processing loop comprising step S2401 and step S2402, communication processing section 106 reads CAML list content one line at a time, and detects a caml start tag. When a caml start tag is detected, the processing flow proceeds to the next step, S2403.

It is assumed in principle that there are no text lines before the caml start tag. If there are text lines before the caml start tag, those lines are regarded as comment lines and are not subject to processing.

Communication processing section 106 then reads the next line of text from the list content (S2403), and determines whether or not the line of text that has been read is a location start tag (S2404).

If the text is not a location start tag, communication processing section 106 proceeds to step S2405, and outputs the read text to a file.

In step S2405 processing, communication processing section 106 writes a text line belonging to a part enclosed by a caml start tag and caml end tag, and not enclosed by a location start tag and location end tag, to a file. This file comprises HTML content generated as the result of location adaptive content processing. If text output ends in step S2405, communication processing section 106 proceeds to step S2413. If a location start tag is detected in step S2404, communication processing section 106 proceeds to step S2406.

In step S2406, communication processing section 106 performs location condition determination processing. In this location condition determination processing, it is determined whether or not the latest location information matches the location conditions contained in the location start tag detected in step S2404. Details of location condition determination processing will be given later herein.

In the next step, S2407, communication processing section 106 performs branch processing based on the result of the location condition determination processing in step S2406. The processing flow proceeds to step S2408 if the location information matches the location conditions, or proceeds to step S2411 if the location information does not match the location conditions.

If the location information matches the location conditions, the processing loop comprising step S2408 through step S2410 is executed. This is processing that writes a text line belonging to a part enclosed by a location start tag and location end tag to an output file.

Step S2408 is processing that reads one line of text from CAML content, step S2409 is processing that determines whether or not the text that has been read is a location end tag, and step S2410 is processing that outputs the read text to a file. That is to say, communication processing section 106 outputs text data to a file until a location end tag is detected. Then, when a location end tag is detected in step S2409, communication processing section 106 proceeds to step S2413.

If the location information does not match the location conditions, the processing loop comprising step S2411 and step S2412 is executed. This is processing that skips text lines belonging to a part enclosed by a location start tag and location end tag.

In other words, in step S2412, communication processing section 106 repeats step S2411 processing that reads one line of text from CAML content until a location end tag is detected. Then, when a location end tag is detected in step S2412, communication processing section 106 proceeds to step S2413.

In step S2413, communication processing section 106 reads the next line of text from the list content (that is, the line after the location end tag), and determines whether or not that text is a caml end tag (S2414). If the text is not a caml end tag, communication processing section 106 returns to step S2404 and repeats the series of processing steps from step S2404 through step S2414. When a caml end tag is detected, location adaptive processing is terminated.

Thus, by means of the location adaptive content processing in FIG. 24, HTML list content (see FIG. 9 through FIG. 12) adapted to the latest location information (latitude and longitude coordinate values) reported from content display section 110 is generated from CAML list content (see FIG. 8).

In the flowchart in FIG. 24, a premise is that, with regard to CAML list content, one location condition does not simultaneously match a location condition of a plurality of location start tags. This means that it is prohibited for the areas shown in FIG. 4 to touch or overlap.

Figure 25:
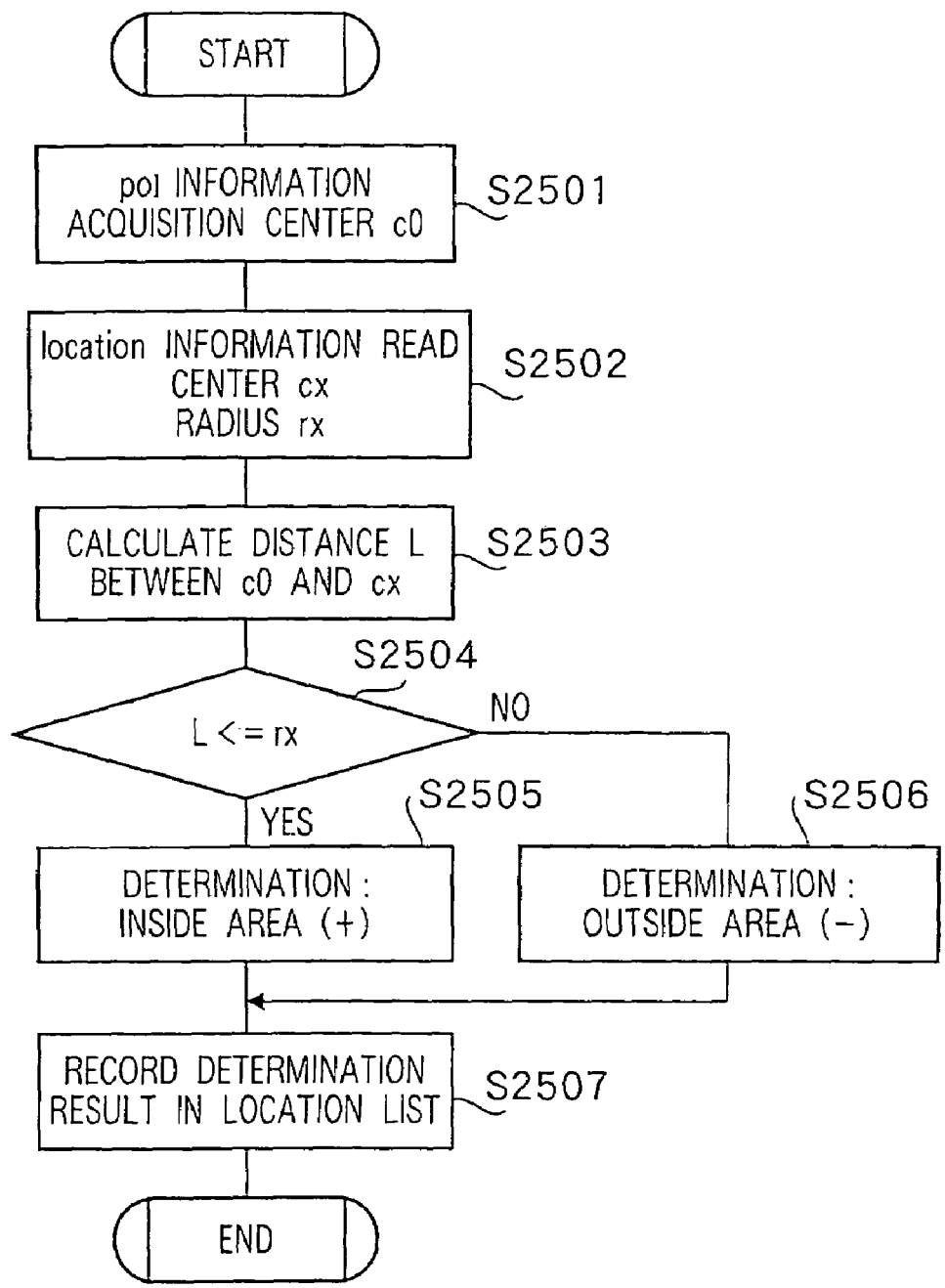
FIG. 25 is a flowchart showing the location condition determination processing procedure according to Embodiment 1.

Next, the location condition determination processing procedure executed in step S2406 in FIG. 24 will be described using FIG. 25. FIG. 25 is a flowchart showing the location condition determination processing procedure executed by communication processing section 106 according to Embodiment 1. In this location condition determination processing, it is determined whether or not the latest location information matches the location conditions of a location start tag extracted from CAML content. To be more specific, in location condition determination, it is determined whether or not a "point" indicated by location information is contained in a "circular" area indicated by location conditions. The determination result is assumed to be "Match" when the point is contained in the circular area, and "No match" when the point is not contained in the circular area. The location condition determination processing procedure according to Embodiment 1 is described in detail below.

In step S2501, communication processing section 106 acquires the latest location information—that is, latitude and longitude coordinates of the present position of content receiving terminal 103. Here, the present position is designated c0. Present position c0 of the terminal is also referred to as the "POI" (Point of Interest).

In step S2502, location conditions are extracted from a location start tag read in step S2404 of the location adaptive content processing procedure in FIG. 24. To be specific, the latitude and longitude coordinates of the center, and the radius, of a circular area, written as location start tag attributes, are acquired. Here, the center of the circle is designated cx, and the radius of the circle is designated rx.

Next, in step S2503, distance L between present position c0 and center cx is calculated. The unit of this distance L is assumed to be the same as that of circle radius rx.

In step S2504, communication processing section 106 compares distance L with radius rx, and proceeds to step S2505 if L is less than or equal to rx, or proceeds to step S2506 if L is greater than rx.

If the processing flow proceeds to step S2505, communication processing section 106 determines that present position c0 of content receiving terminal 103 in inside a circle (including the boundary) with center cx and radius rx, and in step S2507, records "+", meaning "location condition match", in determination result column 2303 of the location conditions currently subject to processing in location condition list 2200.

If, on the other hand, the processing flow proceeds to step S2506, communication processing section 106 determines that present position c0 of content receiving terminal 103 is outside a circle with center cx and radius rx, and in step S2507, records "−", meaning "location condition mismatch", in determination result column 2303 of the location conditions currently subject to processing in location condition list 2300.

Figure 26:
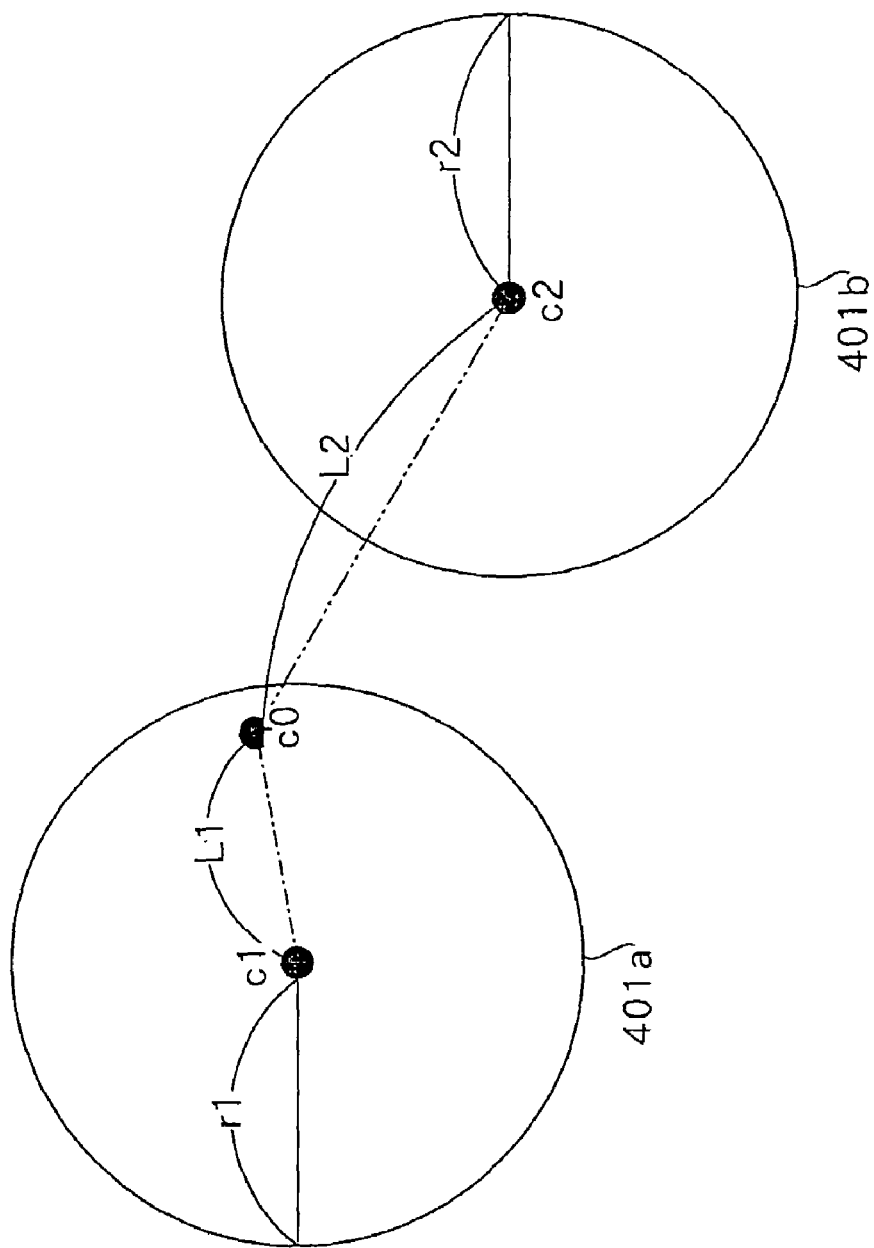
FIG. 26 is a drawing explaining the POI area determination method according to Embodiment 1.

FIG. 26 illustrates the relationship between present position c0 and circular areas. In FIG. 26, area 401a is a circle with center c1 and radius r1, and area 401b is a circle with center c2 and radius r2. L1 is the distance between present position c0 and c1, and L2 is the distance between present position c0 and c2. In the case shown in FIG. 26, L1 is smaller than r1, and therefore C0 can be determined to be inside area 401a, while L2 is smaller than r2, and therefore C0 can be determined to be outside area 401b. This kind of processing is performed in step S2504 through step S2507 in FIG. 25.

Thus, when communication processing section 106 executes the location condition determination processing in FIG. 25, location condition determination results are successively recorded in a location condition list. Location condition determination results recorded in the location condition list are used in location information processing described later herein.

Figure 27:
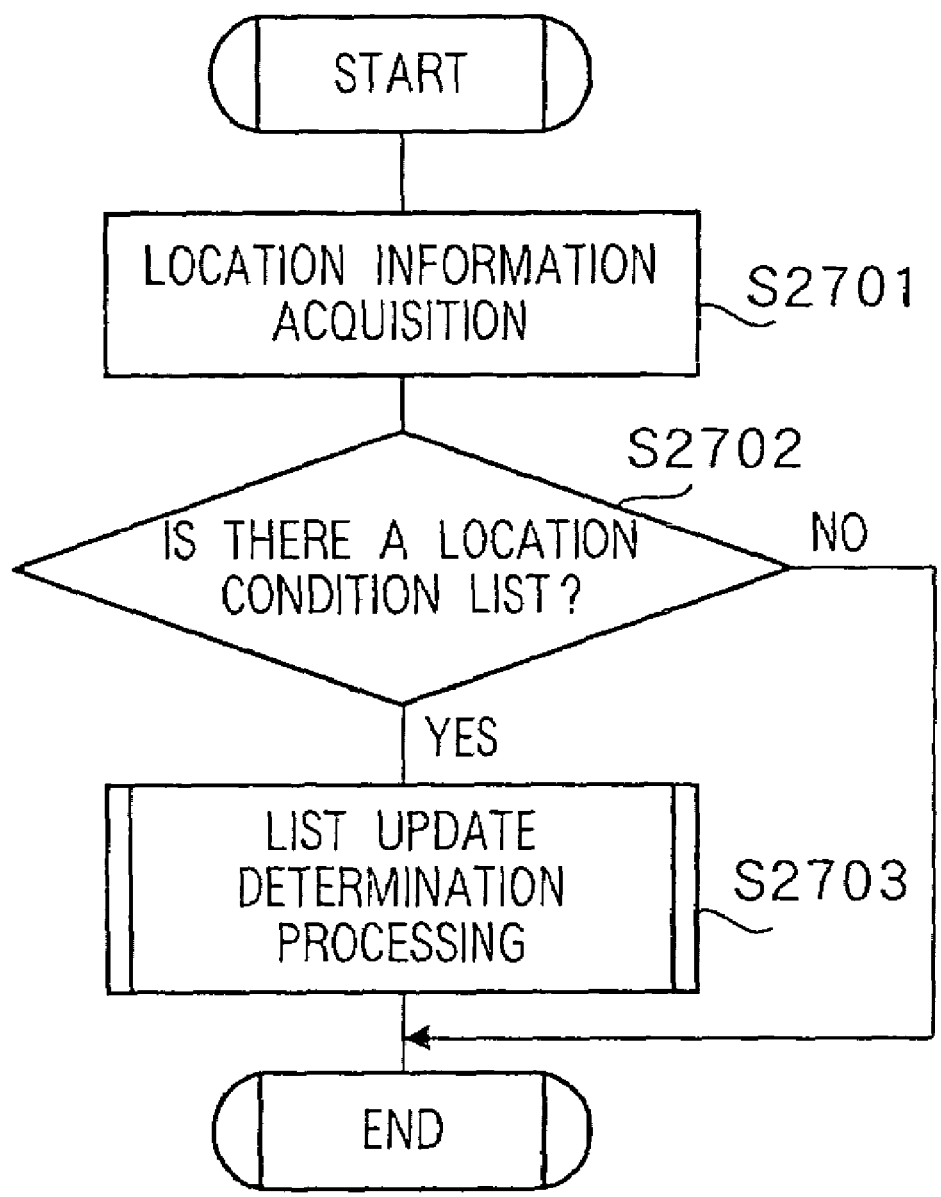
FIG. 27 is a flowchart showing the location information processing procedure according to Embodiment 1.

Next, the location information processing procedure executed in step S1603 in FIG. 16 will be described using FIG. 27. FIG. 27 is a flowchart showing the location information processing procedure according to Embodiment 1.

In this location information processing, communication processing section 106 acquires location information reported from content display section 110, and executes list update determination processing. Location information processing according to Embodiment 1 is described in detail below.

First, communication processing section 106 acquires in step S2701 the latest location information obtained from setting section 109, and in step S2702 checks whether or not a location condition list has already been generated. If a location condition list does not exist, this means that CAML content subject to location information processing is not cached in intermediate cache section 108, and therefore location information processing is terminated.

If, on the other hand, a location condition list exists, this means that the adaptive HTTP processing in FIG. 21 has been executed at least once before. When notification of the latest location information is received in this state, communication processing section 106 performs list update determination processing in step S2703 using the location condition list (not adaptive HTTP processing).

Figure 28:
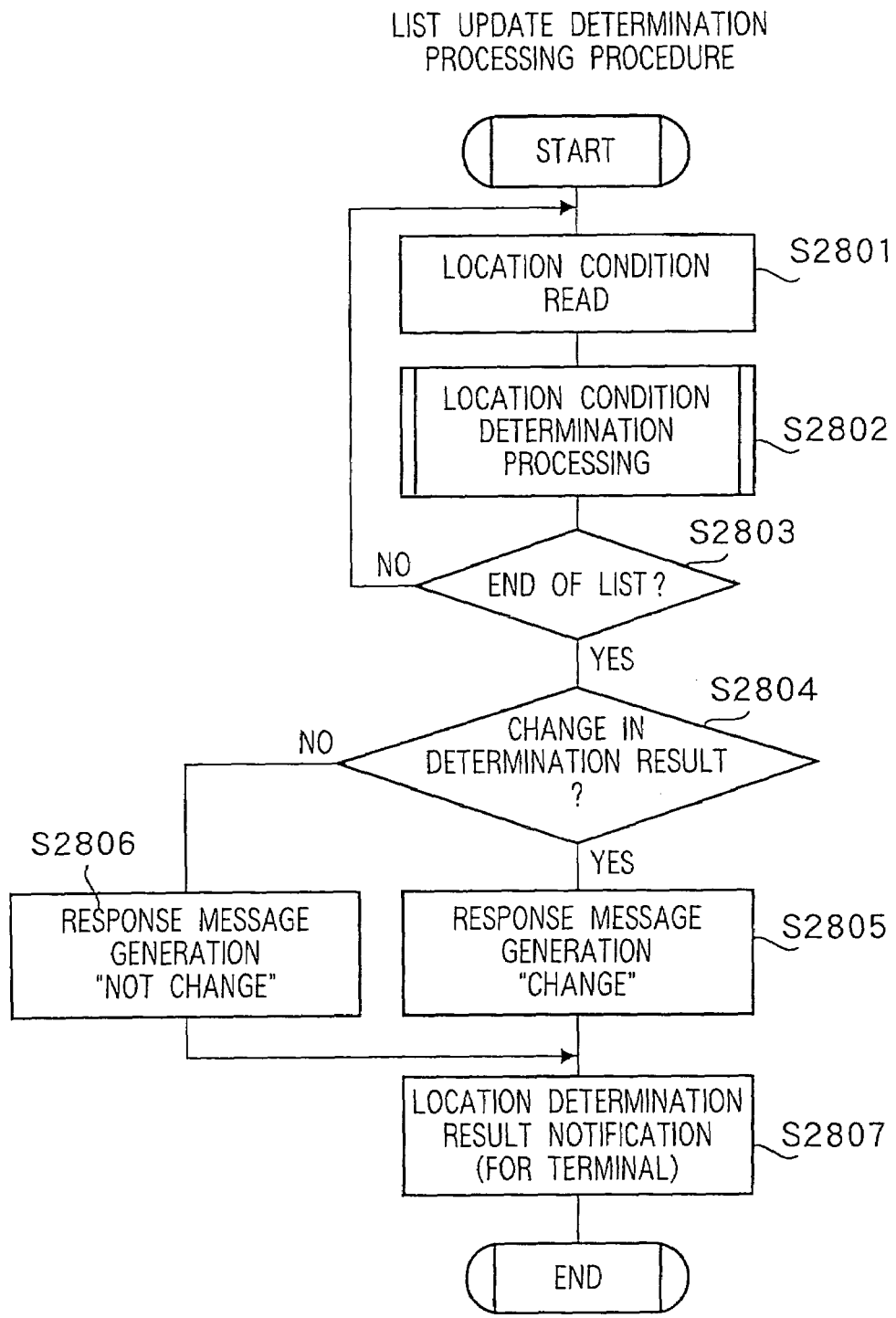
FIG. 28 is a flowchart showing the list update determination processing procedure according to Embodiment 1.

The list update determination processing procedure executed in step S2703 in FIG. 27 will now be described using FIG. 28. In this list update determination processing, the latest location information is compared with location conditions recorded in location condition list 2200. FIG. 28 is a flowchart showing the list update determination processing procedure according to Embodiment 1.

In the processing loop comprising step S2801 through step S2803, the latest location information is compared with all location conditions entered in previously created location condition list 2300, and a series of processing steps are performed to update the location condition determination results.

Communication processing section 106 reads location conditions from location condition list 2300 (S2801), and performs location condition determination processing on those location conditions and the latest location information (S2802). Communication processing section 106 repeats this processing until it has been executed for all location conditions entered in location condition list 2300 (S2803). When such location condition determination processing is completed, determination result column 2303 of location condition list 2300 is updated.

The location condition determination processing in step S2802 is basically executed in accordance with the location condition determination processing procedure in FIG. 25, but there is a partial difference in processing in step S2508 in FIG. 25. Specifically, in step S2508, in addition to the previously described processing, whether or not there is a difference between the determination results before and after updating is recorded (instead of simply updating the results of location condition determination in the location condition list). The occurrence of a difference in the determination result recorded in determination result column 2303 of location condition list 2300 means that the circular area to which content receiving terminal 103 belongs has changed. In other words, this processing is added in order to detect a change in location condition determination.

In the next step, S2804, communication processing section 106 branches to different processing according to whether or not there is a change in determination result column 2303 of location condition list 2300. Whether or not there is a change in the determination result has already been detected in step S2802. If there is a change in the determination result, communication processing section 106 generates a "CHANGE" message indicating "change in determination result" in step S2805, and transmits that message to control section 116 of content display section 110 in step S2807. This "CHANGE" message indicates to content display section 110 that it is possible to generate new list content.

If, on the other hand, there is no change in the determination result, communication processing section 106 generates a "NOT_CHANGE" message indicating "no change in determination result" in step S2806, and transmits that message to control section 116 in step S2807. This "NOT_CHANGE" message indicates to content display section 110 that new list content does not exist.

Thus, in the location information processing shown in FIG. 27 and FIG. 28, communication processing section 106 executes efficient list update determination processing using a location condition list (without analyzing the entire CAML list content each time location information notification is received). Also, each time location information notification is received, communication processing section 106 transmits to content display section 110 a response message indicating whether or not there is a change in the area to which content receiving terminal 103 belongs. By this means, content display section 110 can detect list content update timing with certitude.

Figure 29:
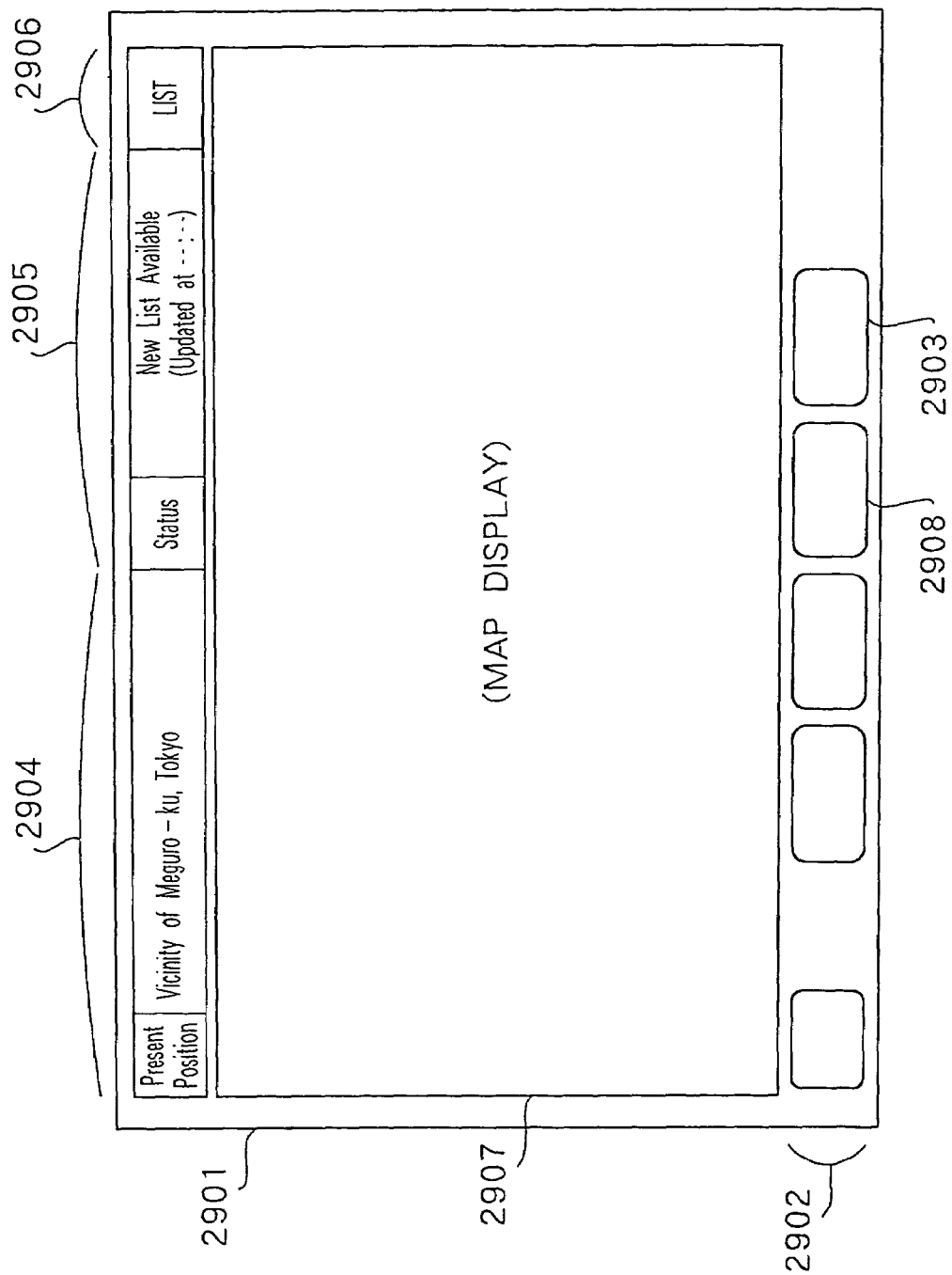
FIG. 29 is a first drawing showing an example of the panel and screen display of a car navigation type content receiving terminal according to Embodiment 1.

Next, screen display by content receiving terminal 103 according to Embodiment 1 will be described using FIG. 29 through FIG. 33. FIG. 29 is a drawing showing an example of the screen display of content receiving terminal 103. This content receiving terminal 103 employs a car navigation system mode, has a data broadcast reception function, Internet access function, and GPS reception function, and can receive combined broadcast/communication type content adaptive distribution while moving.

The screen configuration of content receiving terminal 103 is described in detail below. The content receiving terminal has three screen display modes—map display mode, browser display mode, and split-screen display mode (with both map and browser display)—and can switch between these modes.

First, screen configuration elements common to all modes, and map display mode, will be described with reference to FIG. 29.

Reference numeral 2901 in FIG. 29 denotes the screen in map display mode. This drawing shows a car navigation system with a liquid crystal screen, with a row of operating hardware buttons 2902 at the bottom of the screen. In Embodiment 1, one of these hardware buttons 2902 is assigned as a screen switching button 2903.

This screen switching button 2903 toggles between the three screen display modes. Similarly, one of the hardware buttons 2902 is assigned as a broadcast reception channel selection button 2908.

This broadcast reception channel selection button 2908 is for switching the broadcast reception channel. When a predetermined channel is selected, menu content such as that shown in FIG. 5 is displayed on the screen.

Screen items indicated by reference numerals 2904 through 2906 and 2907 constitute the GUI displayed on the liquid crystal screen. Of these, present position information display section 2904, status display section 2905, and list content display button 2906 are parts common to the three screen display modes, and are areas that are always displayed irrespective of the display mode.

The large area in the center of the screen is the part that displays a map or content, and in FIG. 29 comprises map display area 2907. This map display area 2907 has the functions possessed by typical car navigation systems.

Present position information display section 2904 is an area that displays information relating to the present position, such as latitude and longitude coordinate values obtained at regular intervals by means of GPS, or an address corresponding to those latitude and longitude coordinates.

Status display section 2905 is an area that displays status information relating to list content. In content adaptive distribution according to Embodiment 1, as described above, it is possible to update list content comprising information relating to content for the present locality in line with movement of content receiving terminal 103. Status display section 2905 indicates "presence" or "absence" of new list content, or displays the list content update time (to be precise, the time at which the existence of new list content is confirmed).

List content display button 2906 is a button for displaying or updating list content. As described above, in a content adaptive distribution system according to Embodiment 1, location information processing (see FIG. 27 and FIG. 28) is executed on location information acquired at regular intervals, and the presence or absence of new HTML list content is detected.

When new HTML list content exists, the display contents of status display section 2905 are updated, and the display state of list content display button 2906 is changed (change of display color, flashing display, etc.), notifying the user of the existence of updated information.

At this time, the latest list content is displayed on the screen when the user presses list content display button 2906.

Figure 30:
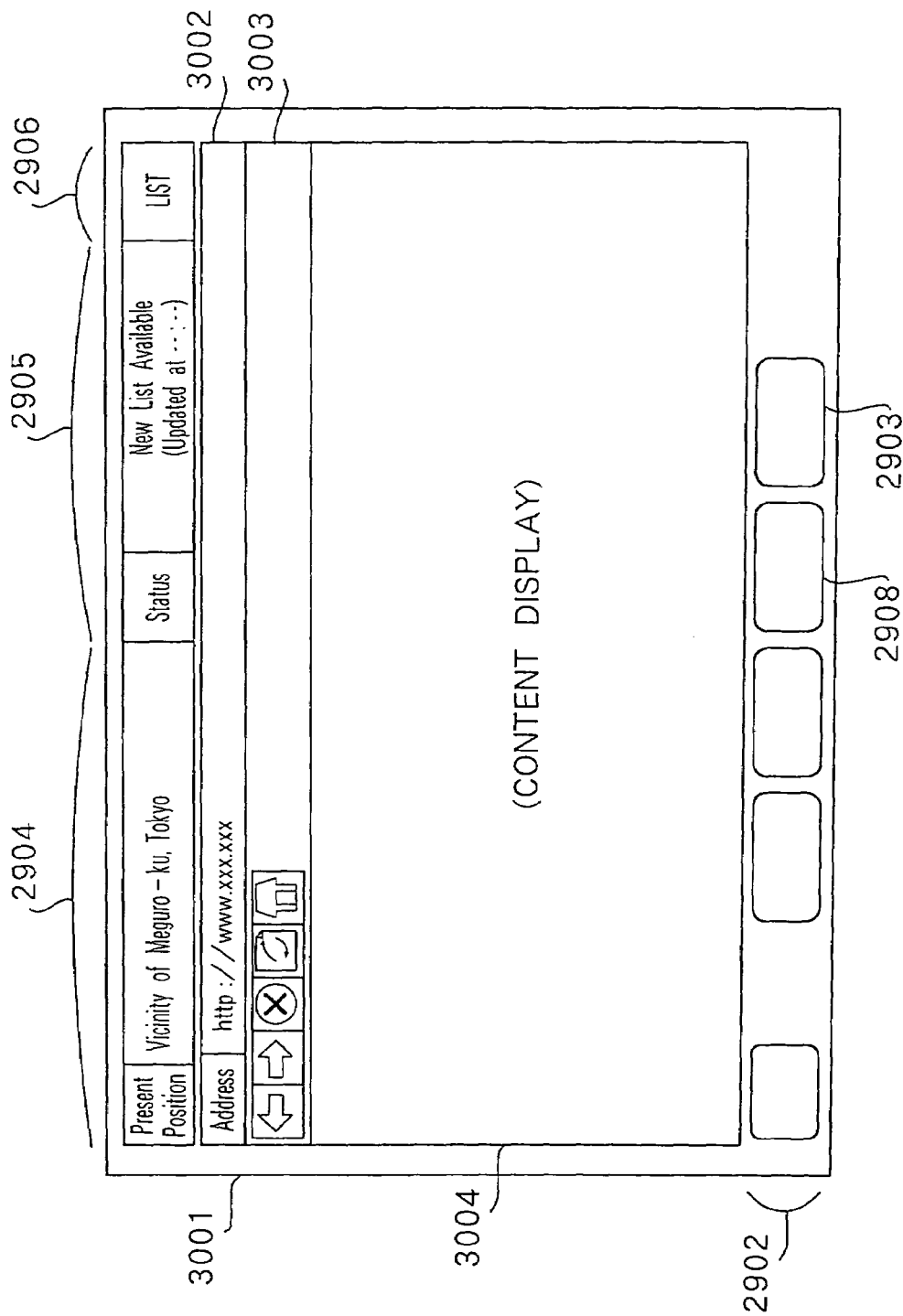
FIG. 30 is a second drawing showing an example of the panel and screen display of a car navigation type content receiving terminal according to Embodiment 1.

FIG. 30 shows an example of screen display in browser display mode. In browser display mode, a content display browser for content viewing is displayed. At this time, an address input section 3002, browser operating section 3003, and content display area 3004, as possessed by a typical browser, are displayed on the screen.

Figure 31:
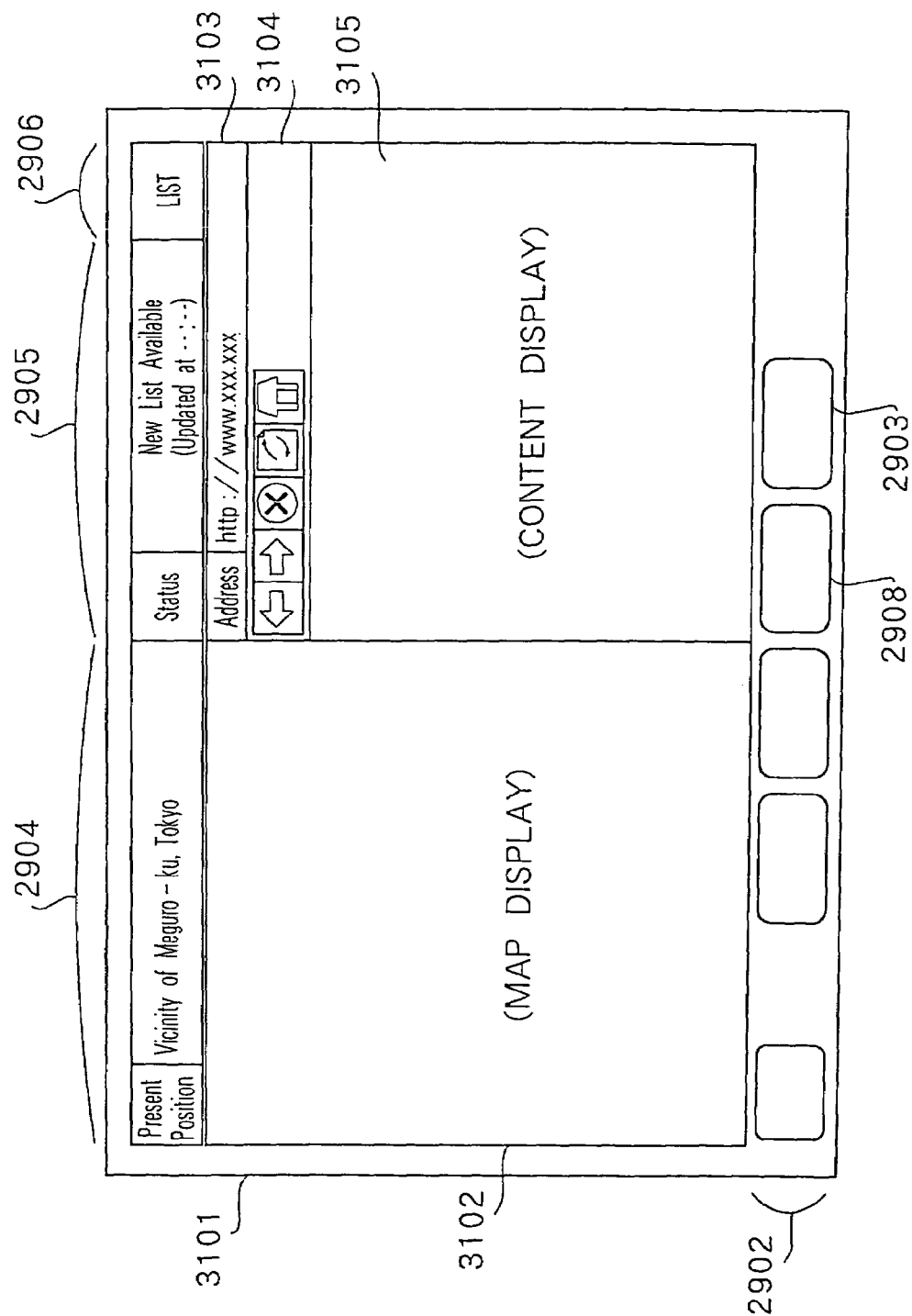
FIG. 31 is a third drawing showing an example of the panel and screen display of a car navigation type content receiving terminal according to Embodiment 1.

FIG. 31 shows an example of screen display in split-screen mode. In this mode, the screen 3101 is divided into a left area and a right area, and a map display area 3102 and browser display area 3105 are displayed simultaneously.

Next, screen transitions of content receiving terminal 103 will be described using FIG. 32 and FIG. 33.

Figure 32:
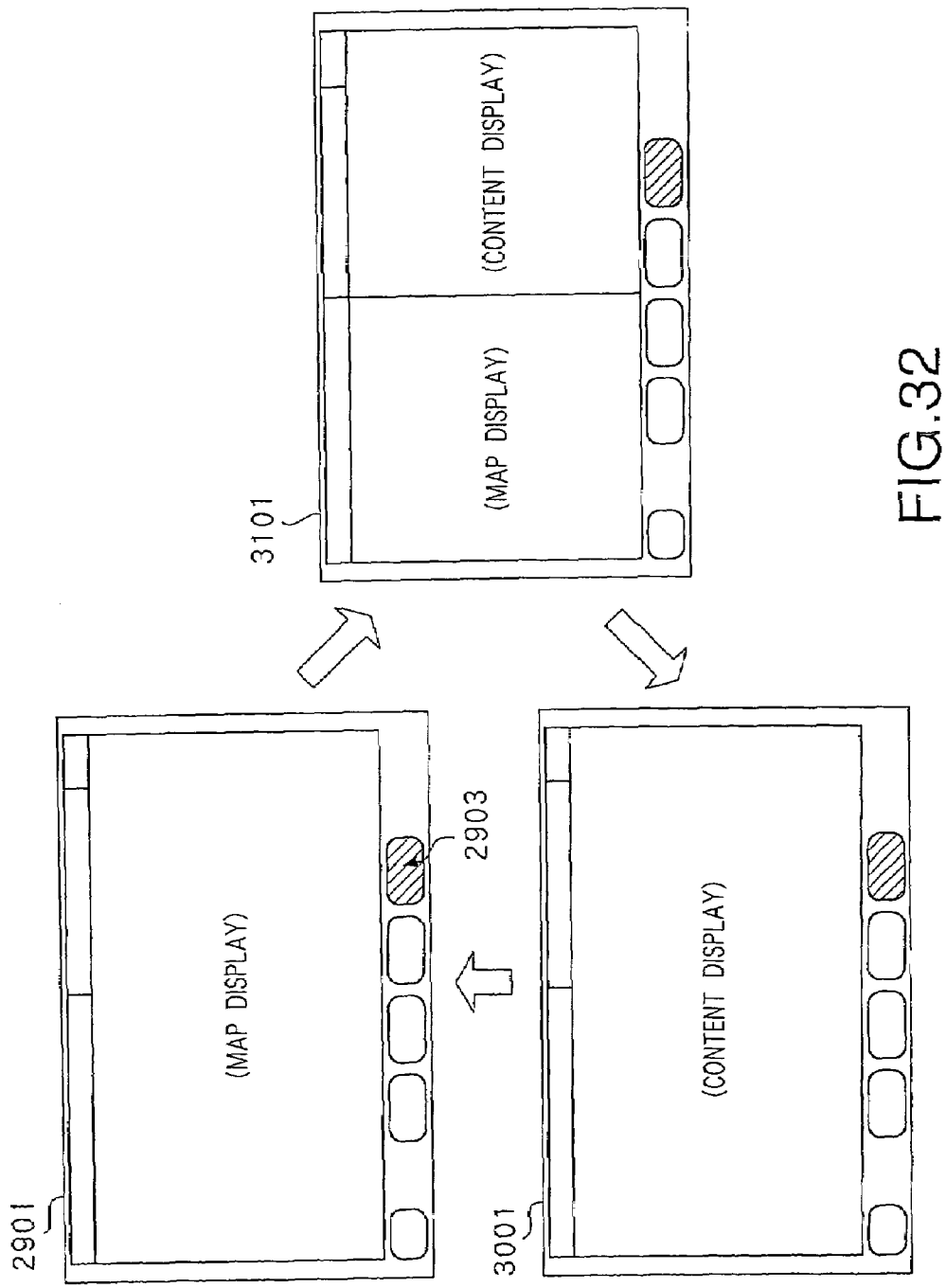
FIG. 32 is a drawing illustrating screen switching of a car navigation type content receiving terminal according to Embodiment 1.

FIG. 32 is a drawing illustrating screen switching of content receiving terminal 103. As shown in this drawing, pressing screen switching button 2903 switches successively between map display mode, split-screen mode, and content display mode.

Figure 33:
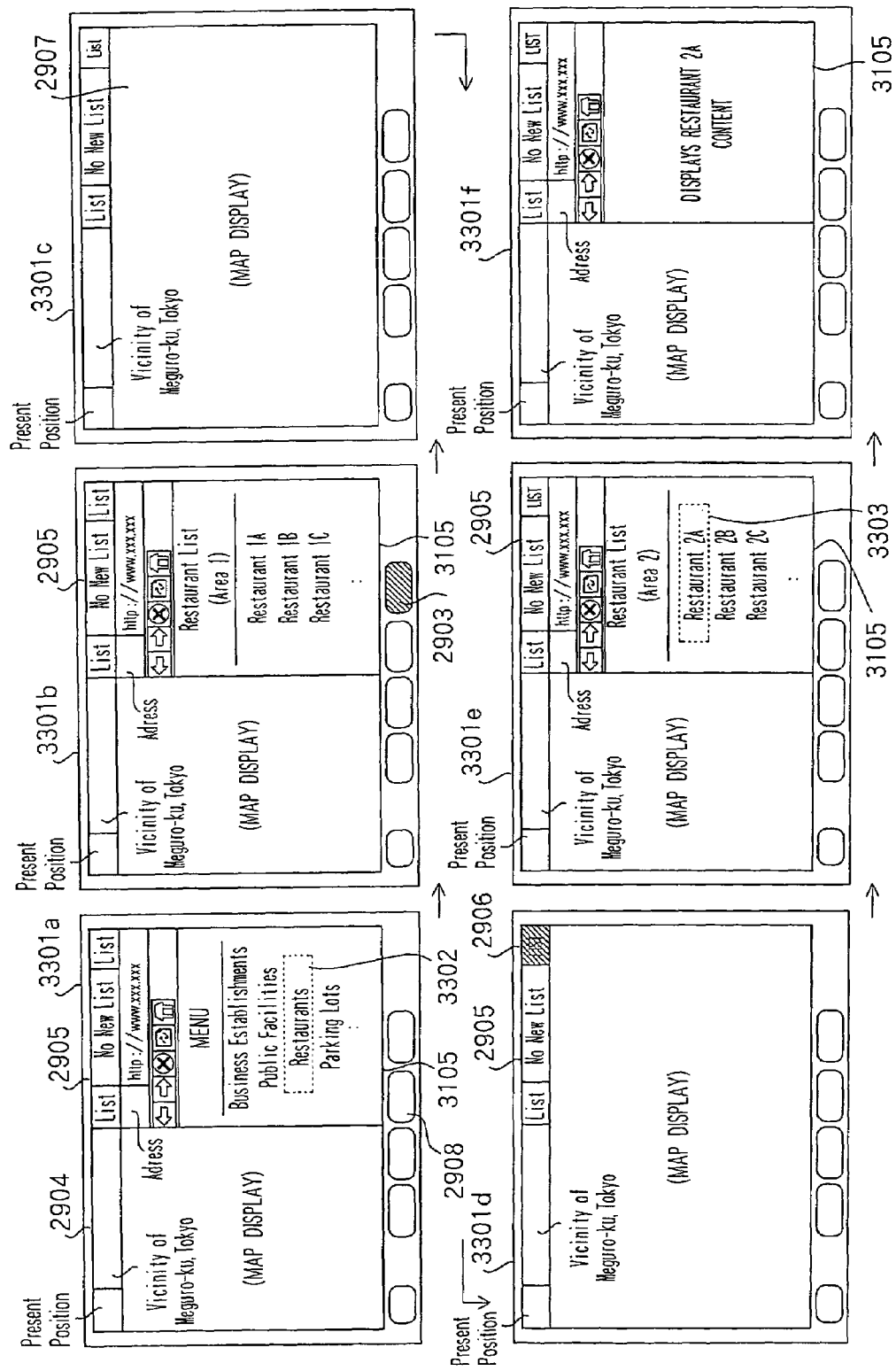
FIG. 33 is a drawing showing the flow of content viewing by means of a car navigation type content receiving terminal according to Embodiment 1.

FIG. 33 is a drawing showing an example of the flow of content viewing by means of content receiving terminal 103. This drawing shows the following flow: menu content display and content category selection (3301*a*), area-specific list content display (3301*b*), map or general content viewing (3301*c*), update information notification in line with movement (3301*d*), area-specific list content updating (3301*e*), and location-dependent content viewing (3301*f*).

Here, it is assumed that content distribution is performed in accordance with the scenario shown in FIG. 4, and content receiving terminal 103 is initially located in area 401*a*. It is also assumed that content receiving terminal 103 is initially in split-screen mode.

First, the user selects the channel for broadcasting menu content by operating broadcast reception channel selection button 2908. Reference numeral 3301*a* indicates a drawing of the state in which menu content is displayed in split-screen mode. At this time, location information acquired by means of GPS, or the address of the present position found from that location information, is displayed in present position information display section 2904, and "No new list" is displayed in status display section 2905.

When the user now selects "Restaurants" from the menu content, HTML list content (=area-specific list content) generated from CAML list content is displayed in browser display area 3105 as indicated by reference numeral 3301*b* in the drawing. Restaurants within area 401*a* are listed in this list content. At this time, also, "No new list" is displayed in status display section 2905. This means that the currently displayed list content is the latest list content.

Now assume that the user wishes to view a map. The user presses screen switching button 2903, switching from split-screen mode to map display mode, and a map is displayed as indicated by reference numeral 3301*c* in the drawing.

The user then examines the map of the present locality, or uses general car navigation functions, for a while. At this time, content receiving terminal 103 references location information acquired by means of GPS at regular intervals, and performs location information processing (see FIG. 27 and FIG. 28).

When content receiving terminal 103 moves into area 401*b*, the display in status display section 2905 changes from "No new list" to "New list available", and list content display button 2906 has its color reversed, or flashes, as indicated by reference numeral 3301*d* in the drawing.

To view the new list content, the user clicks list content display button 2906. Content adaptation processing is then performed based on the latest location information, and a list of restaurants in area 401*b* is displayed on the screen as indicated by reference numeral 3301*e* in the drawing. When the user selects restaurant 2A from the list content at this point, restaurant 2A content is displayed in browser display area 3105 as indicated by reference numeral 3301*f* in the drawing.

Thus, the provision of status display section 2905 and list content display button 2906 on the screen of content receiving terminal 103 makes it possible to notify the user of list content updates as appropriate, and to display list content only when desired by the user.

In the above description of screen display, a case has been described in which content receiving terminal 103 takes the form of a car navigation system, but content receiving terminal 103 may also take the form of a PDA terminal.

Figure 34:
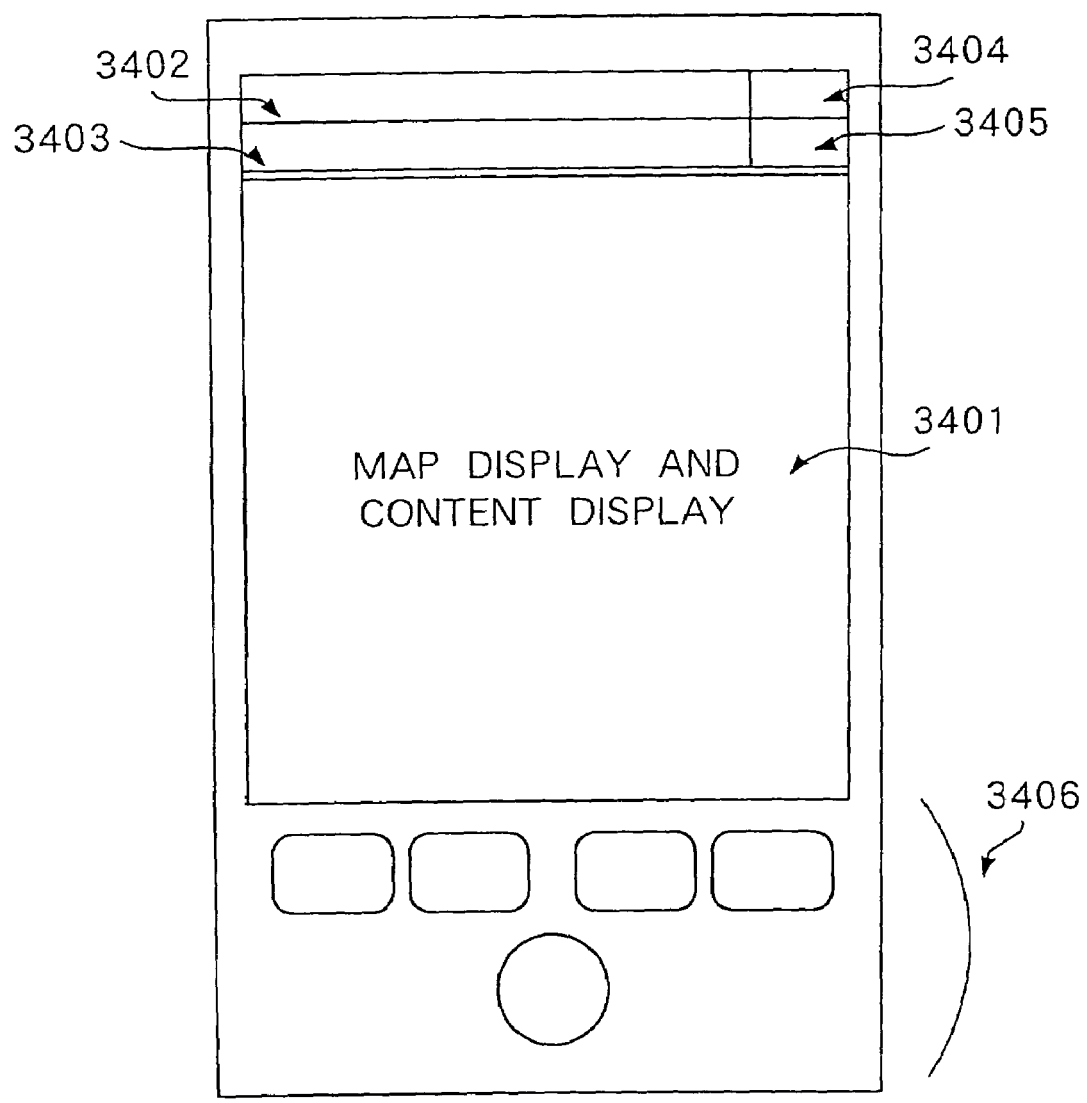
FIG. 34 is a drawing showing an example of screen display of a PDA-type content receiving terminal according to Embodiment 1.

Screen display when content receiving terminal 103 is a PDA terminal will be described below using FIG. 34. FIG. 34 is a drawing showing another example of screen display of content receiving terminal 103 according to Embodiment 1.

Content receiving terminal 103 has a data broadcast reception function, Internet access function, and GPS reception function, and can receive the above-described kind of content adaptive distribution while moving.

Specifically, a content display area 3401 is provided in the central part of content receiving terminal 103.

Content display area 3401 is an area that displays a Web browser or map display browser displaying content. In this case, as content receiving terminal 103 is a PDA terminal, the display screen size of content display area 3401 is generally not large. Therefore, content display area 3401 is switched between browser mode and map display mode. In browser mode, content display area 3401 displays a typical Web browser. In map display mode, typical car navigation system functions such as route guidance are also provided in addition to present locality map display and map retrieval.

A present position information display section 3402 is provided at the top of content receiving terminal 103.

Present position information display section 3402 is an area that displays information relating to the present position, such as an address or latitude and longitude coordinate values. Present position information display section 3402 displays latitude and longitude coordinate values obtained at regular intervals by means of GPS. Content receiving terminal 103 has a function for finding an address from latitude and longitude coordinate values, and therefore present position information display section 3402 can display an address.

A list content information display section 3403 is provided below and adjacent to present position information display section 3402 of content receiving terminal 103.

List content information display section 3403 is an area that displays information relating to list content. In content adaptive distribution according to Embodiment 1, as described above, it is possible to update list content comprising information relating to content for the present locality in line with movement of content receiving terminal 103. List content information display section 3403 indicates "presence" or "absence" of new list content. When there is new list content, list content information display section 3403 displays the list content update time—or to be more precise, displays the time at which the existence of new list content is confirmed.

When there is new list content, list content information display section 3403 may notify the user that list content has been updated by such means as changing or reversing the color of displayed characters, or emitting a tone.

A screen switching button 3404 is provided to the right of and adjacent to present position information display section 3402 of content receiving terminal 103.

Screen switching button 3404 is a toggle button for switching between content display area 3401 map display mode and browser mode. The user can switch between map display mode and browser mode at any time by pressing screen switching button 3404.

A list content display button 3405 is provided to the right of and adjacent to list content information display section 3403 of content receiving terminal 103.

List content display button 3405 is a list content update (display) button. When a state in which new list content can be acquired is established due to movement of content receiving terminal 103, the display state of list content information display section 3403 changes. If the user presses list content display button 3405 at this time, content display area 3401 is switched to browser mode, and displays list content.

"A state in which new list content can be acquired" refers to a state in which "CHANGE" is received as the response to a location information notification message transmitted from content display section 110 to content processing section 105. This response message indicates that the result of location determination processing shows that the area to which content receiving terminal 103 belongs has changed, and a list content reference destination (URL) is included in the message. When the user presses list content display button 3405, this list content reference destination is passed to browser section 113, and content processing section 105 executes content adaptation processing on the list content and transmits the generated new area-specific list content to content display section 110. As a result, the (area-specific) list content displayed by browser section 113 is updated.

When list content is updated in line with movement of content receiving terminal 103, the user may be notified that list content has been updated by such means as changing the color of list content display button 3405. In this case, pressing list content display button 3405 once will restore list content display button 3405 to its original color. If list content display button 3405 is pressed when there is no new list content, previously viewed list content relating to the present locality will be displayed.

At the bottom of content receiving terminal 103, PDA operating switches 3406 are provided. PDA operating switches 3406 comprise various hardware switches (buttons) of the PDA unit.

While content adaptive distribution service according to Embodiment 1 is being received, present position information display section 3402, list content information display section 3403, screen switching button 3404, and list content display button 3405 are constantly displayed on the PDA screen of content receiving terminal 103.

The screen layout and design of content receiving terminal 103 need not be limited to those shown in FIG. 34, but may be of any kind as long as they enable the same kind of functions to be implemented.

Figure 35:
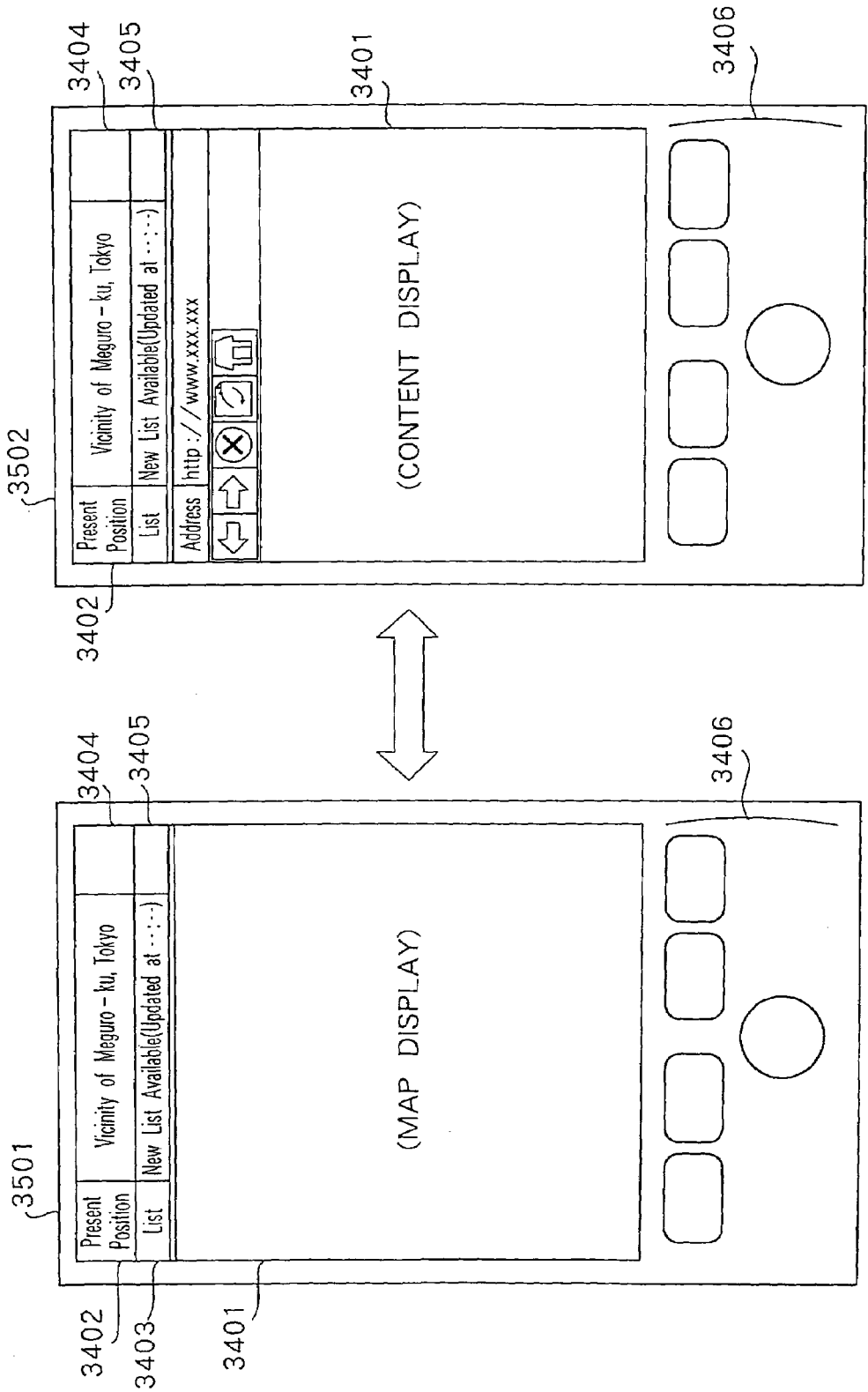
FIG. 35 is a drawing illustrating screen switching of a PDA-type content receiving terminal according to Embodiment 1.

Next, screen switching of a PDA-type content receiving terminal 103 according to Embodiment 1 will be described using FIG. 35. FIG. 35 is a drawing illustrating screen switching of a PDA-type content receiving terminal according to Embodiment 1.

In the drawing, reference numeral 3501 indicates the screen of content receiving terminal 103 in map display mode, and reference numeral 3502 indicates the screen of content receiving terminal 103 in browser mode.

Map display mode has a present position display function and search (retrieval) function, and is provided with a GUI (not shown) for switching between these two functions.

The present position display function draws a map centered on the present position latitude and longitude coordinate values acquired by means of GPS, and redraws the map at regular intervals in line with movement.

The search (retrieval) function enables a target position or arbitrary location to be located using a map. Although not shown in FIG. 35, a GUI is provided for basic map operations such as change, enlargement, and reduction of the map display area.

When a specific search point is decided on using the search (retrieval) function, the latitude and longitude coordinate values of that location are reported to setting section 109 of content processing section 105. That is to say, content receiving terminal 103 can use not only content distribution relating to the present locality, but also content distribution relating to any location such as a target position.

Figure 36:
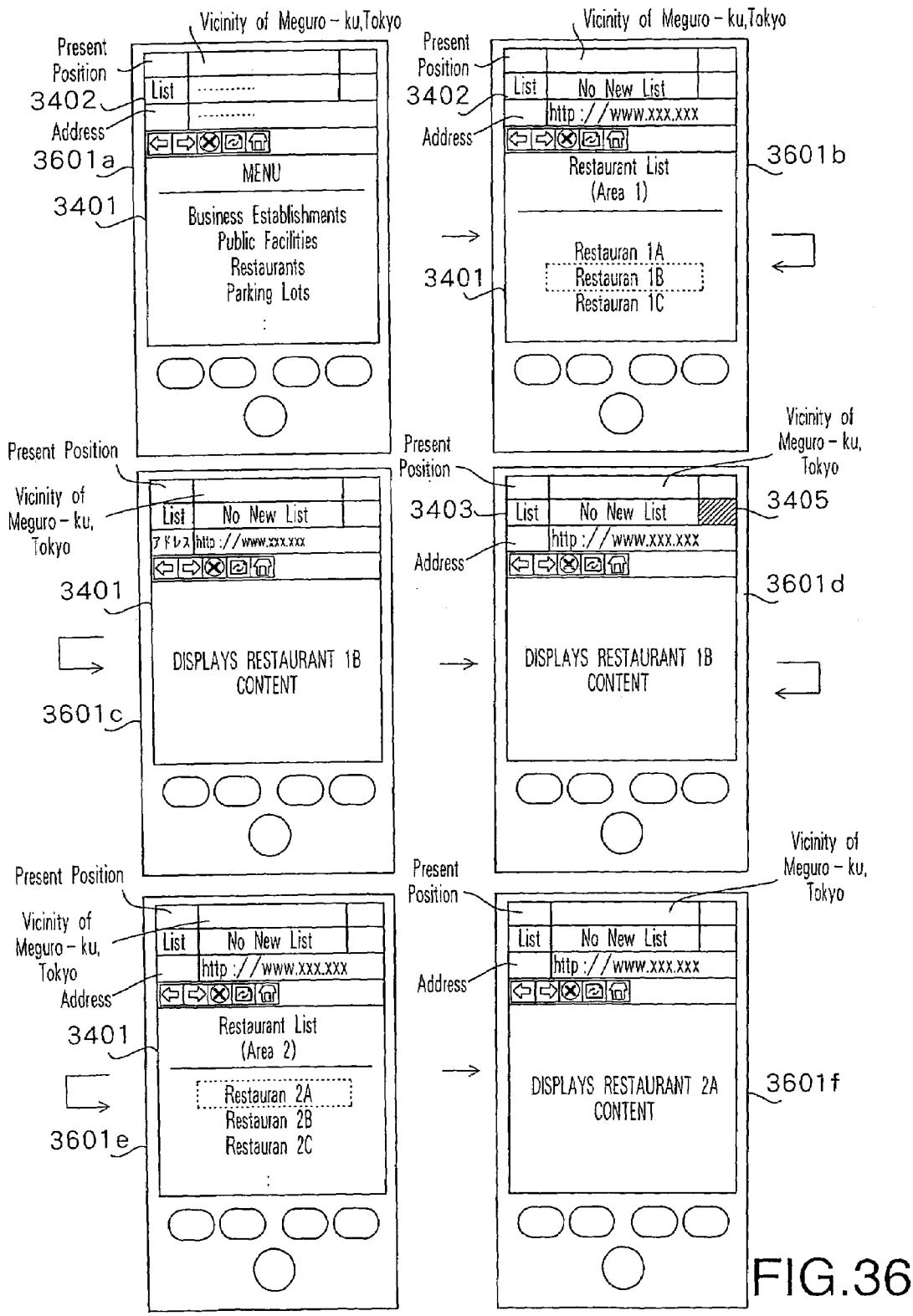
FIG. 36 is a first drawing showing the flow of content viewing by means of a PDA-type content receiving terminal according to Embodiment 1.

Next, screen transitions of content receiving terminal 103 in content adaptive distribution while moving will be described using FIG. 36. FIG. 36 is a drawing showing the flow of content viewing by means of a PDA-type content receiving terminal according to Embodiment 1.

When content adaptive distribution service is received, content display area 3401 is in browser mode, as indicated by reference numeral 3601a in the drawing, and menu content is displayed on the screen. At this time, location information acquired by means of GPS, or the address of the present position found from that location information, is displayed in present position information display section 3402.

When the user now selects "Restaurants" from the menu content displayed in content display area 3401, HTML list content (=area-specific list content) generated from CAML list content is displayed in content display area 3401 as indicated by reference numeral 3601b in the drawing. It is assumed that the present position of the user at this time is within area 401a in FIG. 4.

Restaurants within area 401a are listed in the list content displayed in content display area 3401. At this time, "No new list" is displayed in list content information display section 3403. This indicates that the currently displayed list content is the latest list content.

When the user now selects "Restaurant 1B" from the list content displayed in content display area 3401, content display section 110 accesses the URL of restaurant 1B and displays restaurant 1B content as indicated by reference numeral 3601c in the drawing.

The user then views restaurant 1B content for some time, while moving. At this time, content receiving terminal 103 references location information acquired by means of GPS at regular intervals, and performs location determination processing.

When the user leaves area 401a and enters area 401b, the fact that the result of location determination processing has changed is indicated by means of list content display button 3405 (by reversing the color of the button, flashing the button display, etc.) as indicated by reference numeral 3601d in the drawing. At this time, the display in list content information display section 3403 is changed from "No new list" to "New list available".

To view the new list content, the user clicks list content display button 3405. Content receiving terminal 103 then references the latest location information and performs content adaptation processing on stored CAML content, and content display section 110 generates new HTML list content. The new HTML list content is then displayed in content display area 3401 as indicated by reference numeral 3601e in the drawing. This list content lists restaurants in area 2.

When the user selects restaurant 2A from the list content, restaurant 2A content is displayed in content display area 3401 as indicated by reference numeral 3601f in the drawing.

Thus, the provision of list content information display section 3403 and list content display button 3405 on the screen of a PDA-type content receiving terminal 103 makes it possible to notify the user of list content updates as appropriate, and to display list content only when desired by the user.

Figure 37:
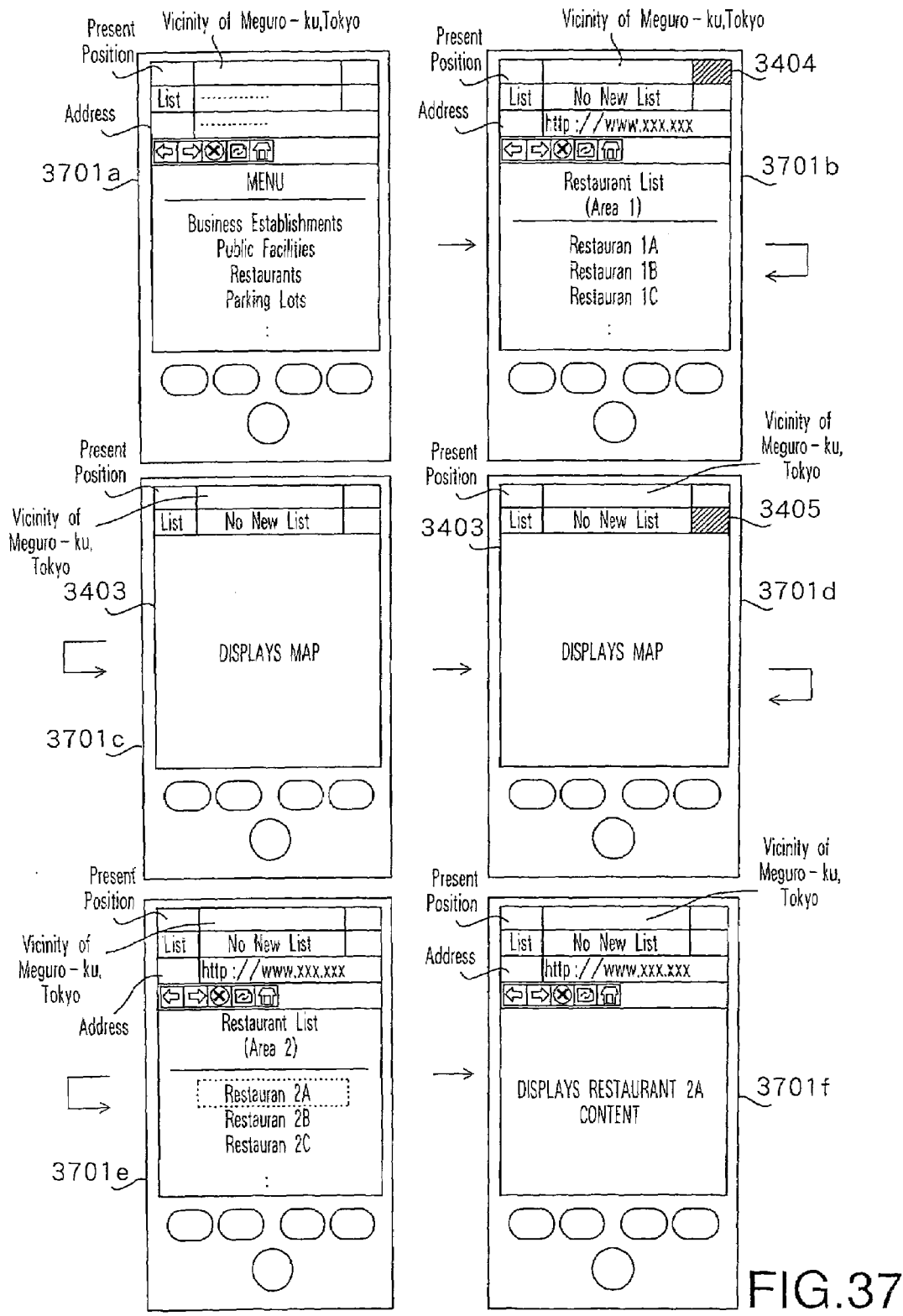
FIG. 37 is a second drawing showing the flow of content viewing by means of a PDA-type content receiving terminal according to Embodiment 1.

Next, screen transitions of content receiving terminal 103 when a user views a map while moving during content adaptive distribution will be described using FIG. 37. Like FIG. 36, FIG. 37 is a drawing showing the flow of content viewing by means of a PDA-type content receiving terminal.

The states indicated by reference numerals 3701a and 3701b in the drawing are the states indicated by reference numerals 3601a and 3601b in FIG. 36. This time, however, the user does not select a restaurant from the list content.

After area 401a list content is displayed as indicated by reference numeral 3701b in the drawing, the user presses screen switching button 3404. Content receiving terminal 103 then switches content display area 3401 from browser mode to map display mode as indicated by reference numeral 3701c in the drawing.

The user then moves for some time while viewing a map of the present locality, and when the user leaves area 401a and enters area 401b, the display in list content information display section 3403 changes from "No new list" to "New list available", as indicated by reference numeral 3701d in the drawing. At the same time, content display section 110 notifies the user that there is new list content by reversing the color of, or flashing, list content display button 3405.

To view the new list content, the user clicks list content display button 3405. Area 401b list content is then displayed in content display area 3401, as indicated by reference numeral 3701e in the drawing.

The processing indicated by reference numeral 3701f in FIG. 37 is the same as that indicated by reference numeral 3601f in FIG. 36, and therefore a description thereof will be omitted here.

From this point on, the user can view a map at any time by means of screen switching button 3404.

Thus, the provision of screen switching button 3404 in addition to list content information display section 3403 and list content display button 3405 on the screen of a PDA-type content receiving terminal 103 makes it possible to receive list content update notification even while viewing a map, as long as the category for which distribution is desired is selected beforehand from the menu content.

As described above, according to Embodiment 1, in a system combining broadcast distribution to an unspecified plurality of terminals by means of data broadcasting and terminal-by-terminal on-demand type distribution by means of bidirectional communication, URL information of a group of location-dependent content entities belonging to the same area geographically is enclosed by location elements, location conditions (area information) are added as attributes, and it is possible to generate area-specific list content matching location conditions in which received location information is included from CAML list content in which are listed location elements equivalent to the number of areas.

Also, providing a user with area-specific list content generated from list content enables the user to select location-dependent content for the present locality efficiently.

Moreover, location-dependent content itself is not contained in list content, but only the reference destination (to be specific, the URL) of location-dependent content and additional information are written, the amount of data of which is small, so that the communication cost for distribution thereof is low.

According to Embodiment 1, also, categories of location-dependent content that can be distributed can be presented to a user, using menu content. The user can then receive category related list content distribution by referring to the menu content and selecting a category. Combining menu content with list content in this way improves the convenience of a content distribution service. Also, by using data broadcasting for menu content distribution, it is possible to implement efficient content distribution combining broadcast distribution of common information with individual distribution of terminal-specific information.

According to Embodiment 1, also, it is possible to distribute not only content relating to content adaptive distribution, but also general content. Thus, a content processing apparatus has a high degree of compatibility with existing Web systems, and system construction is simplified.

According to Embodiment 1, also, it is possible to store list content, and perform processing to compare location information with location conditions in the stored list content, as a result of which the amount of communication with a server does not increase even if notification of location information is performed frequently. Furthermore, a reply to the receiving side (return of the result of a location comparison) in response to location information notification can be provided immediately.

According to Embodiment 1, also, when content processing section 105 receives a distribution request for list content that is identical to stored list content, new area-specific list content can be generated using the stored list content, without receiving list content from a server again. It is thus possible to reduce the amount of communication related to list content transmission and reception, and shorten the waiting time for content display on the receiving side.

According to Embodiment 1, also, when a location condition list is generated by extracting location conditions from list content, and processing to compare location information with location conditions contained in list content is performed using this location condition list, it is possible to avoid repeating processing in which analysis of the same list content is performed each time notification of location information is received. This makes it possible to execute efficient location determination.

According to Embodiment 1, also, when outputting information to the effect that location information has been updated, content processing section 105 can also output the list content reference destination. By this means content display section 110 can easily specify list content to be acquired again without the necessity of storing the list content reference destination.

According to Embodiment 1, also, content processing section 105 can notify content display section 110 of area-specific list content updating. By this means, content display section 110 can notify a user as appropriate of the list content updating situation.

According to Embodiment 1, also, it is possible for content display section 110 to request distribution of, and display, updated list content only when a user gives an instruction. This makes it possible to prevent a user being impeded in viewing any content.

According to Embodiment 1, also, it is possible for a user to ascertain easily the location information updating situation, even if some time has elapsed since notification of location information (area-specific list content) updating, by having content display section 110 display the list content updating situation on the screen.

According to Embodiment 1, also, construction of a system comprising content communication server 101 and content receiving terminal 103 that has a content adaptation processing function is possible in addition to a system comprising content processing section 105 that performs content adaptation processing between content communication server 101 and content display section 110, thereby providing flexibility of system construction.

According to Embodiment 1, also, HTTP is used for communication between content communication server 101 and content processing section 105, and a protocol based on HTTP but with specifications added for reporting location information, a response to location information notification, and data broadcast reception information, is used for communication between content processing section 105 and content display section 110. By thus using original specifications only for communication relating to location adaptive processing and data broadcast reception, a high degree of compatibility with general Web systems based on HTML and HTTP is achieved. As a result, system construction is simplified.

According to Embodiment 1, also, a user can easily ascertain the present locality situation through the provision of a map display function. Moreover, a user can ascertain the situation regarding the latest location information (area-specific list content) even while viewing any content or map data, and can display area-specific list content when necessary.

According to Embodiment 1, also, it is possible to receive menu content sent from content broadcast server 102 by means of carousel-type data broadcasting, and list content sent from content communication server 101 by means of communication, and to retransmit these received kinds of content. By this means, it is possible to provide a content distribution service offering a high degree of user convenience that combines the features of passive content viewing by means of broadcasting and active content viewing by means of communication.

According to Embodiment 1, also, in content adaptive distribution system 100 combining broadcasting and communication, it is possible to provide a content viewing environment (location information service) for a mobile terminal that enables content relating to the present locality to be acquired efficiently, with location information service related menu information distributed by means of broadcasting as a starting point.

According to Embodiment 1, also, a message requesting relay distribution of content distributed by content communication server 101 (general content distribution request message), and a message requesting relay distribution of content for which location adaptive processing is possible using location information distributed by content communication server 101 (location adaptive content distribution request message), are HTTP GET messages with different file name extensions, facilitating the incorporation of content processing section 105 into a general Web system based on HTTP and HTML.

According to Embodiment 1, also, communication processing section 106 can perform parallel execution of a plurality of general content distribution request messages, and can perform serial processing of location adaptive content distribution request messages in accordance with their order of reception. Thus, although image data and the like constituting HTML content may have an arbitrary order of distribution and order of display but it is not possible to provide content appropriate to the latest location unless location adaptive processing is executed in accordance with the order of location information notification, by differentiating between general content and location adaptive content and executing distribution processing appropriate to individual characteristics, it is possible to improve user convenience with regard to content display.

According to Embodiment 1, also, broadcast processing section 107 stores content received from content broadcast server 102, and when storage is completed, data broadcast reception is stopped, and stored content can be distributed to content display section 110 by means of PUSH-type stream distribution using communication. By this means, content received by means of broadcasting can be redistributed by means of communication. As a result, content processing section 105 does not need a broadcast transmitting section, enabling the costs necessary for system construction to be kept down.

According to Embodiment 1, also, broadcast processing section 107 can stop distribution after a predetermined number of repetitions of distribution of content received from content broadcast server 102 by means of PUSH-type stream distribution using communication. By this means, it is possible for stream distribution to be repeated a predetermined number of times, rather than redistributing content once only. As a result, the risk of failure of content distribution can be reduced. Moreover, since content distribution processing is stopped when content has been distributed a predetermined number of times, the processing load can also be reduced.

According to Embodiment 1, also, broadcast receiving section 114 of content display section 110 is provided with a PUSH-type stream reception function in addition to a data broadcast reception function, enabling overall content distribution system costs related to content distribution by means of data broadcasting to be reduced.

According to Embodiment 1, also, when the same content is transmitted repeatedly by means of PUSH-type stream distribution using communication, broadcast receiving section 114 receives the content only once. As content display section 110 receives content based on the premise that content is transmitted repeatedly from content processing section 105 in this way, the risk of failing to receive content can be reduced.

Embodiment 1 may also be implemented in a mode whereby processing performed by content processing section 105 or content display section 110 is made a program and is stored in a recording medium that can be read by a general-purpose computer, and this program is executed by a general-purpose computer.

In Embodiment 1, a configuration has been described in which content processing section 105 and content display section 110 are provided in content receiving terminal 103, but a mode is also possible in which content processing section 105 and content display section 110 are separate terminals.

A mode is also possible whereby processing performed by a content receiving terminal according to Embodiment 1 is carried out by making processing performed by content receiving terminal 103 according to Embodiment 1 a program, storing this program in a recording medium, and having this program read by a computer.

Embodiment 2

Embodiment 2 of the present invention is a combined broadcasting/communication content adaptive distribution system in a case where a content processing section that performs content adaptation processing and content relay transfer processing does not have a broadcast transmission function.

Figure 38:
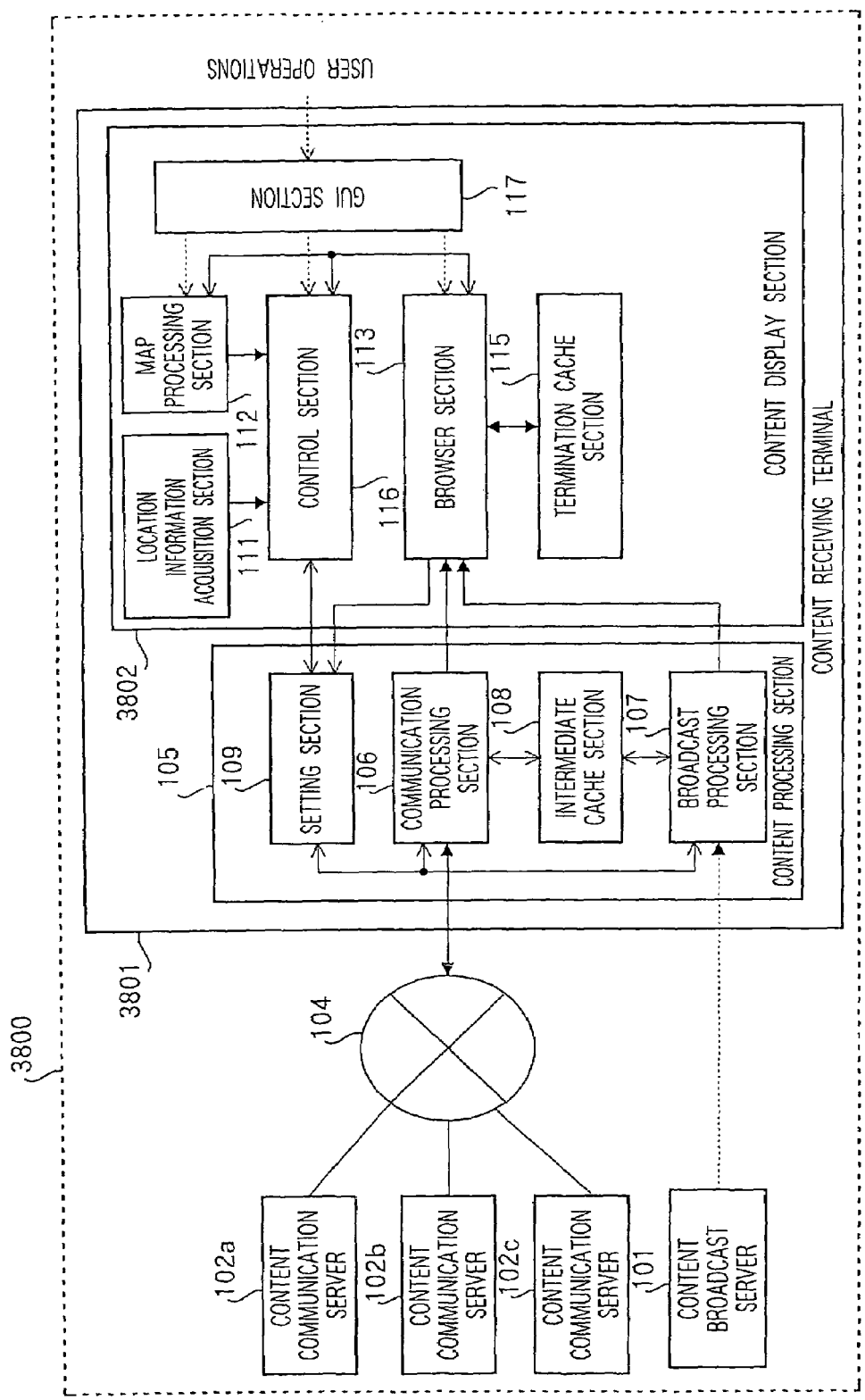
FIG. 38 is a system configuration diagram of a content adaptive distribution system according to Embodiment 2 of the present invention.

A content adaptive distribution system according to Embodiment 2 will be described below using FIG. 38. FIG. 38 is a system configuration diagram of a content adaptive distribution system according to Embodiment 2.

Content adaptive distribution system 3800 in FIG. 38 is a system in which broadcast receiving section 114 has been eliminated from content adaptive distribution system 100 in FIG. 1. Here, descriptions of parts identical to those in FIG. 1 will be omitted, and only parts relating to broadcast content transmission and reception differing from those in FIG. 1 will be described.

In content adaptive distribution system 100 in FIG. 1, broadcast processing section 107 receives content from content broadcast server 102, and transmits the received content to broadcast receiving section 114. At this time, content transmission and reception between broadcast processing section 107 and broadcast receiving section 114 is executed by means of broadcasting or pseudo-broadcasting (using a communication protocol such as UDP/IP).

In content adaptive distribution system 3800 in FIG. 38, on the other hand, broadcast processing section 107 receives content from content broadcast server 102 and transmits the received content to browser section 113. At this time, content transmission and reception between broadcast processing section 107 and browser section 113 is executed by means of HTTP. That is to say, broadcast processing section 107 has an HTTP communication function.

The broadcast content transmission/reception procedure in content adaptive distribution system 3800 in FIG. 38 will now be described. First, (in the same way as in Embodiment 1) a broadcast reception instruction is transmitted from content display section 3802 to content processing section 105 by means of extended HTTP. On receiving the broadcast reception instruction, content processing section 105 receives a carousel-type data broadcast on the specified channel, and temporarily stores the content in intermediate cache section 108. When temporary storage of content is completed, content processing section 105 transmits a message reporting the URL (or file name) of the temporarily stored content to content display section 3802 by means of extended HTTP.

This message is a response message in reply to the broadcast reception instruction message. On receiving the response message, content display section 3802 issues an instruction to browser section 113 to acquire content of the URL contained in the response message.

Browser section 113 transmits a (general) HTTP GET message to content processing section 105, and acquires the temporarily stored content from content processing section 105 by means of HTTP.

Thus, in content adaptive distribution system 3800, broadcast content distribution is performed by means of two-stage processing: "broadcast reception and URL notification" and "content transmission/reception by means of HTTP."

Figure 39:
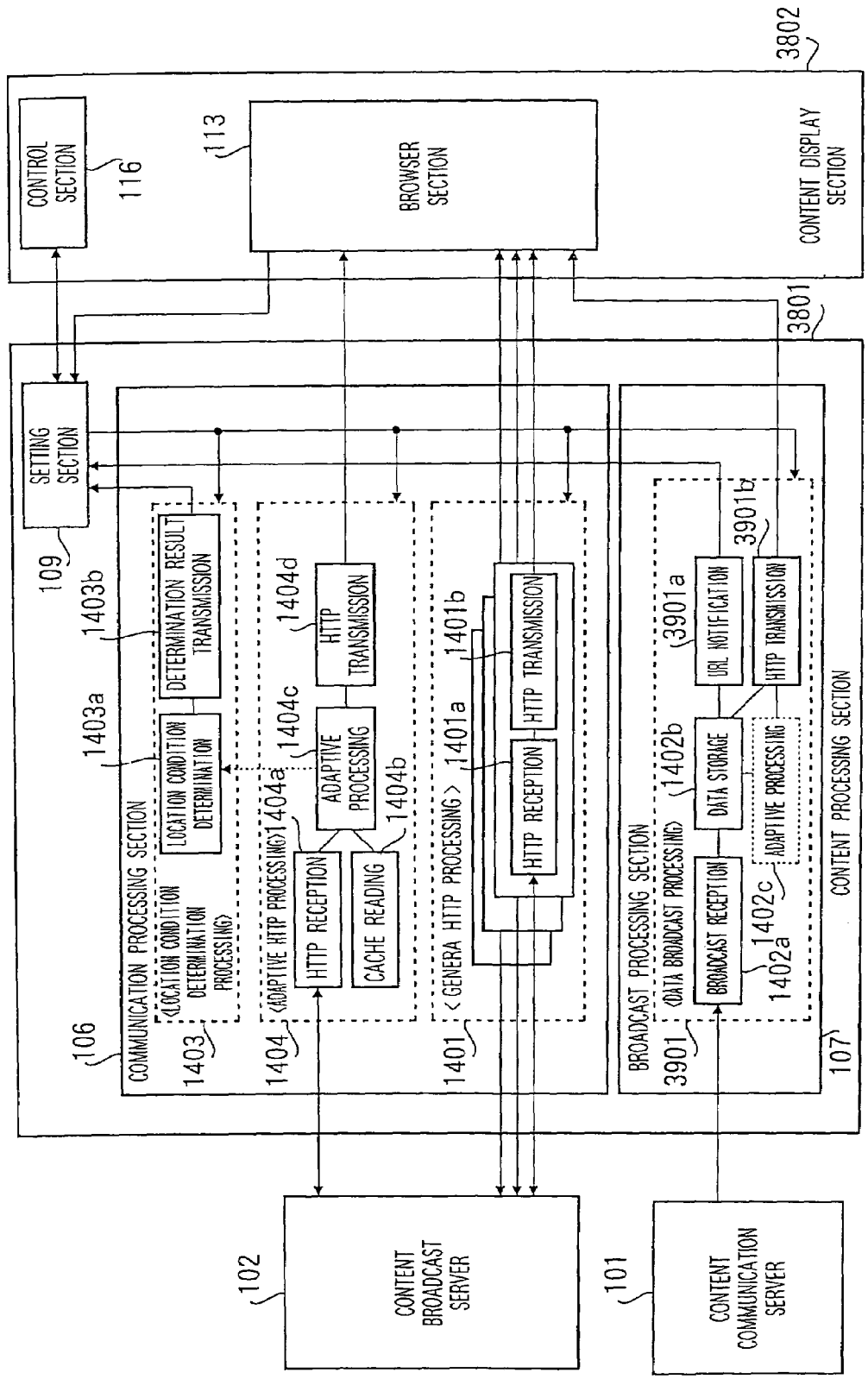
FIG. 39 is a drawing showing details of content processing according to Embodiment 2.

Next, the processing executed by content processing section 105 will be described. FIG. 39 is a drawing showing details of content processing by content processing section 105. The three kinds of processing executed by communication processing section 106—general HTTP processing (1401), location condition determination processing (1403), and adaptive HTTP processing (1404)—are the same as in Embodiment 1, and a description thereof will be omitted here.

The data broadcast processing (3901) performed by broadcast processing section 107 will now be described. This data broadcast processing 3901 denotes a series of processing procedures comprising "broadcast reception" (1402a) in which data of a specified channel is received from content broadcast server 102 carousel-type data broadcasting, "data storage" (1402b) in which appropriate content is extracted from carousel-type data broadcasiting and temporarily stored in a cache, "URL notification" (3901a) in which the URL (or file name) of content stored in the cache is reported to content display section 3802, and "HTTP transmission" (3901b) in which content stored in the cache is transmitted to content display section 3802 when an HTTP GET message is received from content display section 3802. This data broadcast processing is executed when an extended-HTTP message corresponding to a data broadcast reception request is received from content display section 3802.

When content is CAML content for which location adaptation is possible, "adaptive processing" (1402c) is carried out before "HTTP transmission" (3901b).

Table 4000 shown in FIG. 40 summarizes the processing contents of content processing section 105 according to request/notification contents transmitted from content display section 3802 to content processing section 105.

In FIG. 40, processing indicated by reference numeral 4001 is content processing for a menu content acquisition request, processing indicated by reference numeral 1502 is content processing for a list content acquisition request, processing indicated by reference numeral 1503 is content processing for a location-dependent content acquisition request, processing indicated by reference numeral 1504 is content processing for a general content acquisition request, and processing indicated by reference numeral 1505 is content processing for location information notification. Only processing 4001—that is, data broadcast processing—which differs from the processing in Embodiment 1 will be described here.

As mentioned above, data broadcast processing—that is, menu content transmission/reception processing—comprises two processing stages: "broadcast reception and URL notification" (4001a) and "content transmission/reception by means of HTTP" (4001b).

First, "broadcast reception and URL notification" indicated by reference numeral 4001a will be described. When menu content distributed by data broadcasting is transmitted and received, a broadcast reception instruction (BRecv) is transmitted from control section 116 to setting section 109 by means of extended HTTP. On receiving this message, setting section 109 instructs broadcast processing section 107 to execute data broadcast processing.

In response to this, broadcast processing section 107 receives content from the specified channel, stores this in intermediate cache section 108, and notifies setting section 109 of the URL (or file name) of the stored content.

Setting section 109 then notifies control section 116 of the URL of the stored content by means of extended HTTP. Setting section 109 saves the URL of the stored content.

Next, "content transmission/reception by means of HTTP" indicated by reference numeral 4001b will be described. The content stored in intermediate cache section 108 of content processing section 105 is menu content received from content broadcast server 102. Control section 116 of content display section 3802 has acquired the URL of the stored menu content by means of the "broadcast reception and URL notification" series of processing procedures, and therefore instructs browser section 113 to acquire the content of this URL.

Browser section 113 performs content acquisition in accordance with general HTTP. In other words, browser section 113 sends an HTTP GET instruction to setting section 109.

Setting section 109 transmits the content of the URL indicated by the GET instruction—that is, the menu content temporarily stored in intermediate cache section 108—to browser section 113.

The processing method when setting section 109 receives an HTTP GET instruction is a problem. Setting section 109 receives (1) not only an HTTP GET instruction relating to menu content received from content broadcast server 102, but also (2) an HTTP GET instruction relating to content received from content communication server 101 (this corresponds to the processing indicated by reference numerals 1503 and 1504 in FIG. 40).

In latter case (2), so-called relay transfer processing is performed in which an HTTP GET instruction is transmitted to an appropriate content communication server 101, and the response is transferred to browser section 113.

In former case (1), on the other hand, it is only necessary for content already stored in intermediate cache section 108 in content processing section 3801 to be transmitted to browser section 113. That is to say, setting section 109 must differentiate between former case (1) and latter case (2).

Therefore, when setting section 109 reports the URL to control section 116 after receiving content from a broadcast, setting section 109 saves that URL, and on receiving an HTTP GET instruction, determines whether processing (1) or (2) should be executed by comparing the URL contained in the GET instruction with the saved URL.

In Embodiment 2, the method of writing the URL reported to control section 116 from setting section 109 is as follows.

http://machine_name/cache_name/file_name

Here, "machine_name" is the_name of the_machine operated by content processing section 105 (computer name, IP address, etc.), "cache name" is the name of the directory in which content received from a broadcast is stored, and "file_name" is the file name of the stored content.

For example, if the machine name is "CProc", the cache name is "BCache", and the file name is "Menu01.html", the URL reported to control section 116 from setting section 109 is as follows.

http://CProc/BCache/Menu01.html

This URL format specification is only an example, and any format may be used that allows recognition of an HTTP GET instruction requesting content stored in intermediate cache section 108.

A description of "content transmission/reception by means of HTTP" will be added here, based on the above URL format. Browser section 113 acquires the URL string via control section 116, writes the URL transmitted from setting section 109 directly into the HTTP GET instruction, and transmits that GET instruction to setting section 109.

On receiving the HTTP GET instruction, setting section 109 compares the URL string contained in the GET instruction with the saved URL, and if the two match, reads the content stored in intermediate cache section 108, and returns this content to browser section 113 as a response to the GET instruction.

Thus, in content adaptive distribution system 3800 according to Embodiment 2, content display section 3802, which has no broadcast reception function, implements reception of menu content distributed by means of broadcasting by executing data broadcast processing comprising the two processing stages of "broadcast reception and URL notification" and "content transmission/reception by means of HTTP."

Next, the processing executed by content processing section 105 in Embodiment 2 will be described. The processing executed by content processing section 105 is basically the same as that in Embodiment 1 described using FIG. 16 through FIG. 28. The only differences are in the data broadcast processing procedure in FIG. 18 and the unit HTTP processing procedure in FIG. 20. These two processing procedures will therefore be described here.

Figure 41:
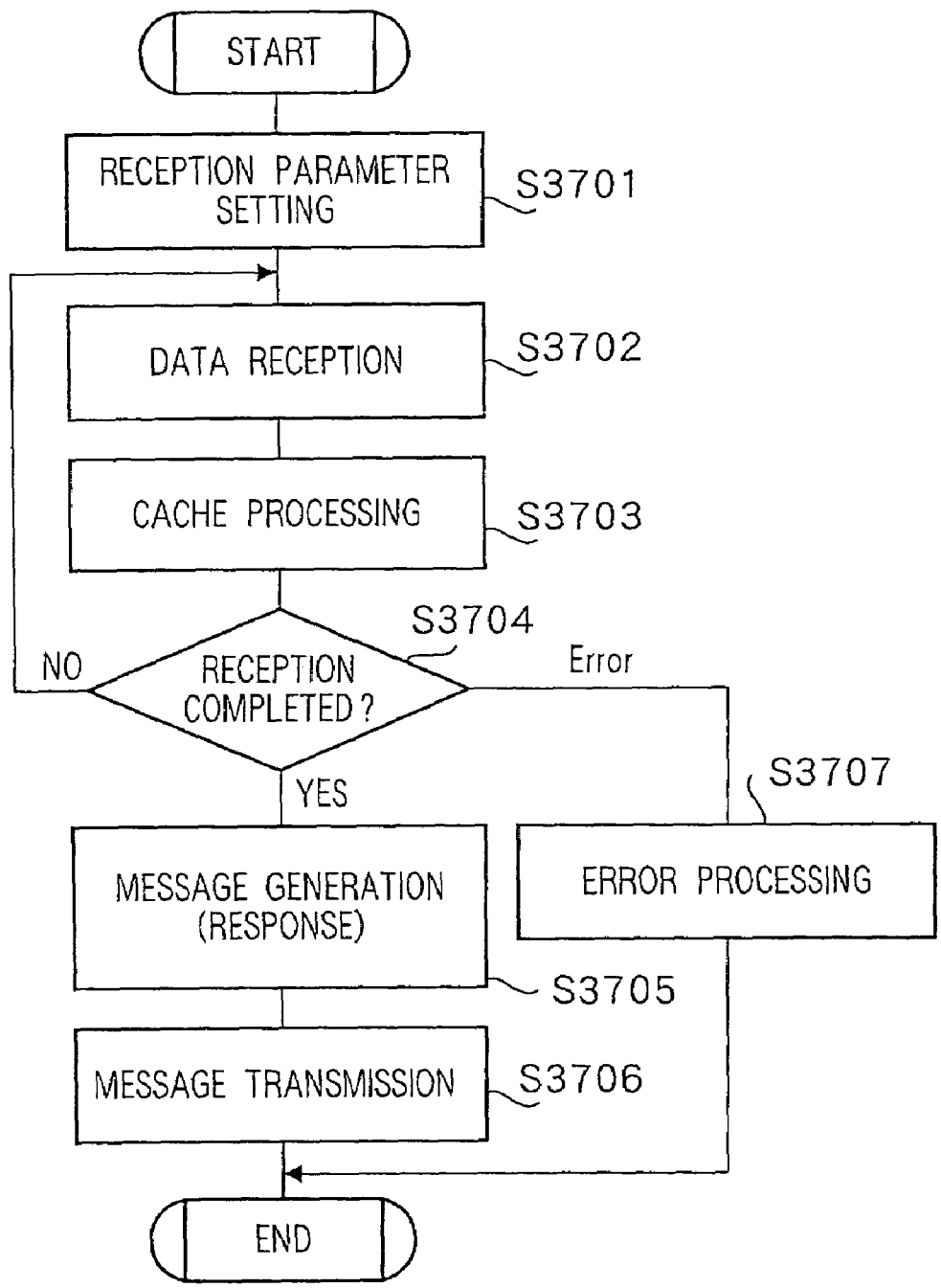
FIG. 41 is a flowchart showing the data broadcast processing procedure according to Embodiment 2.

First, data broadcast processing will be described. FIG. 41 is a flowchart showing data broadcast processing by broadcast processing section 107 of content processing section 105 according to Embodiment 2.

In data broadcast processing, broadcast processing section 107 temporarily stores content received from content broadcast server 102 carousel-type data broadcasting, and transmits the URL of the stored content to content display section 3802.

In step S3701, broadcast processing section 107 acquires a broadcast reception parameter from an extended-HTTP message (broadcast reception instruction BRecv) received from content display section 3802. To be specific, the broadcast parameter indicates the reception channel.

Then, in step S3702 through step S3704, broadcast processing section 107 receives carousel-type data broadcasting, and stores content contained in the specified channel in intermediate cache section 108.

Carousel-type data broadcasting performs periodically repeated data file distribution, and reception and storage processing is not necessarily begun at the start of a data file. Here, broadcast processing section 107 transmits data every predetermined unit in accordance with data broadcast format specifications (S3702), and repeats processing to temporarily store receive data while linking the receive data (S3703) until the entire content has been received (S3704).

When data reception is completed in step S3704, the processing flow proceeds to the next processing step, S3705. However, if data reception has not been executed correctly, step S3707 error processing is performed, and data broadcast processing is terminated.

In the processing loop comprising step S3705 and step S3706, stored content URL notification processing is executed. Broadcast processing section 107 generates a message in response to the broadcast reception instruction (S3705). The URL of the content stored in intermediate cache section 108 is written in this response message.

Setting section 109 saves this URL for unit HTTP processing to be performed later. Broadcast processing section 107 the transmits the generated response message to control section 116 by means of extended HTTP (S3706).

Figure 42:
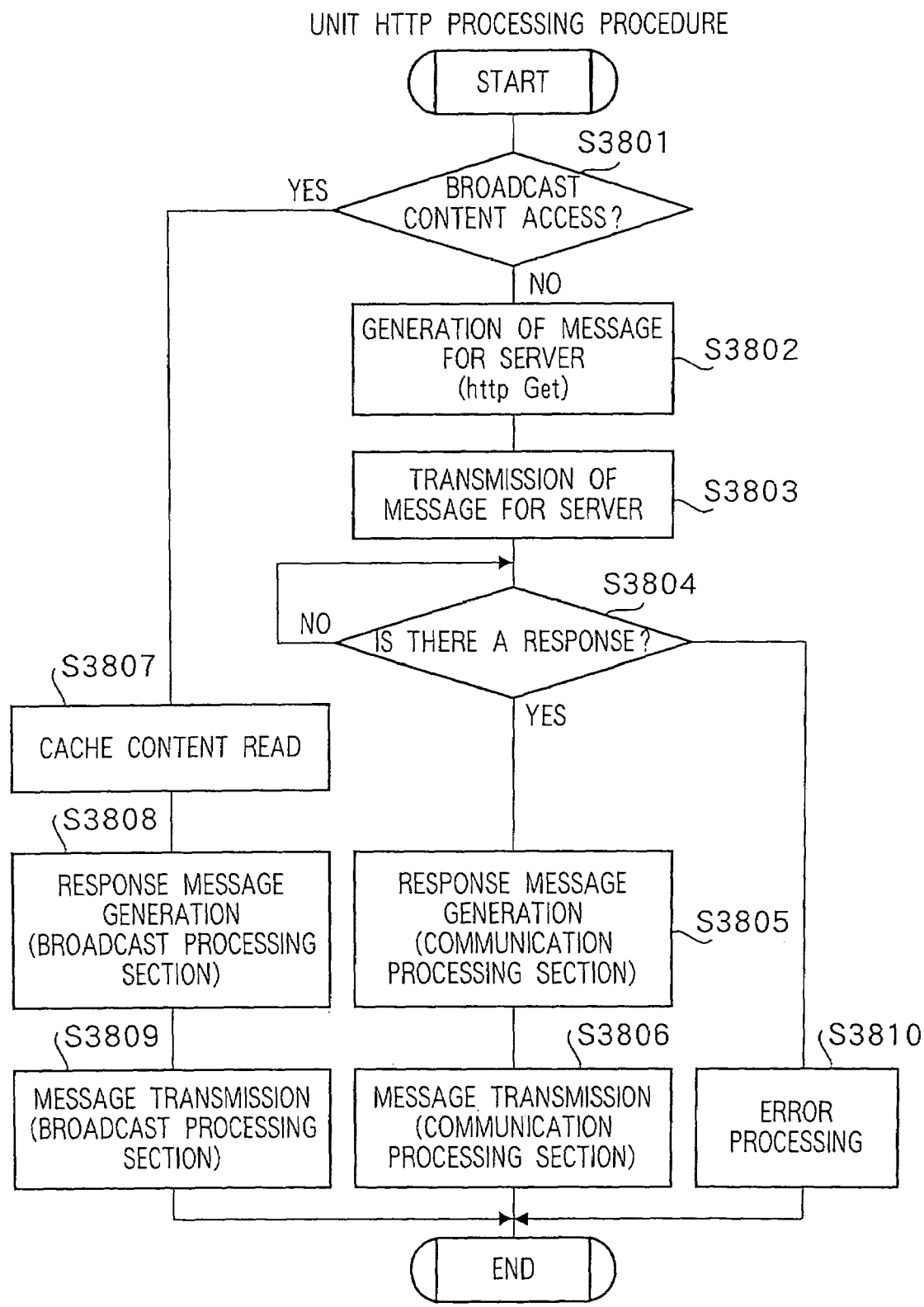
FIG. 42 is a flowchart showing the unit HTTP processing procedure according to Embodiment 2.

Next, unit HTTP processing will be described. FIG. 42 is a flowchart showing unit HTTP processing by communication processing section 106 of content processing section 105 according to Embodiment 2.

In this unit HTTP processing, HTTP communication relay processing or cache content distribution processing is executed in accordance with an HTTP GET instruction (content acquisition request) transmitted from browser section 113.

In step S3801, the received HTTP GET message is analyzed and the processing to be executed is determined. Specifically, the URL string contained in the GET instruction is compared with the URL string saved in step S3705 of the data broadcast reception processing in FIG. 41.

If the two URLs match, the content previously saved in intermediate cache section 108 can be transmitted, and therefore the processing flow proceeds to step S3807.

If, on the other hand, the two URL strings do not match, it is necessary to acquire content from content communication server 101, and therefore the processing flow proceeds to step S3802.

In step S3802 through step S3804, communication processing section 106 performs HTTP GET instruction relay transfer processing.

Communication processing section 106 references the received content acquisition request message and generates a message for transmission to content communication server 101 (S3802).

This message is an HTTP GET message making a content acquisition request to a server.

In the next step, S3803, communication processing section 106 transmits the generated message to an appropriate content communication server 101.

In step S3804, communication processing section 106 waits for a response to the HTTP GET message transmitted to the server, and on receiving a response, proceeds to the next step, S3805.

If an illegal message is received or if there is no response after the elapse of a predetermined time, appropriate error processing is performed in step S3810, and unit HTTP processing is terminated.

In step S3805 and step S3806, communication processing section 106 performs HTTP communication relay transfer. Communication processing section 106 generates a response message from the message received from content communication server 101 (S3805), and transmits the generated response message to browser section 113 (S3806).

In step S3807 through step S3809, on the other hand, broadcast processing section 107 executes cache content distribution processing. Broadcast processing section 107 reads content received from content broadcast server 102 from intermediate cache section 108 (S3807), generates a response message containing this content (S3808), and transmits the generated response message to browser section 113 (S3809).

Thus, in unit HTTP processing according to Embodiment 2, HTTP communication relay processing or cache content distribution processing is performed, according to the URL contained in an HTTP GET instruction. By this means, it is possible to distribute content received from content broadcast server 102 by means of PULL-type content distribution, in the same way as in the case of content distribution involving content communication server 101.

According to Embodiment 2, also, a content URL is reported to content display section 3802, and therefore content can be distributed by means of HTTP between transmitting system 3801 and content display section 3802 even when content is received from content broadcast server 102.

According to Embodiment 2, also, when control section 116 of content display section 3802 receives a resource notification message that includes a content identifier indicating the location of content by means of broadcasting, browser section 113 can be instructed to acquire the content indicated by the content identifier. Thus, when content is received from content broadcast server 102, content is not received directly from content broadcast server 102, but instead, PULL-type content acquisition is performed via content processing section 105, enabling broadcast content distributed by communication terminal content broadcast server 102 to be displayed directly by the browser.

According to Embodiment 2, also, an HTTP GET message is used when distributing broadcast content stored in content processing section 105 to content display section 3802, facilitating the incorporation of content display section 3802 into a typical Web system based on HTTP and HTML.

According to Embodiment 2, also, previously stored content can be distributed to content display section 110 by means of PULL-type content distribution, rather than being received from the server again. Moreover, content processing section 105 does not need a broadcast transmitting section, enabling the costs necessary for system construction to be kept down.

Embodiment 3

Embodiment 3 of the present invention is a content adaptive distribution system that uses only communication, and does not use data broadcasting.

Figure 43:
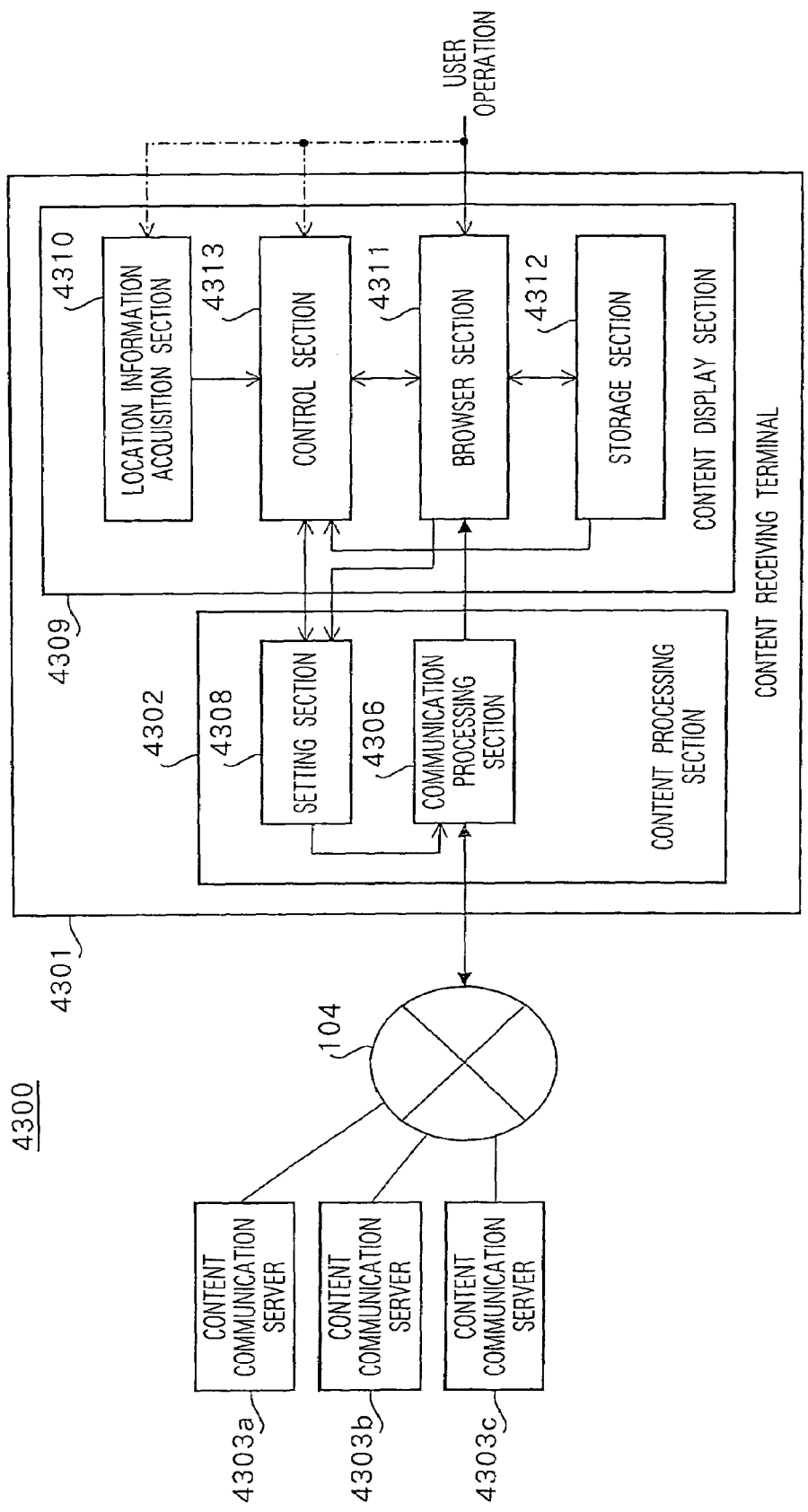
FIG. 43 is a system configuration diagram of a content adaptive distribution system according to Embodiment 3 of the present invention.

A content adaptive distribution system according to Embodiment 3 will be described below using FIG. 43. FIG. 43 is a system configuration diagram of a content adaptive distribution system according to Embodiment 3.

Content adaptive distribution system 4300 in FIG. 43 is provided with a plurality of content communication servers 4303a through 4303c. Content communication servers 4303a through 4303c distribute arbitrary content to client terminals that have a communication function. Web servers (HTTP servers) on the Internet can be quoted as an actual example of content communication servers 4303a through 4303c. There is no limit to the number of content communication servers 4303a through 4303c.

In content adaptive distribution system 4300 according to Embodiment 3, menu content is also distributed by content communication servers 4303a through 4303c.

Content adaptive distribution system 4300 is also provided with a content receiving terminal 4301. Content receiving terminal 4301 is a client terminal that has a function for accessing a communication network. Content receiving terminal 4301 receives content sent from content communication servers 4303a through 4303c via a communication network 104. If content receiving terminal 4301 is a terminal capable of moving, it is assumed that content receiving terminal 4301 has a function for acquiring location information by means of GPS (Global Positioning System) or the like. In Embodiment 3, the content receiving terminal is a mobile terminal such as a PDA (Personal Digital Assistant) or in-vehicle car navigation system.

Communication network 104 is a network that enables mutual communication between a content communication server 4303 and content receiving terminal 4301, and is any network, such as the Internet, a WAN (Wide Area Network), a LAN (Local Area Network), a radio network, or a network in which these are combined.

Next, the internal configuration of content receiving terminal 4301 will be described. Content receiving terminal 4301 is a client terminal capable of displaying content that has a relationship to geographical location information—that is, location-dependent content—efficiently. For example, content receiving terminal 4301 enables Web content related to the area around the user's present position or target position to be viewed efficiently. Content receiving terminal 4301 comprises a content processing section 4302 and a content display section 4309.

In response to content received from content communication servers 4303a through 4303c, content processing section 4302 carries out content adaptation processing, and outputs content that has undergone adaptive processing to content display section 4309.

Content processing section 4302 contains a communication processing section 4306 and a setting section 4308.

In response to content received from a content communication server 4303 via communication network 104, communication processing section 4306 carries out content adaptation processing, and outputs content that has undergone adaptive processing to content display section 4309. In the case of content for which content adaptation processing is unnecessary, communication processing section 4306 outputs the content to content display section 4309 without performing any processing. If the content to be distributed is HTML content, communication processing section 4306 acts as an HTTP proxy. That is to say, communication processing section 4306 performs HTTP relay processing between a browser section 4311 and content communication servers 4303a through 4303c.

Setting section 4308 controls communication processing section 4306 in accordance with control instructions from content display section 4309. Setting section 4308 reports location information to communication processing section 4306.

Content display section 4309 outputs control instructions to setting section 4308 in accordance with user operations, and displays content received from content processing section 4302. Content display section 4309 contains a location information acquisition section 4310, browser section 4311, storage section 4312, and control section 4313.

Location information acquisition section 4310 acquires location information, and outputs the acquired location information to control section 4313. When content receiving terminal 4301 is a mobile terminal and has GPS or other location information acquisition means, that location information acquisition means corresponds to location information acquisition section 4310, and latitude and longitude coordinate values acquired by means of GPS correspond to location information. Location information acquisition section 4310 also has a function for acquiring location information input by a user. This function is used in order to retrieve location-dependent content. Location information includes not only latitude and longitude coordinate values, but also any information that has a relationship to a geographical location, such as an address, zip-code, or telephone number.

Browser section 4311 displays content in accordance with user operations, and in Embodiment 3 is a typical Web browser (HTML browser). If content distribution system 4300 in FIG. 43 distributes content written in other markup languages such as BML (Broadcasting Markup Language), browser section 4311 is assumed to have functions for displaying content written in those markup languages. In addition to the basic function of performing content browsing, browser section 4311 also has a GUI for displaying various kinds of information to the user and accepting user instructions. Content distribution related messages (that is, HTTP messages) are output from browser section 4311 to setting section 4308.

Storage section 4312 has a function for storing content received from content processing section 4302 and a function for caching content displayed by browser section 4311, as well as a function for managing stored content. When a received message is stored, storage section 4312 notifies control section 4313 of information relating to the stored content, such as the file name, for example. Content stored in storage section 4312 can be displayed by browser section 4311.

Control section 4313 performs overall control of content display section 4309. The main function of control section 4313 is to report location information obtained from location information acquisition section 4310 to setting section 4308 of content processing section 4302. Control section 4313 also has a function of instructing browser section 4311 to display content stored in storage section 4312.

Figure 44:
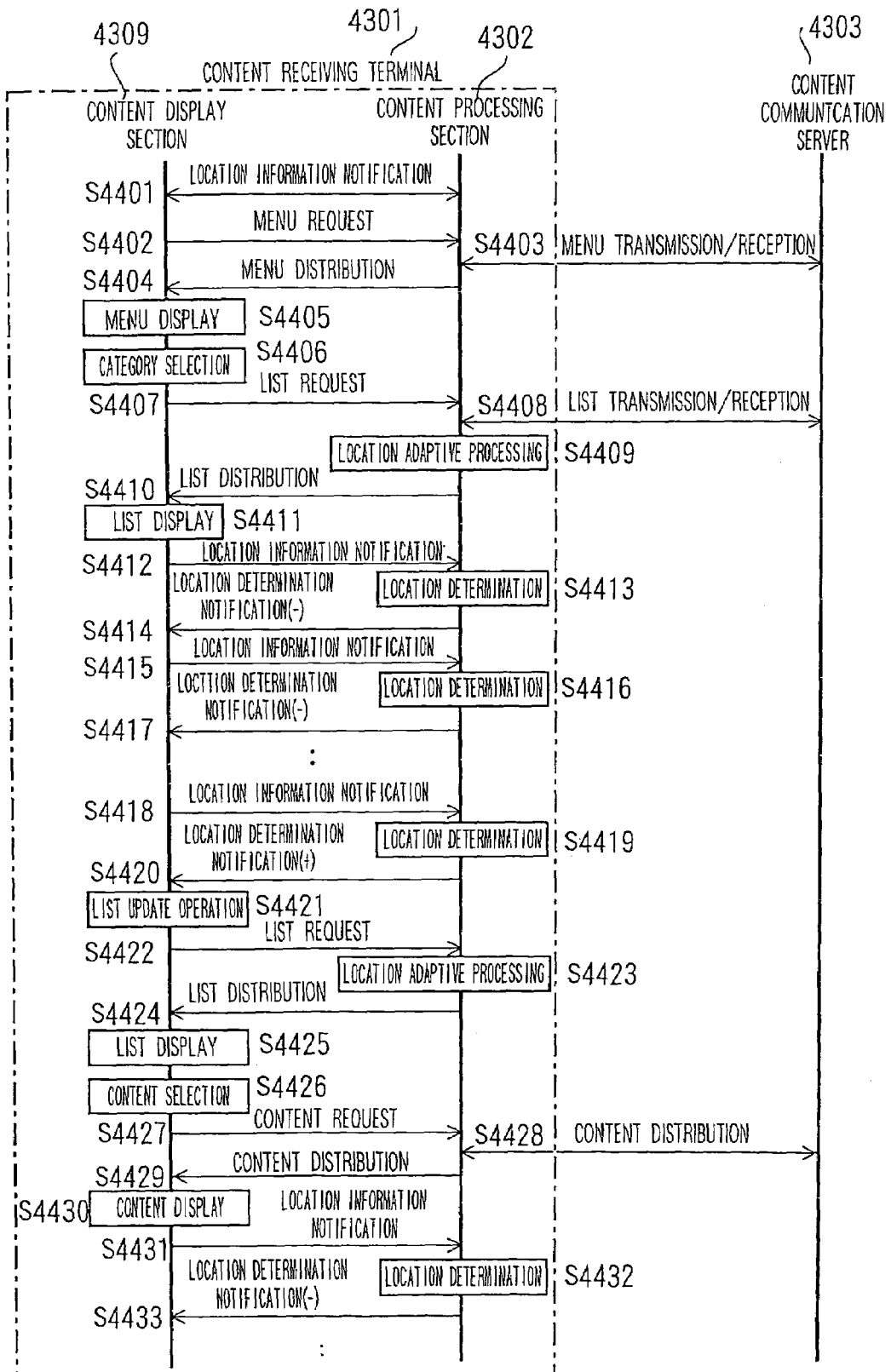
FIG. 44 is a sequence diagram of content adaptive distribution according to Embodiment 3.

Content adaptive distribution in a content adaptive distribution system according to Embodiment 3 will now be described using FIG. 44. FIG. 44 is a sequence diagram of content adaptive distribution according to Embodiment 3. FIG. 44 shows the communication sequence between one content communication server 4303 and one content receiving terminal 4301. To simplify the explanation, FIG. 44 shows only one content communication server 4303, but in an actual content distribution system there are a plurality of content communication servers 4303, and menu content, list content, and location-dependent content are deployed in a dispersed fashion.

The sequence diagram in FIG. 44 is basically the same as the sequence diagram in FIG. 13, the only difference between the two being that content communication server 4303 distributes menu content. An explanation of FIG. 44 will therefore be omitted here.

As described above, content adaptive distribution system 4300 according to Embodiment 3 uses only communication, and therefore such a system can easily be constructed even at the present time, when mobile terminals capable of data broadcast reception are not in widespread use.

Also, in Embodiment 3, a broadcast server is not necessary, enabling content adaptive distribution system 4300 to be constructed at low cost.

Furthermore, in Embodiment 3, content receiving terminal 4301 employs a car navigation system that includes GPS, a map database, and a map manipulation application. By this means it is possible to implement a car navigation system capable of receiving a content distribution service adapted to the location of the terminal.

According to Embodiment 3, also, when in map display mode, content display section 4309 can find and output address information and the latitude coordinate value and longitude coordinate value of a point on a map specified by the user. As a means is thus provided for acquiring location information for a point specified by the user in addition to receiving location information from GPS, use is possible not only for display of information relating to content for the present locality, but also for target position searching (retrieval). In target position searching (retrieval), the user is offered address information or map location specification as a means of specifying a target position, thereby improving the operability of a content receiving terminal.

Moreover, a mode may also be implemented whereby processing performed by content receiving terminal 4301 according to Embodiment 3 is performed by making the processing performed by content receiving terminal 4301 according to Embodiment 3 a program, storing this program in a recording medium, and having this program read by a computer.

Embodiment 4

Embodiment 4 focuses on the fact that, as a content processing section that executes content adaptation processing uses HTTP for communication with a server, uses an HTTP-based, partially extended protocol for communication with a content display section, and has a very high degree of compatibility with the Internet, it is not absolutely necessary for the content processing section and content display section to operate at the same node. In other words, Embodiment 4 executes adaptive processing of content at a separate node existing between a server and terminal in a content adaptive distribution system that uses only communication, and does not use data broadcasting, as in Embodiment 3.

Figure 45:
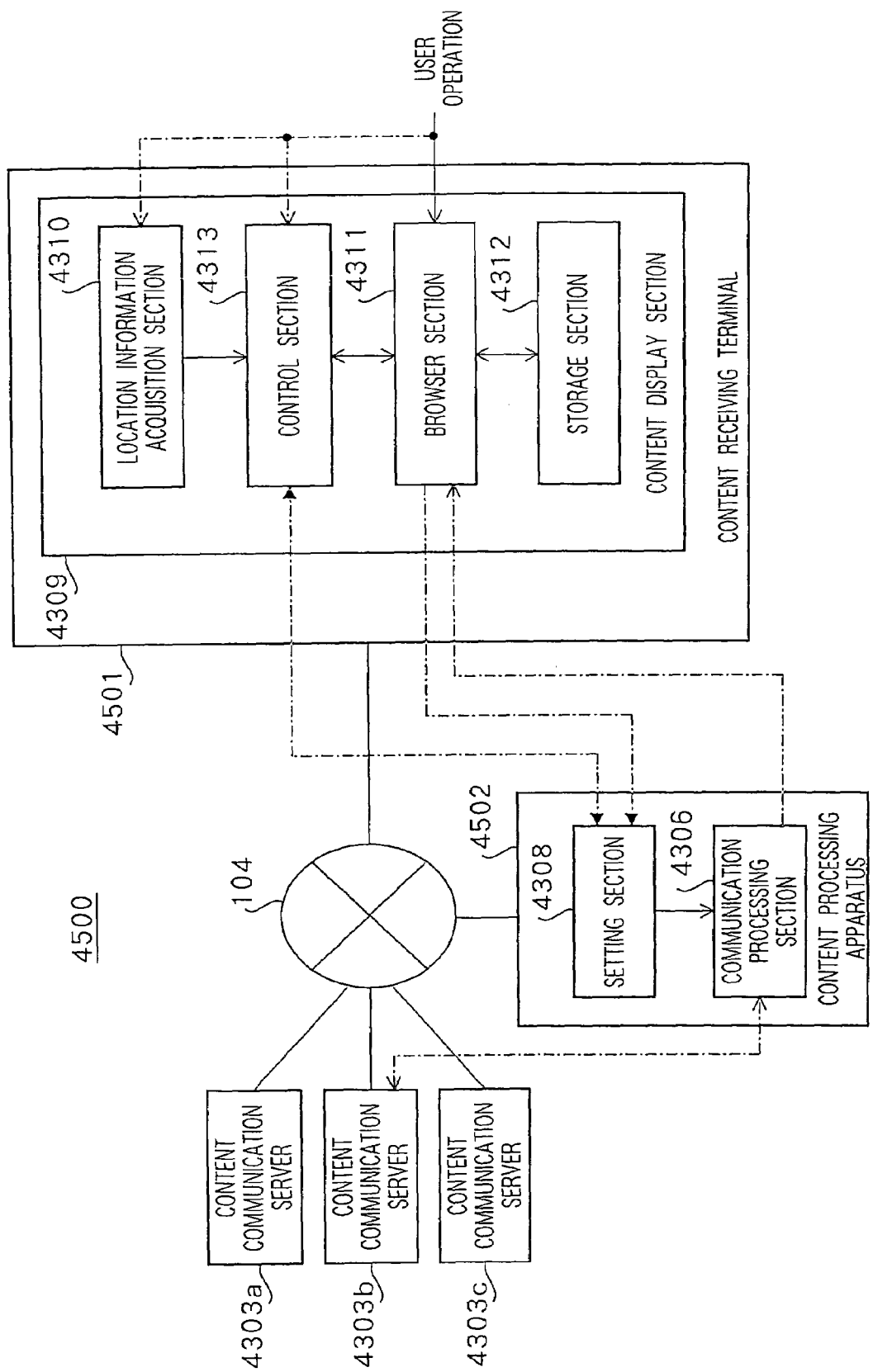
FIG. 45 is a system configuration diagram of a content adaptive distribution system according to Embodiment 4 of the present invention.

A content adaptive distribution system according to Embodiment 4 will be described below using FIG. 45. FIG. 45 is a system configuration diagram of a content adaptive distribution system according to Embodiment 4.

A content adaptive distribution system 4500 according to FIG. 4 comprises a content receiving terminal 4501 and a content processing apparatus 4502 at different nodes.

Content processing apparatus 4502 has the same kind of processing section as content processing section 4302 of Embodiment 3. Also, content receiving terminal 4501 has a processing section in which content processing section 4302 is eliminated from content receiving terminal 4301 of Embodiment 3. That is to say, in content adaptive distribution system 4500, the part corresponding to content processing section 4302 according to Embodiment 3 is separated from content receiving terminal 4301 at a different node.

Communication between content processing apparatus 4502 and content display section 4309 in FIG. 45 is based on HTTP, and therefore content processing apparatus 4502 and content display section 4309 can easily be separated at different nodes (=apparatuses, PCs) as in FIG. 45.

An explanation of the content adaptive distribution sequence of content adaptive distribution system 4500 will be omitted, as the configuration of content adaptive distribution system 4500 is exactly the same as that of the system according to Embodiment 3 shown in FIG. 43, except that content processing apparatus 4502 is at a separate node from content display section 4309.

If, for example, an HTTP proxy is positioned between content receiving terminal 4501 and content communication servers 4303a through 4303c, and the functions of content processing apparatus 4502 are installed in the HTTP proxy, content adaptive distribution can easily be incorporated in a typical Web network based on HTTP and HTML.

As described above, according to Embodiment 4, a part that performs content adaptation processing and a part that displays content can be configured at separate nodes.

Moreover, a mode is also possible whereby processing performed by content receiving terminal 4501 and content processing apparatus 4502 according to Embodiment 4 is made a program, stored in a recording medium, and read and executed by a computer.

This application is based on Japanese Patent Application No. 2002-251895 filed on Aug. 29, 2002, and Japanese Patent Application No. 2003-005953 filed on Jan. 14, 2003, entire contents of which are expressly incorporated by reference herein.

INDUSTRIAL APPLICABILITY

As described above, according to the present invention, it is possible to provide a user of a mobile terminal with information on content relating to the user's present locality, and for content desired by the user to be distributed efficiently.

Also, according to the present invention, it is possible to provide a content distribution service offering a high degree of user convenience that combines the features of passive content viewing by means of broadcasting and active content viewing by means of communication.

The invention claimed is:

1. A content processing apparatus comprising:
a list content receiving section that, upon request from a terminal, receives list content from a content communication server, said list content providing location conditions in a list organized by location conditions in which a reference destination of location-dependent content, which corresponds to geographical location information, is compiled for each location condition;
a location information receiving section that periodically receives location information indicating a current locality of said terminal;
a content adaptation processing section that generates area-specific list content comprising only said reference destination of location-dependent content matching said location information by extracting said list organized by location conditions in which are provided said location conditions matching said location information from said list content;
an area-specific list content distribution processing section that distributes said area-specific list content to said terminal; and
a content relay distribution section that, upon request from said terminal, receives said location-dependent content from said content communication server, and distributes said location-dependent content to said terminal.

2. The content processing apparatus according to claim 1, wherein said content adaptation processing section:
creates a location condition list in which said location condition contained in said list content is extracted;
performs location determination processing that compares said location condition recorded in said location condition list with said location information;
records a result of said location determination in said location condition list;
when new location information is acquired, obtains a new location determination result by performing said location determination processing; and
by determining whether or not a previous said location determination result and said new location determination result match, determines whether or not said location determination result has been updated.

3. The content processing apparatus according to claim 2, wherein:
in said location condition list there is recorded a reference destination of said list content that is a generation source of said location condition; and
said content adaptation processing section outputs location determination update information indicating presence or absence of a change in said location determination result, and when said location determination update information indicates that there is a change in said location determination result, also outputs a reference destination of said list content.

4. The content processing apparatus according to claim 3, wherein:
said location information comprises a latitude coordinate value and a longitude coordinate value of an arbitrary point within an area stipulated beforehand; and
said location condition comprises a circular area stipulated by center latitude and longitude coordinate values and length of radius.

5. The content processing apparatus according to claim 3, further comprising:
a menu content relay distribution section that, upon request from said terminal, receives menu content from said content communication server, said menu content being composed of pairs of a category of said location-dependent content and a reference destination of list content corresponding to said category, and relay-distributes said menu content to said terminal; and
a list content distribution request receiving section that receives a distribution request for said list content corresponding to a category selected by a user of said terminal, sent from said terminal, wherein said list content receiving section receives said list content in accordance with said distribution request for said list content.

6. The content processing apparatus according to claim 3, further comprising:

a menu content receiving section that, upon request from said terminal, receives menu content from a content broadcast server that performs data broadcasting, said menu content being composed of pairs of a category of said location-dependent content and a reference destination of list content corresponding to said category, and relay-distributes said menu content to said terminal;

a list content distribution request receiving section that receives a distribution request for said list content corresponding to a category selected by a user of said terminal, sent from said terminal, wherein said list content receiving section receives said list content in accordance with said distribution request for said list content.

7. The content processing apparatus according to claim 3, further comprising:

a general content receiving section that receives general content other than said location-dependent content; and a general content processing section that outputs said general content.

8. The content processing apparatus according to claim 3, wherein:

said list content receiving section stores said list content, and, when a distribution request for list content that is identical to said list content stored in said list content receiving section is received, does not receive said list content anew from said content server again; and after said list content receiving section stores said list content, said content adaptation processing section, when new location information is acquired by said location information receiving section, generates said area-specific list content comprising information on said location-dependent content corresponding to newly acquired said location information by extracting said list organized by location conditions in which are provided said location conditions matching said newly acquired location information from said list content.

9. A content receiving terminal comprising the content processing apparatus according to claim 1 and a content display apparatus, said content display apparatus having:

a location information acquisition section that acquires location information at regular intervals;

a location information transmitting section that transmits said location information to said content processing apparatus at regular intervals;

a distribution request section that transmits a distribution request for area-specific list content generated from said list content, to said content processing apparatus;

an area-specific list content receiving section that receives said area-specific list content from said content processing apparatus;

an update information receiving section that receives said location determination update information sent from said content processing apparatus in response to said location information;

a list update notification section that notifies a user that said area-specific list content has been updated when said location determination update information indicates that there is a change in a location determination result;

a redistribution request section that, upon request from said user, transmits a redistribution request for said area-specific list content to said content processing apparatus;

a content receiving section that receives said location-dependent content selected by said user from said area-specific list content, from said content processing apparatus; and a content display section that displays said area-specific list content and said location-dependent content.

10. A content adaptive distribution system comprising:

a content communication server that distributes list content providing location conditions in a list organized by location conditions in which location-dependent content, being content assigned correspondence to geographical location information, and a reference destination of said location-dependent content, are compiled for each location condition; and the content receiving terminal according to claim 9.

11. A content display apparatus comprising:

a location information acquisition section that acquires location information at regular intervals;

a location information transmitting section that transmits said location information to the content processing apparatus according to claim 1 at regular intervals;

a distribution request section that transmits a distribution request for area-specific list content generated from said list content, to said content processing apparatus;

an area-specific list content receiving section that receives said area-specific list content from said content processing apparatus;

an update information receiving section that receives said location determination update information sent from said content processing apparatus in response to said location information;

a list update notification section that notifies a user that said area-specific list content has been updated when said location determination update information indicates that there is a change in a location determination result;

a redistribution request section that, upon request from said user, transmits a redistribution request for said area-specific list content to said content processing apparatus;

a content receiving section that receives said location-dependent content selected by said user from said area-specific list content, from said content processing apparatus; and a content display section that displays said area-specific list content and said location-dependent content.

12. The content display apparatus according to claim 11, wherein said redistribution request section extracts a reference destination of said list content accompanying said location determination update information, and transmits said content distribution request containing said reference destination of said list content to said content processing apparatus.

13. The content display apparatus according to claim 12, wherein:

said content display section has a content display mode that displays said area-specific list content and a map display mode enabling display of map data centered on a present position, and switching is possible between said content display mode and said map display mode; and said list update notification section displays an update situation of said area-specific list content at all times, and accepts said area-specific list content update request from a user at all times, irrespective of a status of said content display section.

14. The content display apparatus according to claim 13, wherein said content display section, when in said map display mode, has a function that obtains a latitude coordinate value and longitude coordinate value of a point on a map specified by a user, and outputs these to said location information acquisition section.

15. The content display apparatus according to claim 14, wherein said location information acquisition section has a function that accepts input of address information from a user and obtains a latitude coordinate value and longitude coordinate value from input address information, or a function that acquires a latitude coordinate value and longitude coordinate value from said content display section in a state in which a map is displayed.

16. The content display apparatus according to claim 11, wherein, when said location determination update information indicates that there is a change in a location determination result, said content display section displays the latest information and update date and time of said area-specific list content.

17. The content display apparatus according to claim 11, wherein:
said location information acquisition section acquires a latitude coordinate value and longitude coordinate value of a present position by means of GPS; and
said location information comprises a circular area with said present position in a center.

18. A content processing apparatus comprising:
a content storage section that stores list content providing location conditions in a list organized by location conditions in which location-dependent content which corresponds to geographical location information, and a reference destination of said location-dependent content, are compiled for each said location condition;
a location information receiving section that periodically receives location information indicating a current locality of a terminal;
a content adaptation processing section that generates area-specific list content comprising information only said reference destination of location-dependent content matching said location information by extracting said list organized by location conditions in which are provided said location conditions matching said location information from said list content;
an area-specific list content output processing section that distributes said area-specific list content to said terminal; and
a content distribution section that, upon request from said terminal, distributes said location-dependent content corresponding to said location-dependent content distribution request from said terminal.

19. A content relay distribution method comprising:
upon request from a terminal, receiving list content from a content communication server, said list content providing location conditions in a list organized by location conditions in which location-dependent content, which corresponds to geographical location information, and a reference destination of said location-dependent content, are compiled for each location condition;
periodically receiving location information indicating a current locality of said terminal;
upon receiving a distribution request for said list content from said terminal, generating area-specific list content comprising only said reference destination of location-dependent content matching said location information by extracting said list organized by location conditions in which are provided said location conditions matching said location information from said list content, and distributing said area-specific list content to said terminal;
upon receiving said location information anew from said terminal, distributing previously generated area-specific content and update information indicating presence or absence of a change in the newly generated area-specific list content; and
upon request from said terminal, distributing said location-dependent content to said terminal.

20. The relay distribution method according to claim 19, further comprising:
transmitting a message comprising a distribution request for said list content to a content processing apparatus;
in response to said message, receiving said area-specific list content generated from said list content;
displaying said area-specific list content;
reporting said location information, acquired at regular intervals, to said content processing apparatus;
in response to said location information, receiving said update information;
when said update information indicates presence of a change in content, transmitting a redistribution request for said area-specific content to said content processing apparatus;
in response to said request, receiving said area-specific content;
displaying the new area-specific list content;
transmitting a message comprising a distribution request for said location-dependent content selected by said user from said area-specific list content, to said content processing apparatus;
in response to said message, receiving said location-dependent content; and
displaying said location-dependent content.

21. A computer-readable medium which stores a program that causes a computer to:
receive list content from a content communication server upon request from a terminal, said list content providing location conditions in a list organized by location conditions in which location-dependent content, which corresponds to geographical location information, and a reference destination of said location-dependent content, are compiled for each location condition;
periodically receive location information indicating a current locality of said terminal;
upon receiving a distribution request for said list content from said terminal, generate area-specific list content comprising only said reference destination of location-dependent content matching said location information by extracting said list organized by location conditions in which are provided said location conditions matching said location information from said list content, and distribute said area-specific list content to said terminal;
upon receiving said location information anew from said terminal, distribute previously generated area-specific content and update information indicating presence or absence of a change in the newly generated area-specific list content; and
upon request from said terminal, relay-distribute said location-dependent content to said terminal.

22. The computer-readable medium according to claim 21, wherein the program further causes a computer to:
transmit a message comprising a distribution request for said list content to a content processing apparatus;
in response to said message, receive said area-specific list content generated from said list content;

display said area-specific list content;
report said location information, acquired at regular intervals, to said content processing apparatus;
in response to said location information, receive said update information;
when said update information indicates presence of a change in content, transmit a redistribution request for said area-specific content to said content processing apparatus;
in response to said request, receive said area-specific content;
display the new area-specific list content;
transmit a message comprising a distribution request for said location-dependent content selected by said user from said area-specific list content, to said content processing apparatus;
in response to said message, receive said location-dependent content; and
display said location-dependent content.

* * * * *